US011136087B2

(12) United States Patent
Takimoto

(10) Patent No.: US 11,136,087 B2
(45) Date of Patent: Oct. 5, 2021

(54) LEANING VEHICLE

(71) Applicant: YAMAHA HATSUDOKI KABUSHIKI KAISHA, Iwata (JP)

(72) Inventor: Hiroshi Takimoto, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 16/702,006

(22) Filed: Dec. 3, 2019

(65) Prior Publication Data

US 2020/0102039 A1    Apr. 2, 2020

Related U.S. Application Data

(63) Continuation of application No. PCT/JP2018/030154, filed on Aug. 10, 2018.

(30) Foreign Application Priority Data

Sep. 4, 2017    (JP) .............................. JP2017-169541

(51) Int. Cl.
*B62K 5/10*    (2013.01)
*B62K 5/027*    (2013.01)
*B62K 5/05*    (2013.01)
*B62K 5/08*    (2006.01)

(52) U.S. Cl.
CPC ................ *B62K 5/10* (2013.01); *B62K 5/027* (2013.01); *B62K 5/05* (2013.01); *B62K 5/08* (2013.01)

(58) Field of Classification Search
CPC . B62K 5/10; B62K 5/027; B62K 5/05; B62K 5/08
See application file for complete search history.

(56) References Cited

U.S. PATENT DOCUMENTS

| 7,648,148 | B1 | 1/2010 | Mercier | |
|---|---|---|---|---|
| 8,070,172 | B1 * | 12/2011 | Smith | B60G 11/08 |
| | | | | 280/124.103 |
| 9,061,732 | B1 * | 6/2015 | Vezina | B62M 27/02 |
| 9,216,790 | B2 * | 12/2015 | Takano | B62K 5/10 |
| 9,327,789 | B1 | 5/2016 | Vezina et al. | |
| 9,789,930 | B1 * | 10/2017 | Vezina | B62L 1/00 |

(Continued)

FOREIGN PATENT DOCUMENTS

| EP | 2451699 A1 | 5/2012 |
|---|---|---|
| JP | 2015-127183 A | 7/2015 |

(Continued)

*Primary Examiner* — Darlene P Condra
(74) *Attorney, Agent, or Firm* — Rabin & Berdo, P.C.

(57) ABSTRACT

An increase in the size of a leaning vehicle that has a double wishbone-type link mechanism is suppressed. A caliper is supported by a vehicle body frame. A disk includes: a disk contact part with which pads are allowed to be brought into contact; and a disk support part that, when the vehicle body frame is in an upright state, is supported by a support arm at a position that is further upward in an upward direction than an arm central shaft. When seen from a frontward direction, the disk support part supports the disk contact part so that an arm passing region through which a portion located between the arm central shaft in the support arm and a second end part of a left shock absorber and a second end part of a right shock absorber passes overlaps with the pads.

6 Claims, 26 Drawing Sheets

(56) References Cited

U.S. PATENT DOCUMENTS

| | | | |
|---|---|---|---|
| 2007/0151780 A1* | 7/2007 | Tonoli | B60G 21/007 180/65.1 |
| 2011/0006498 A1* | 1/2011 | Mercier | B62K 5/10 280/124.103 |
| 2012/0232758 A1* | 9/2012 | Mercier | B60G 17/0162 701/41 |

FOREIGN PATENT DOCUMENTS

| | | |
|---|---|---|
| JP | 2017-095088 A | 6/2017 |
| WO | 2017/082424 A1 | 5/2017 |
| WO | 2017082426 A1 | 5/2017 |

\* cited by examiner

Fig.2
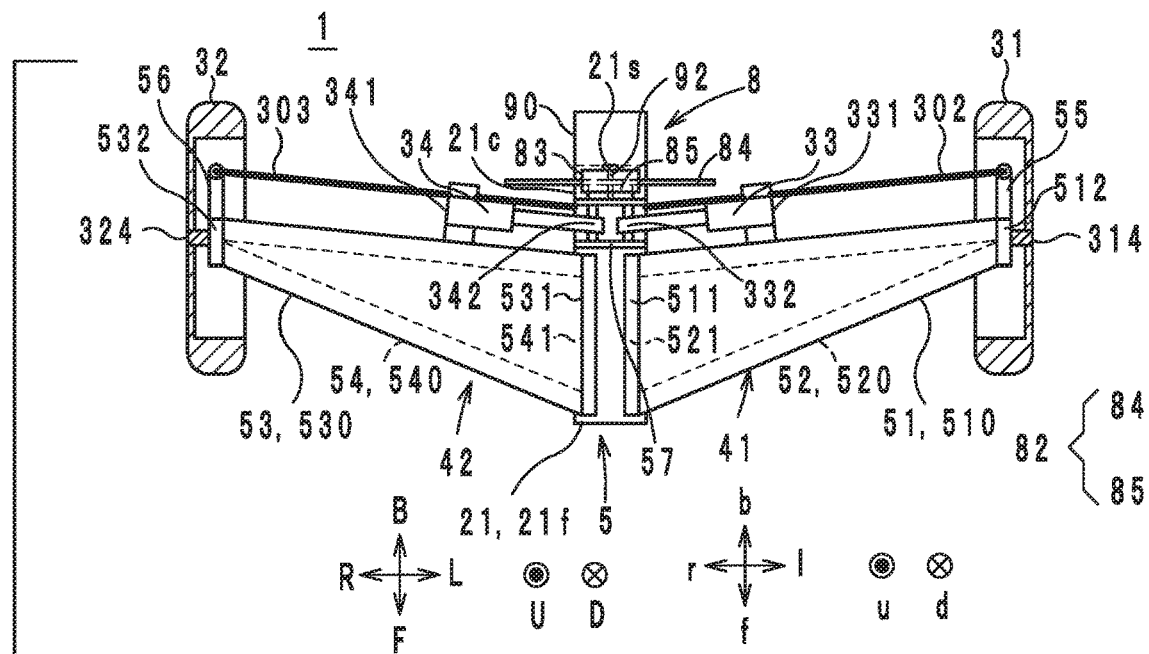
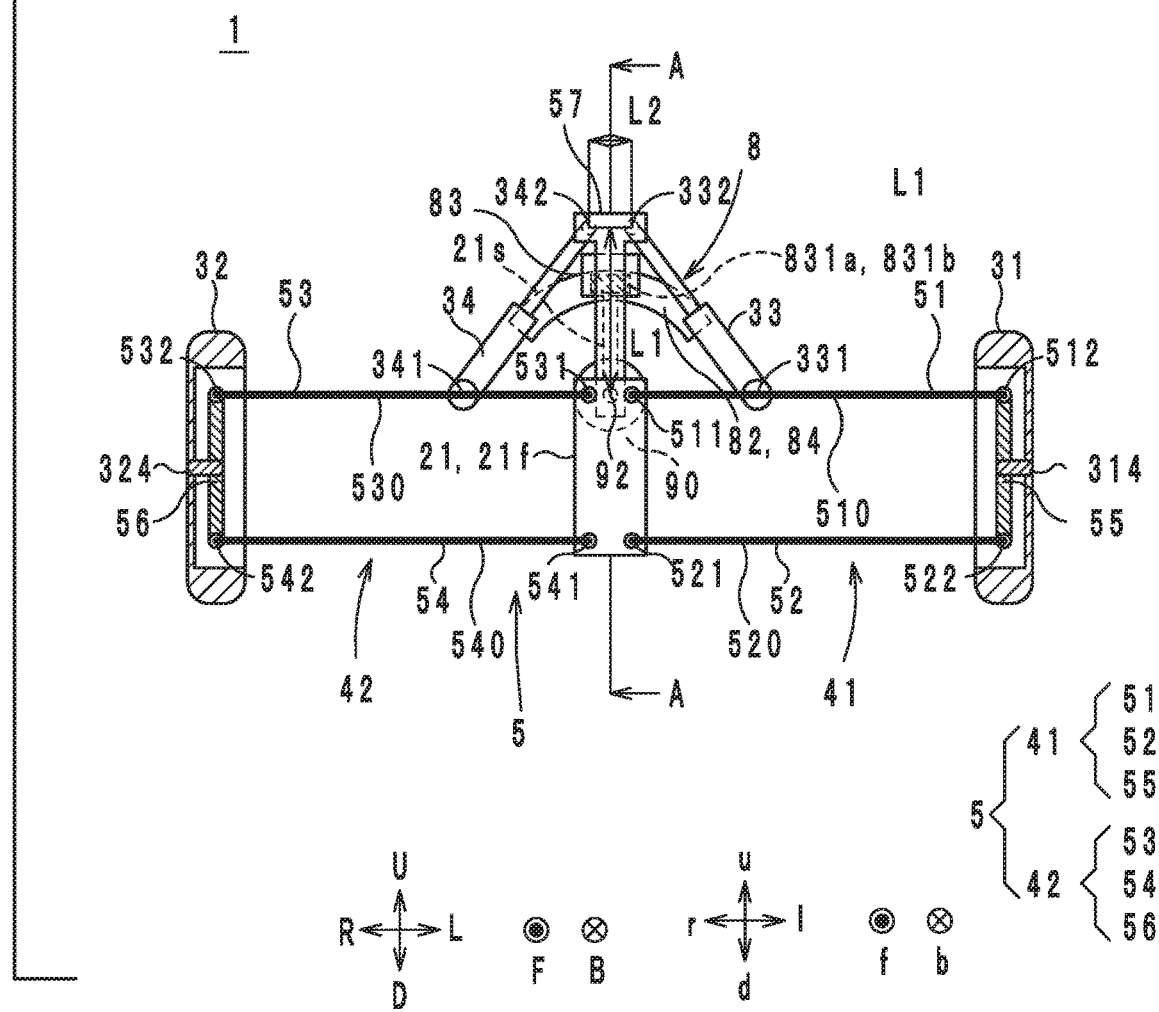

Fig.3
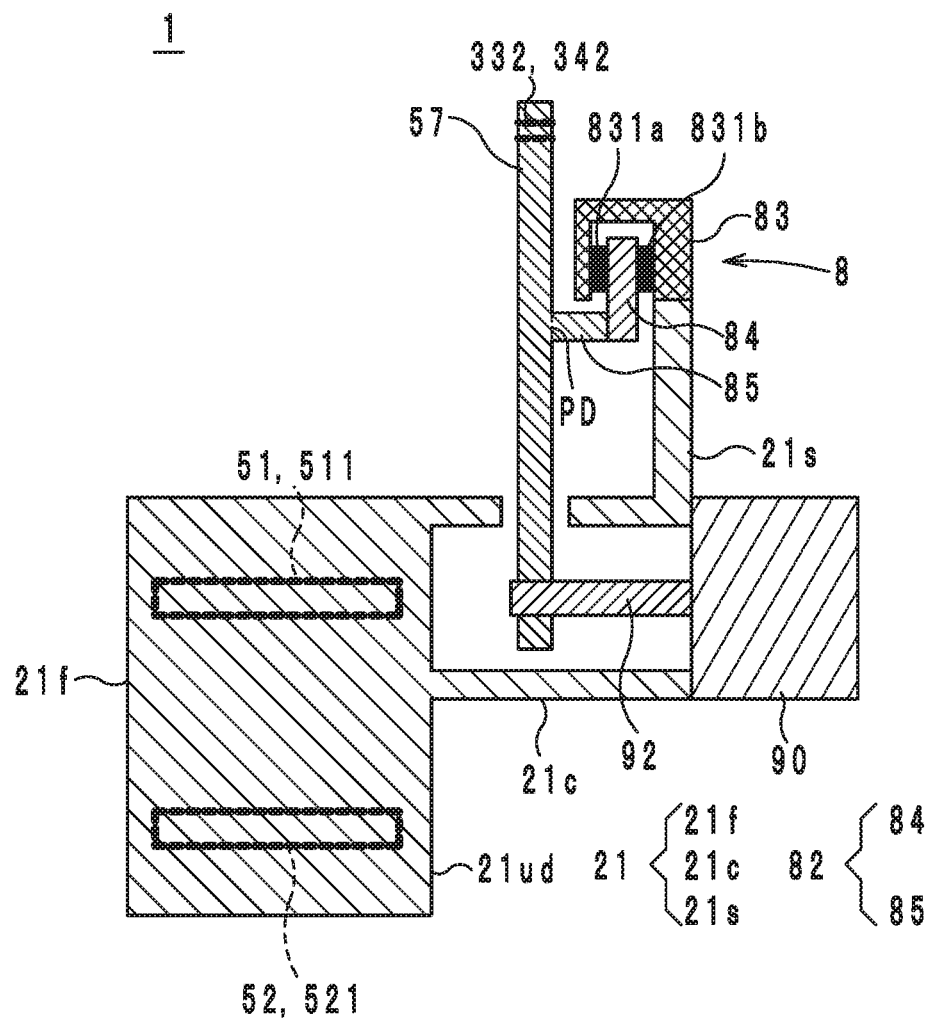
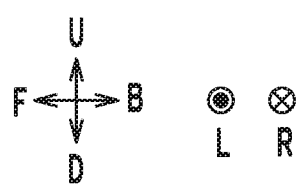
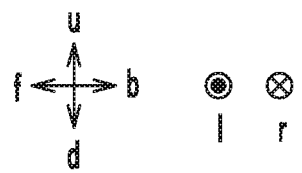

Fig.7
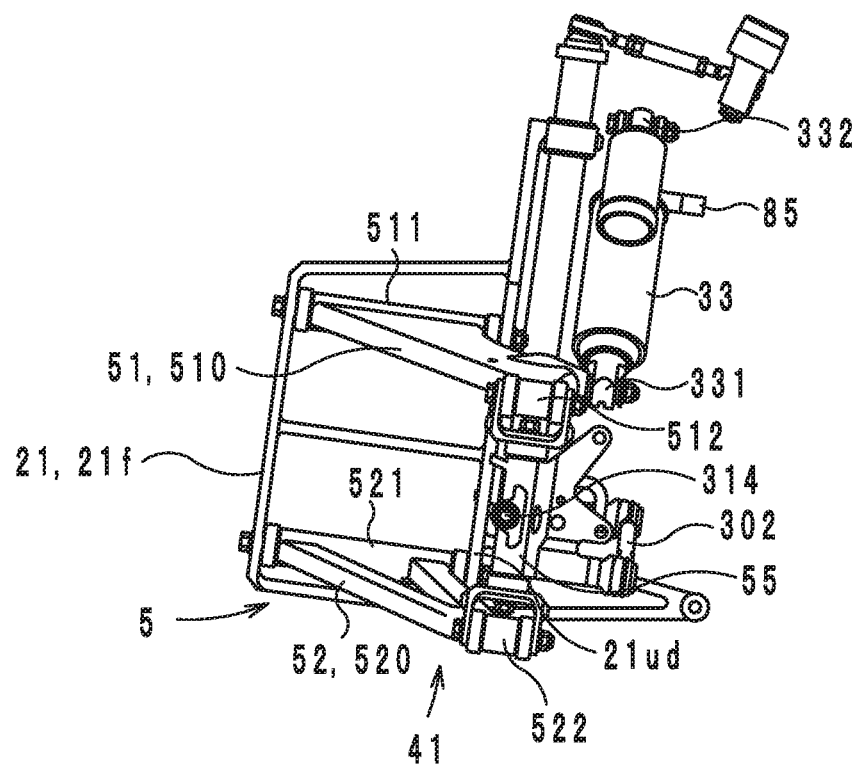
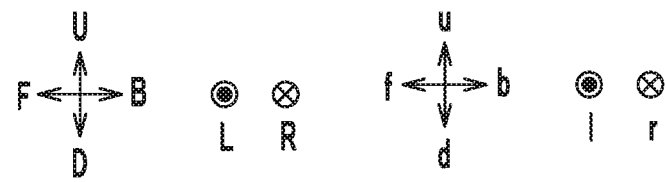

Fig.9
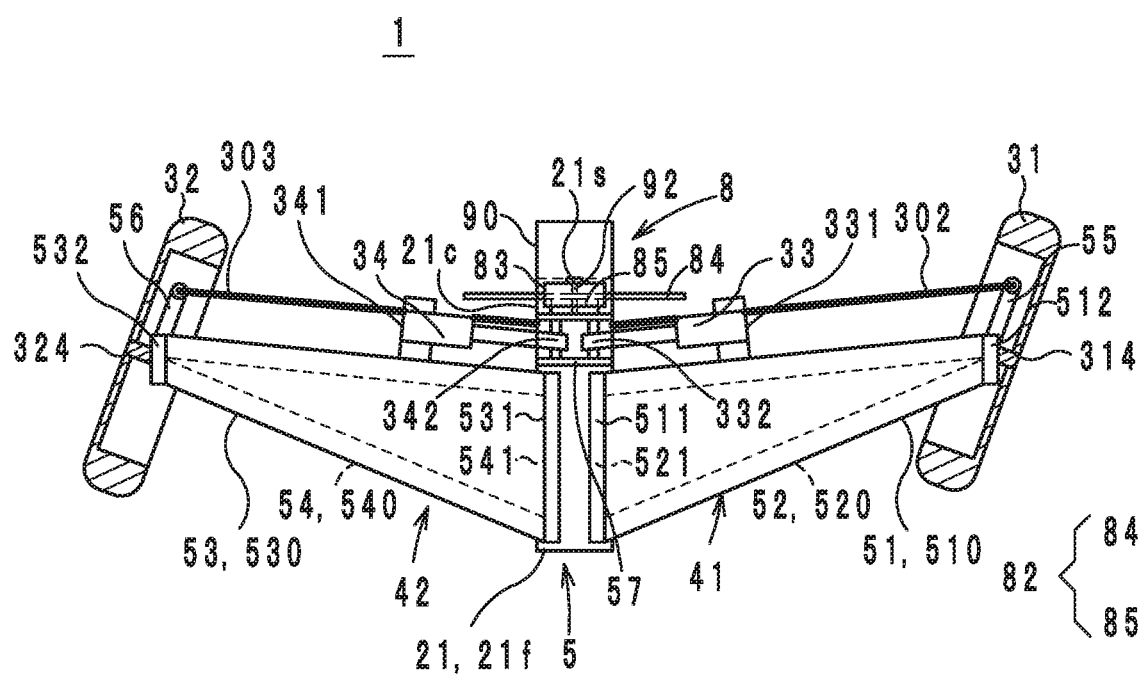
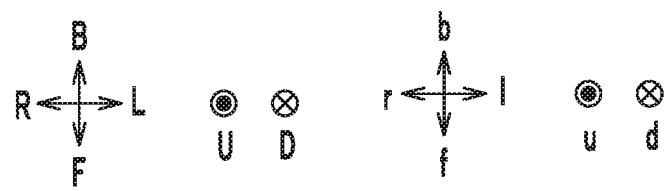

Fig.14
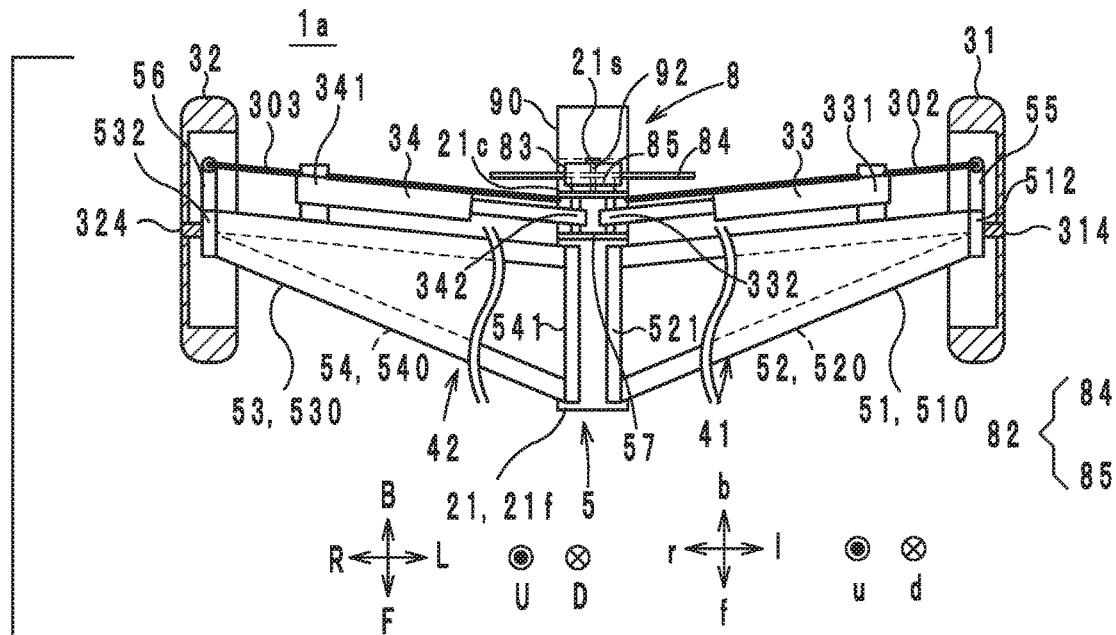
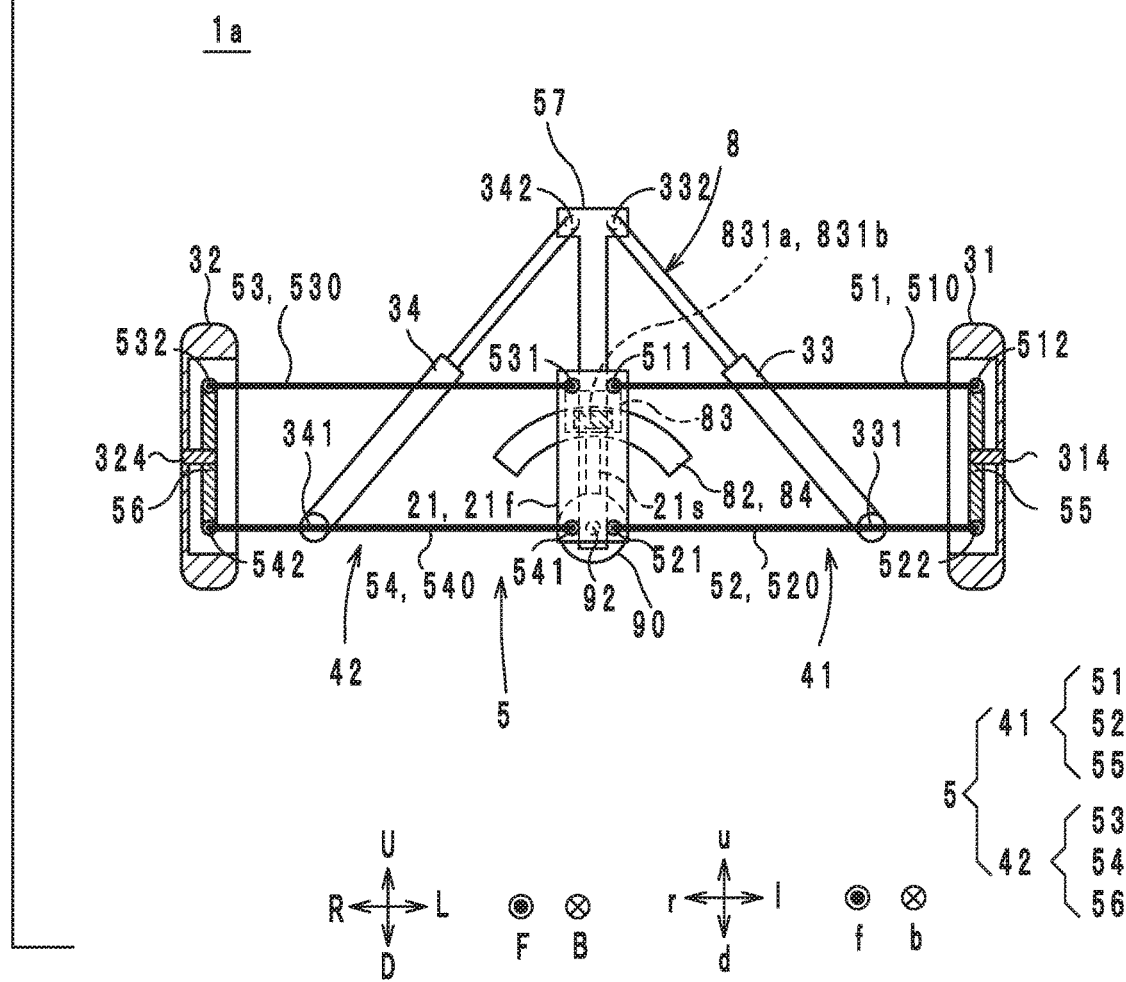

Fig.15
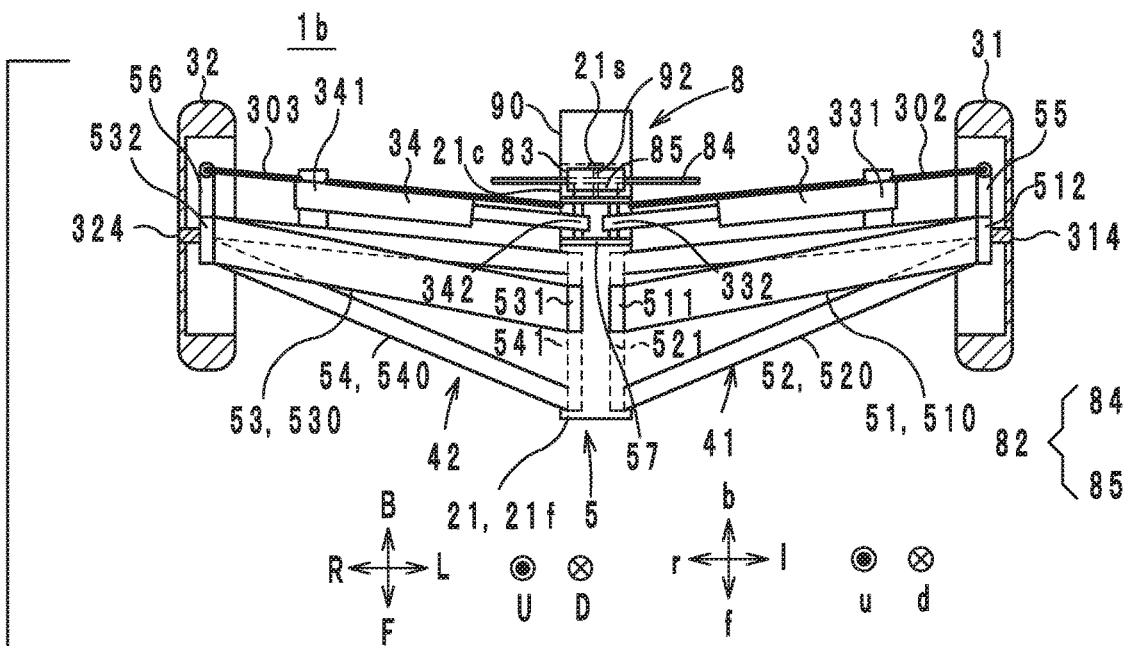
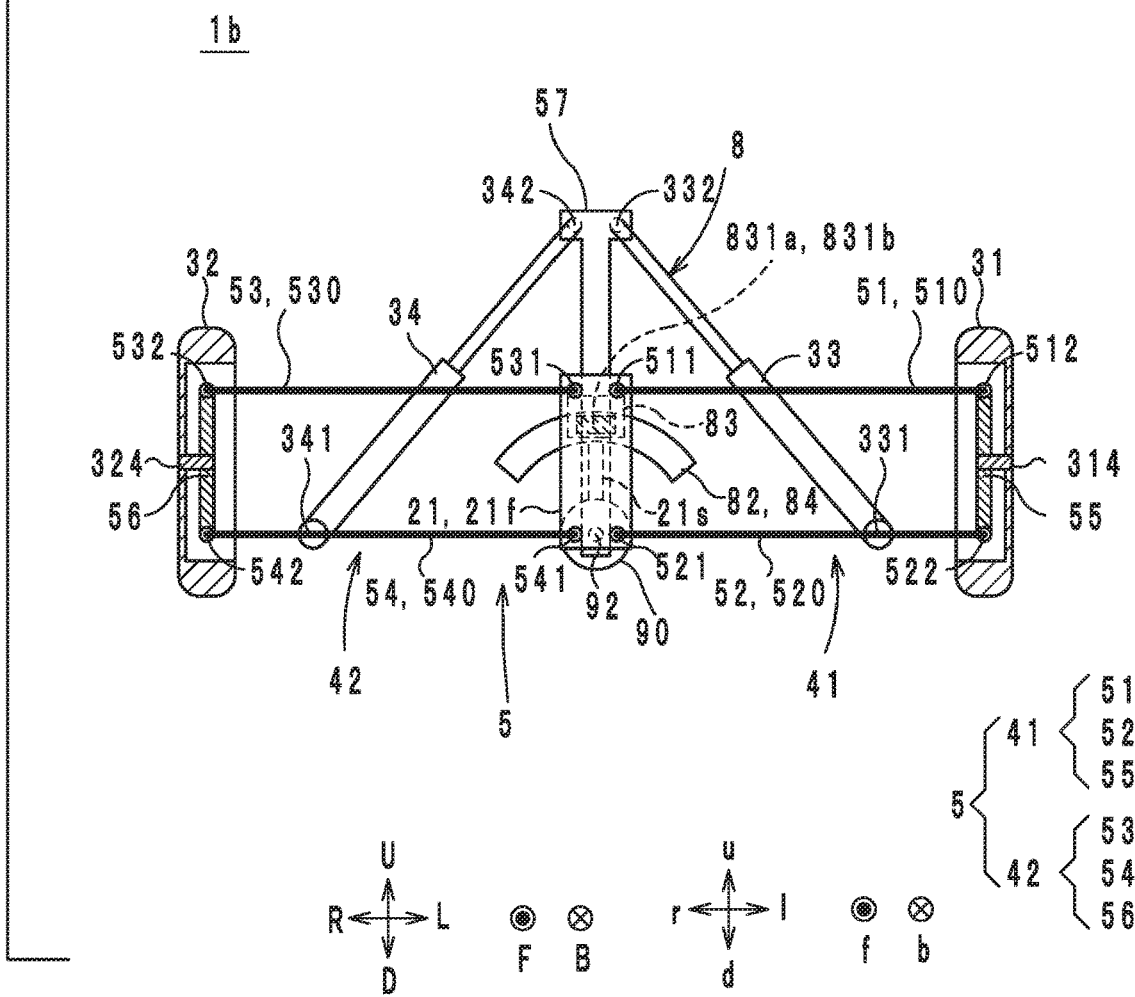

Fig.16
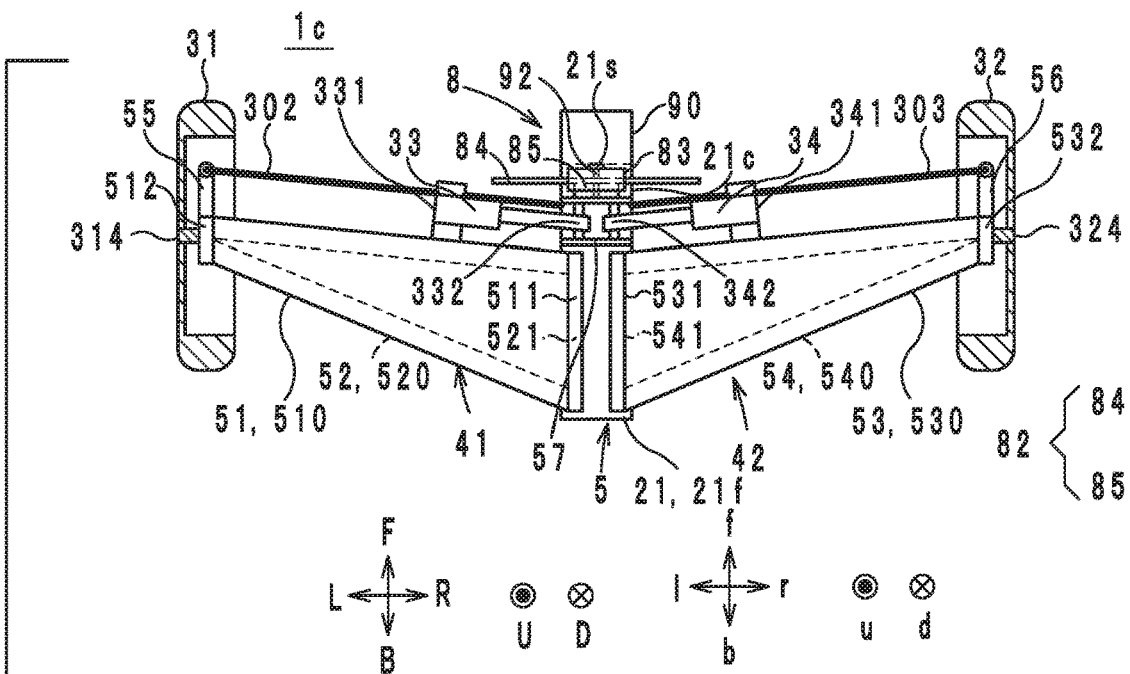
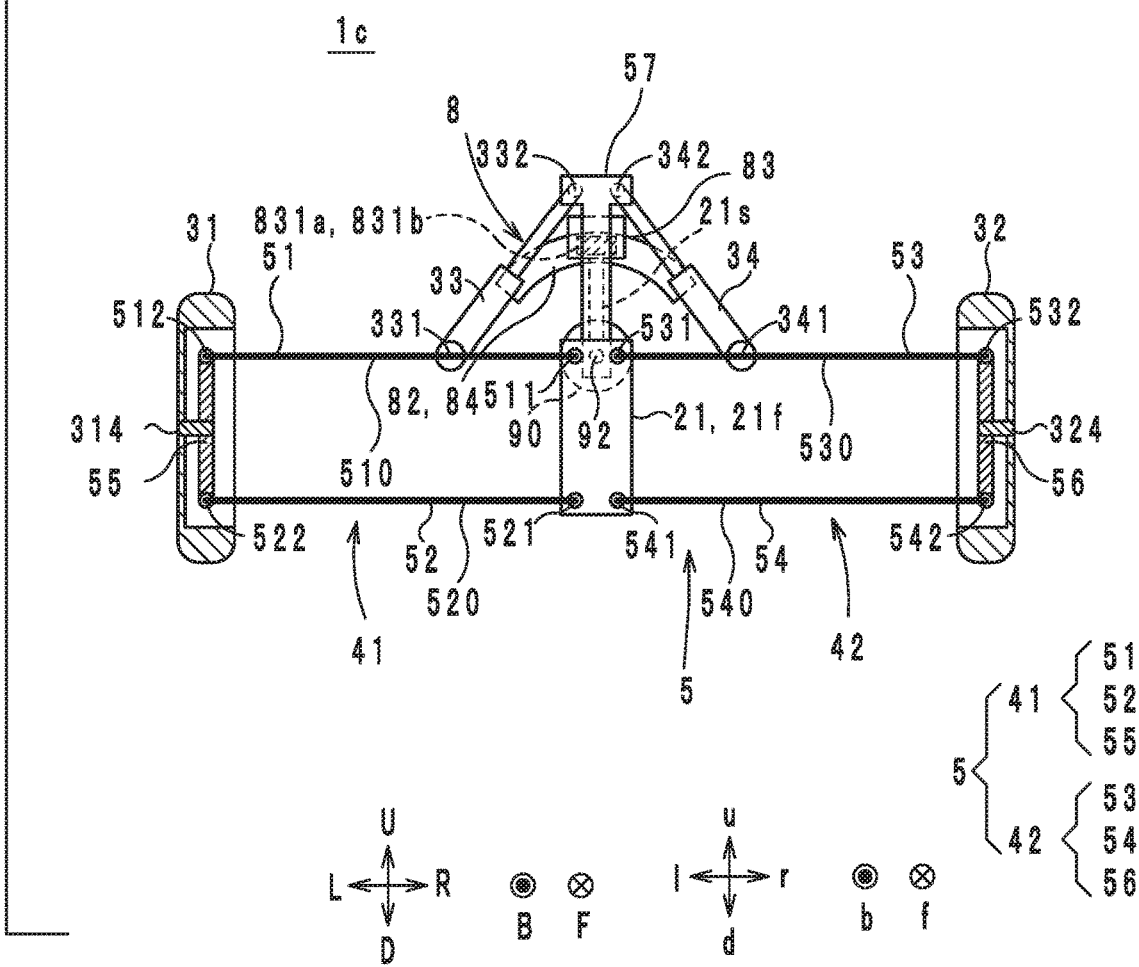

Fig.17
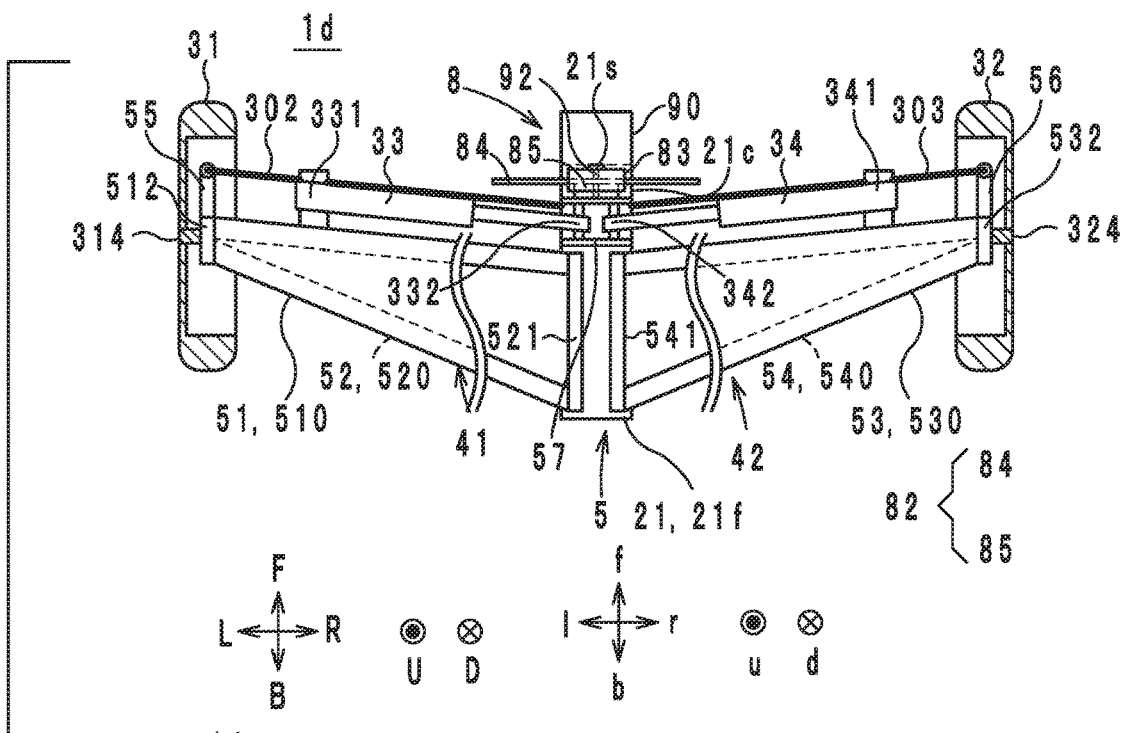
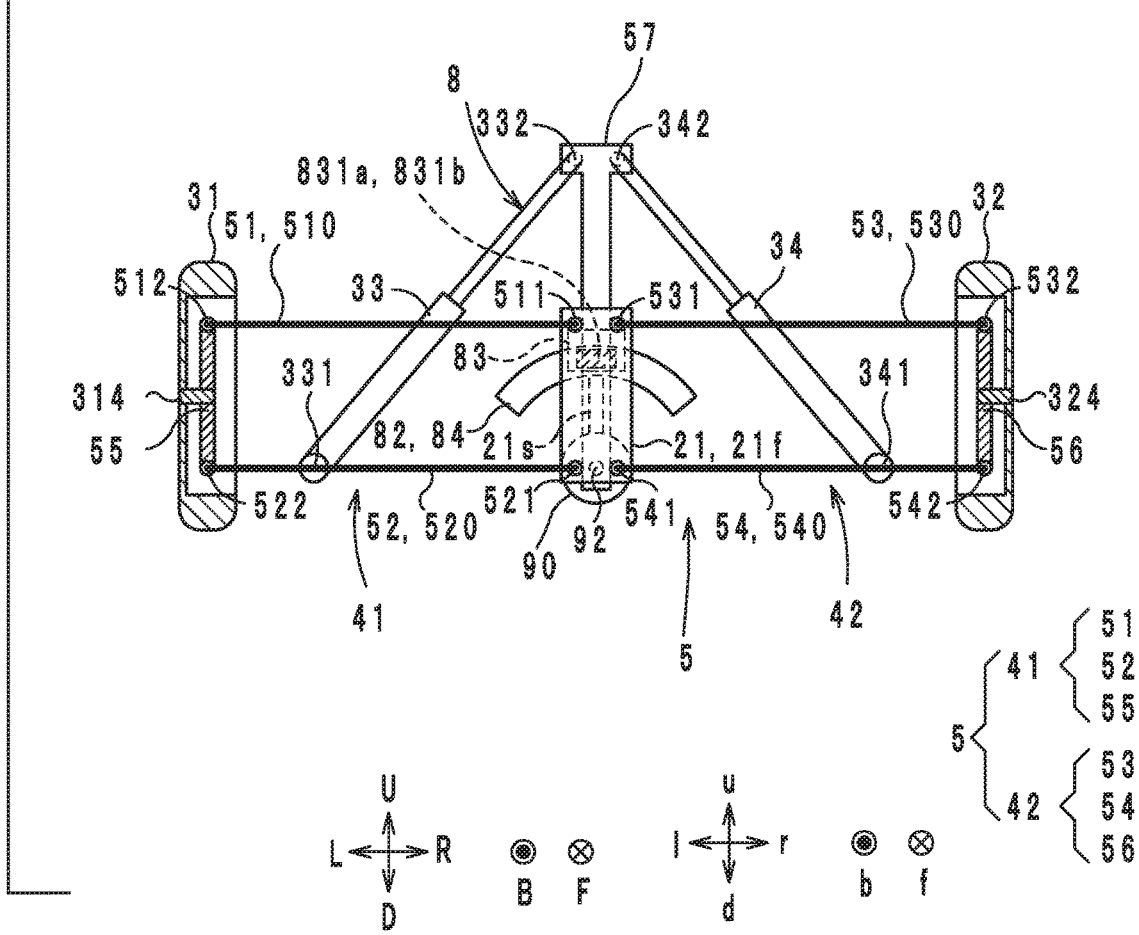

Fig.18
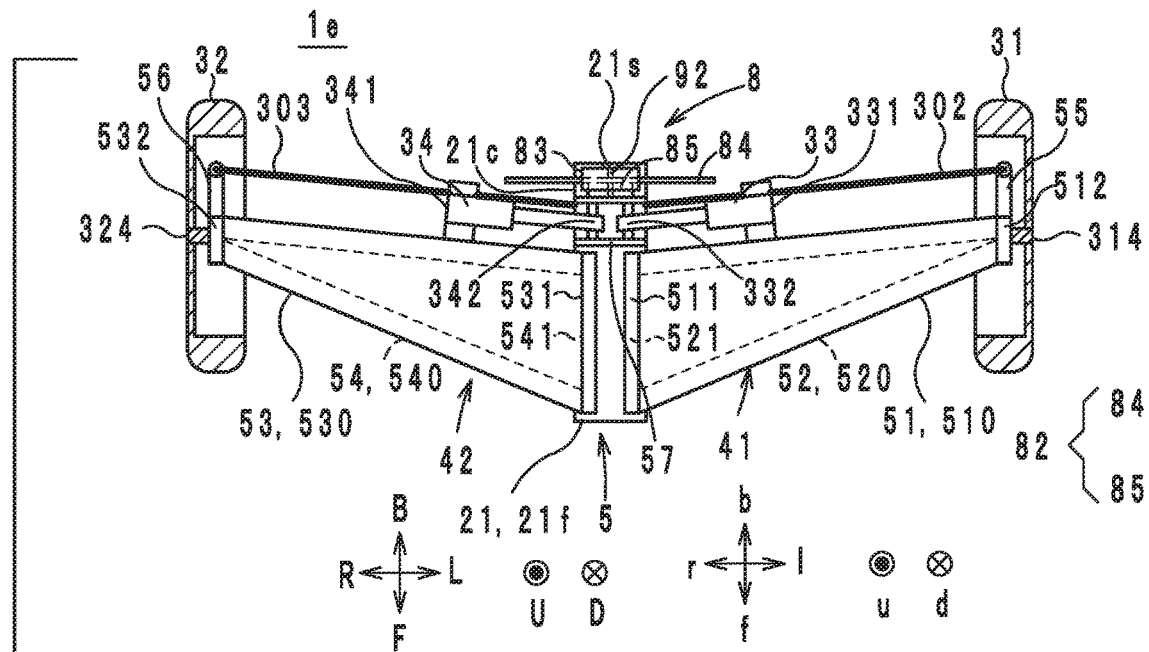
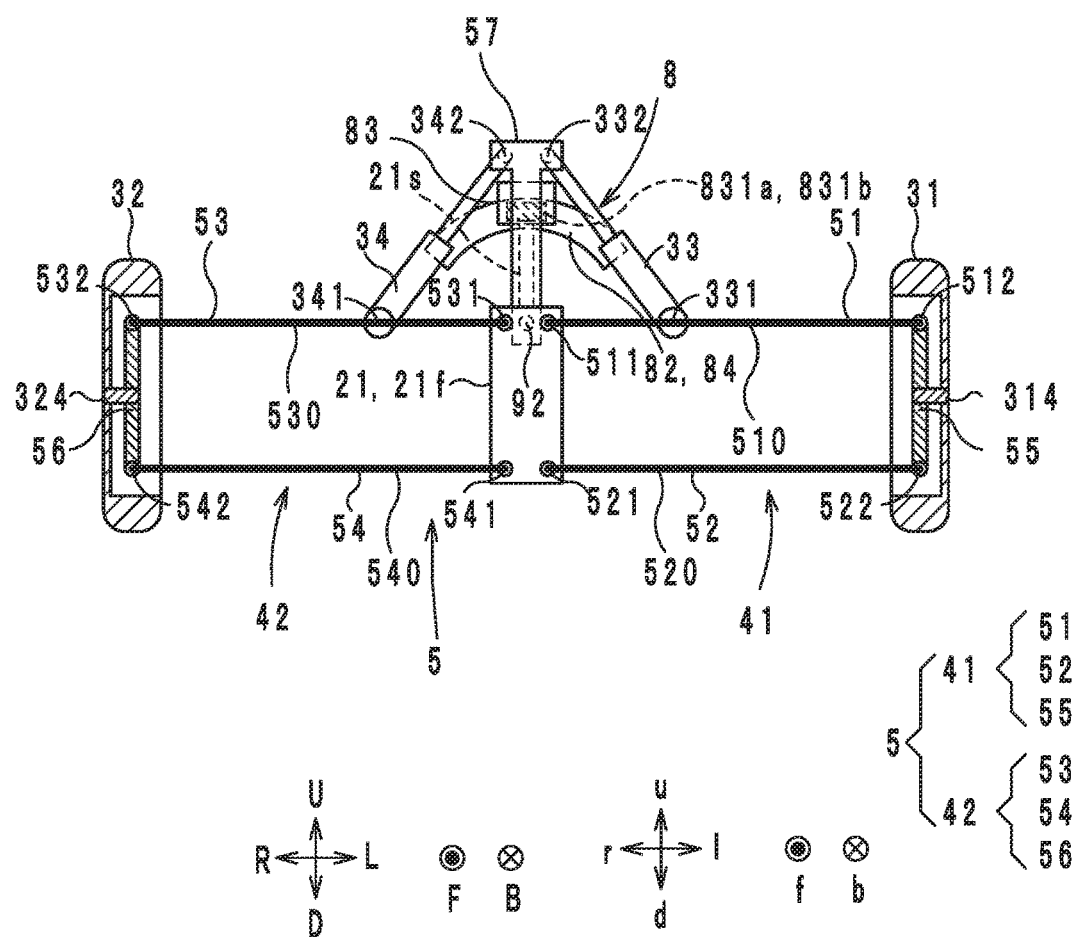

Fig.23
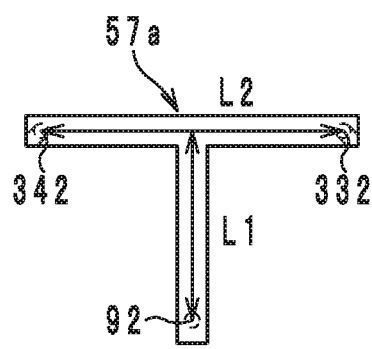
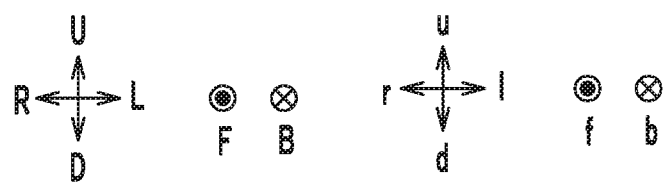

Fig.24
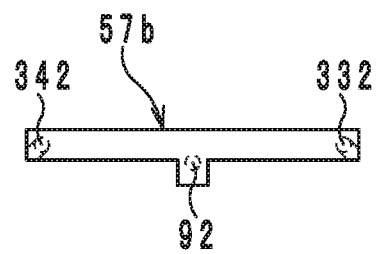
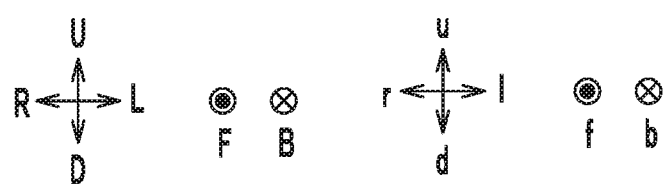

Fig.25
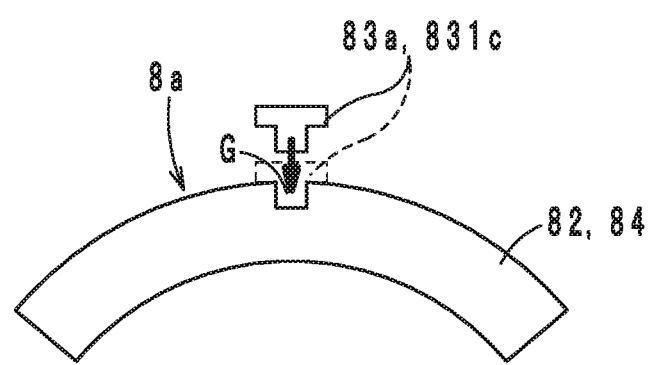
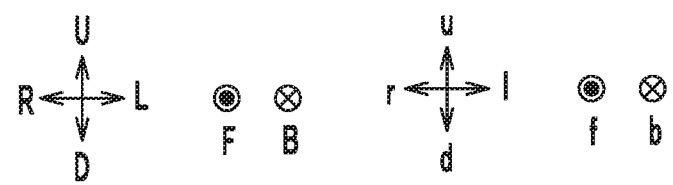

Fig.26
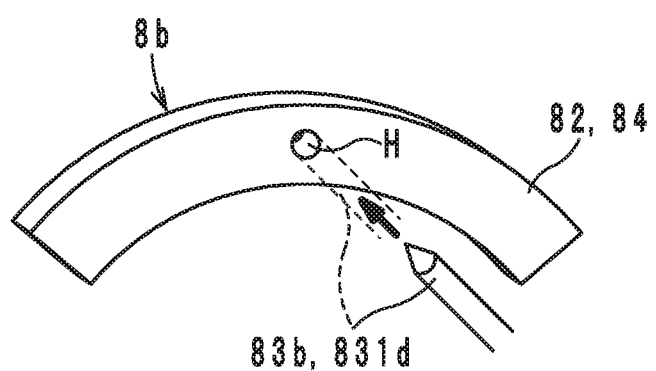
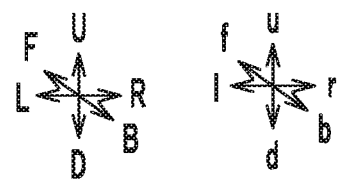

LEANING VEHICLE

CROSS-REFERENCE TO RELATED APPLICATIONS

This application is a continuation of International Application PCT/JP2018/030154 filed on Aug. 10, 2018, which claims priority from Japanese Patent Application No. 2017-169541 filed on Sep. 4, 2017. The contents of each of the identified applications are entirely incorporated herein by reference.

BACKGROUND

Technical Field

The present teaching relates to a leaning vehicle that includes a left steerable wheel and a right steerable wheel.

Background Art

Leaning vehicles disclosed in, for example, Patent Literature 1 are known as conventional leaning vehicles. The leaning vehicle disclosed in Patent Literature 1 includes a vehicle body frame, a left wheel, a right wheel, a leaning mechanism and a leaning drive mechanism. The left wheel is disposed further leftward than the center of the vehicle body frame in the vehicle-body-frame left-right direction. The right wheel is disposed further rightward than the center of the vehicle body frame in the vehicle-body-frame left-right direction. The leaning mechanism supports the left wheel and the right wheel. The leaning mechanism is a double wishbone-type suspension. Further, the leaning mechanism includes a support arm that is supported by the vehicle body frame so as to be rotatable about a rotary shaft extending in the vehicle-body-frame front-back direction.

In the leaning vehicle described above, at a time of turning left, the vehicle body frame leans in the leaning-vehicle leftward direction with respect to the support arm. Further, at a time of turning right, the vehicle body frame leans in the leaning-vehicle rightward direction with respect to the support arm. The leaning drive mechanism is supported by the vehicle body. The leaning drive mechanism includes a rotary shaft and a drive source. The rotary shaft is a rotary shaft of the support arm. The drive source generates a driving force which causes the rotary shaft to rotate with respect to the vehicle body. By this means, the leaning drive mechanism causes the vehicle body frame and the support arm to perform relative rotational movements. Hence, the leaning drive mechanism causes the vehicle body frame to lean in the leaning-vehicle leftward direction or leaning-vehicle rightward direction with respect to the support arm.

The leaning vehicle further includes a leaning brake mechanism. The leaning brake mechanism maintains an upright state or a leaning state of the vehicle body frame. Therefore, the leaning brake mechanism applies a resistance force with respect to operations in which the support arm and the vehicle body are caused to perform relative rotational movements. The leaning brake mechanism includes a brake member and a resistance force applying member. The brake member has a fan shape. The brake member is fixed to a rotary shaft of the support arm at the center of the brake member. The resistance force applying member is fixed to the leaning drive mechanism that is supported by the vehicle body frame. By this means, in a case where the vehicle body frame leans in the leaning-vehicle leftward direction, the resistance force applying member moves in the leaning-vehicle leftward direction along an arc of the brake member. Further, in a case where the vehicle body frame leans in the leaning-vehicle rightward direction, the resistance force applying member moves in the leaning-vehicle rightward direction along the arc of the brake member. In addition, relative rotational movements between the resistance force applying member and the brake member are stopped by the resistance force applying member coming in contact with the brake member. The resistance force applying member is fixed to the leaning drive mechanism that is supported by the vehicle body frame. Further, the brake member is fixed to the rotary shaft of the support arm. Therefore, relative rotational movements between the support arm and the vehicle body frame are stopped. As a result, an upright state or a leaning state of the vehicle body frame is maintained.

In the leaning vehicle described above, one part (brake member) of the leaning brake mechanism is fixed to a rotary shaft that is included in the leaning drive mechanism. By this means, the leaning drive mechanism and the leaning brake mechanism are integrated into one mechanism. As a result, a support structure for supporting the leaning drive mechanism and the leaning brake mechanism with the vehicle body frame can be simplified, and an increase in the size of the leaning vehicle is suppressed.

CITATION LIST

Patent Literature

Patent Literature 1: International Application Publication No. WO 2017/082424 (in particular, see FIG. 17)

SUMMARY OF THE INVENTION

In this connection, in the case of a leaning vehicle that includes a double wishbone-type suspension as described above, it is desirable to suppress an increase in the size of the leaning vehicle.

Therefore, it is an object of the present teaching to, in a leaning vehicle that includes a double wishbone-type link mechanism, suppress an increase in the size of the leaning vehicle by employing a technical concept that is different from technical concepts that have been proposed heretofore.

The inventors of the present application studied novel technical concepts for suppressing an increase in the size of a leaning vehicle. The technical concept for a leaning vehicle disclosed in Patent Literature 1 is a technical concept which involves utilizing a rotary shaft of a support arm to support a leaning brake mechanism. Specifically, a brake member of the leaning brake mechanism is fixed to the rotary shaft of the support arm. Therefore, the inventors of the present application conducted studies directed at utilizing a structure other than a rotary shaft of a support arm to support a resistance force changing mechanism that corresponds to a leaning brake mechanism.

The inventors of the present application performed detailed analysis with respect to an upright state and a leaning state of a leaning vehicle, and focused on the movable range of a support arm. When the vehicle body frame is in an upright state, the support arm is disposed in the vicinity of the center of the vehicle body frame in the vehicle-body-frame left-right direction. The support arm can lean in the vehicle-body-frame leftward direction and rightward direction with respect to the vehicle body frame. Further, a double wishbone-type link mechanism includes a left arm mechanism which supports a left steerable wheel, and a right arm mechanism which supports a right steerable wheel. The left arm mechanism is disposed at a left part of the leaning vehicle. The left arm mechanism can swing in the vehicle-body-frame upward direction and downward direction with respect to the vehicle body frame. The right arm mechanism is disposed at a right part of the leaning vehicle. The right arm mechanism can swing in the vehicle-body-frame upward direction and downward direction with respect to the vehicle body frame. The phrase "left part of the leaning vehicle" refers to the left half of the leaning vehicle when the vehicle body frame is in an upright state. The phrase "right part of the leaning vehicle" refers to the right half of the leaning vehicle when the vehicle body frame is in an upright state. In the leaning vehicle described above, the movable range of the support arm is located in the vicinity of the center of the vehicle body frame in the vehicle-body-frame left-right direction. The movable range of the left arm mechanism is located to the left in the vehicle-body-frame leftward direction of the center of the vehicle body frame in the vehicle-body-frame left-right direction. The movable range of the right arm mechanism is located to the right in the vehicle-body-frame rightward direction of the center of the vehicle body frame in the vehicle-body-frame left-right direction. Consequently, it is difficult for the movable range of the support arm and the movable range of the double wishbone-type link mechanism (left arm mechanism and right arm mechanism) to overlap. Therefore, the inventors of the present application had the idea that it would be favorable to utilize the support arm to support a resistance force changing mechanism. By causing the support arm to support a part of the resistance force changing mechanism, a part of the resistance force changing mechanism can be disposed in the vicinity of the support arm while suppressing the occurrence of situation in which a part of the resistance force changing mechanism hinders operations of the link mechanism. As a result, since it is not necessary to newly secure a large space in which to dispose part of the resistance force changing mechanism, an increase in the size of the leaning vehicle is suppressed.

In addition, the support arm has high rigidity. Therefore, the inventors of the present application had the idea that the support arm can be used as a structure for supporting a part of the resistance force changing mechanism. By this means, since a structure that is conventionally used for supporting a part of the resistance force changing mechanism can be replaced with the support arm, an increase in the size of the leaning vehicle is suppressed.

To solve the problem described above, the present teaching adopts the following configurations.

(1) A leaning vehicle, including:

a vehicle body frame that leans in a leaning-vehicle leftward direction at a time of turning left, and leans in a leaning-vehicle rightward direction at a time of turning right;

a link mechanism including a left arm mechanism including: an upper-left arm member that is supported by the vehicle body frame so as to rotate about an axis extending in a vehicle-body-frame front-back direction centering on a right part of the upper-left arm member; a lower-left arm member that is disposed further downward in a vehicle-body-frame downward direction than the upper-left arm member and is supported by the vehicle body frame so as to rotate about an axis extending in the vehicle-body-frame front-back direction centering on a right part of the lower-left arm member; and a left connection member that is connected to a left part of the upper-left arm member and a left part of the lower-left arm member, wherein the left arm mechanism swings in a vehicle-body-frame upward direction when the vehicle body frame leans in the leaning-vehicle leftward direction and swings in the vehicle-body-frame downward direction when the vehicle body frame leans in the leaning-vehicle rightward direction; and a right arm mechanism including: an upper-right arm member that is supported by the vehicle body frame so as to rotate about an axis extending in the vehicle-body-frame front-back direction centering on a left part of the upper-right arm member; a lower-right arm member that is disposed further downward in the vehicle-body-frame downward direction than the upper-right arm member and is supported by the vehicle body frame so as to rotate about an axis extending in the vehicle-body-frame front-back direction centering on a left part of the lower-right arm member; and a right connection member that is connected to a right part of the upper-right arm member and a right part of the lower-right arm member, wherein the right arm mechanism swings in the vehicle-body-frame upward direction when the vehicle body frame leans in the leaning-vehicle rightward direction and swings in the vehicle-body-frame downward direction when the vehicle body frame leans in the leaning-vehicle leftward direction;

a left shock absorber having a cushioning action, with a first end part of the left shock absorber being connected to the left arm mechanism;

a right shock absorber having a cushioning action, with a first end part of the right shock absorber being connected to the right arm mechanism;

a support arm that is supported by the vehicle body frame at a center of the vehicle body frame in the vehicle-body-frame left-right direction so as to rotate around an arm central shaft extending in the vehicle-body-frame front-back direction, wherein, when the vehicle body frame is in an upright state, a second end part of the left shock absorber and a second end part of the right shock absorber are connected further upward in the vehicle-body-frame upward direction than the arm central shaft;

a left steerable wheel that is rotatably supported by the left connection member;

a right steerable wheel that is rotatably supported by the right connection member;

a steering mechanism that steers the left steerable wheel and the right steerable wheel; and a resistance force changing mechanism that includes a first-contact-member-driving-mechanism including a first contact member, and a second contact member, the resistance force changing mechanism being configured such that the first contact member and the second contact member perform relative rotational movements in response to the support arm and the vehicle body frame performing relative rotational movements, wherein the resistance force changing mechanism changes a resistance force that is applied with respect to operations in which the support arm and the vehicle body frame perform relative rotational movements, by the first-contact-member-driving-mechanism changing a contact state between the first contact member and the second contact member;

wherein the leaning vehicle has a structure of (A) or (B):

(A)

the first-contact-member-driving-mechanism is supported by the vehicle body frame, and the second contact member includes: a second-contact-member-contact-part with which the first contact member is allowed to be brought into contact; and a second-contact-member-support-part that, when the vehicle body frame is in an upright state, is supported by the support arm at a position that is further upward in the vehicle-body-frame upward direction than the arm central shaft, wherein, when seen from a vehicle-body-frame frontward direction, the second-contact-member-support-part supports the second-contact-member-contact-part so that an arm passing region and the first contact member overlap, the arm passing region being a region where a portion located between the arm central shaft in the support arm and the second end parts of the left and right shock absorbers passes through when the support arm and the vehicle body frame perform relative rotational movements; or (B)

the second contact member is supported by the vehicle body frame, and the first-contact-member-driving-mechanism further includes: a first-contact-member-driving-mechanism-main-body that supports the first contact member; and a first-contact-member-driving-mechanism-main-body-support-part that, when the vehicle body frame is in an upright state, is supported by the support arm at a position that is further upward in the vehicle-body-frame upward direction than the arm central shaft, wherein, when seen from the vehicle-body-frame frontward direction, the first-contact-member-driving-mechanism-main-body-support-part supports the first-contact-member-driving-mechanism-main-body so that an arm passing region and the second contact member overlap, the arm passing region being a region where a portion which is located between the arm central shaft in the support arm and the second end parts of the left and right shock absorbers passes through when the support arm and the vehicle body frame perform relative rotational movements.

According to the leaning vehicle of (1), an increase in the size of the leaning vehicle can be suppressed. More specifically, the support arm is supported by the vehicle body frame at the center of the vehicle body frame in the vehicle-body-frame left-right direction. The support arm can rotate around an arm central shaft that extends in the vehicle-body-frame front-back direction with respect to the vehicle body frame. Further, the left arm mechanism includes a left connection member that supports a left steerable wheel at a position that is further leftward in the vehicle-body-frame leftward direction than the center of the vehicle body frame in the vehicle-body-frame left-right direction. The left arm mechanism can swing in the vehicle-body-frame upward direction and downward direction with respect to the vehicle body frame. The right arm mechanism includes a right connection member that supports a right steerable wheel at a position that is further rightward in the vehicle-body-frame rightward direction than the center of the vehicle body frame in the vehicle-body-frame left-right direction. The right arm mechanism can swing in the vehicle-body-frame upward direction and downward direction with respect to the vehicle body frame. In the leaning vehicle of (1) configured as described above, the movable range of the support arm is located in the vicinity of the center of the vehicle body frame in the vehicle-body-frame left-right direction. The movable range of the left arm mechanism is located to the left in the vehicle-body-frame leftward direction of the center of the vehicle body frame in the vehicle-body-frame left-right direction. The movable range of the right arm mechanism is located to the right in the vehicle-body-frame rightward direction of the center of the vehicle body frame in the vehicle-body-frame left-right direction. That is, the three movable ranges are located in different directions to each other as seen from the arm central shaft. Therefore, it is difficult for the movable range of the support arm and the movable ranges of the link mechanism (left arm mechanism and right arm mechanism) to overlap.

Therefore, the leaning vehicle of (1) has the configuration of (A). More specifically, an arm passing region is a region through which a portion located between the arm central shaft in the support arm and a second end part of the left shock absorber and a second end part of the right shock absorber passes when the support arm and the vehicle body frame perform relative rotational movements. The vicinity of the arm passing region is a space in which it is difficult to dispose a structure because one part of the support arm passes through this area. However, the resistance force changing mechanism is configured such that the first contact member and the second contact member perform relative rotational movements in response to the support arm and the vehicle body frame performing relative rotational movements. Therefore, the movable range of the resistance force changing mechanism has a shape that is close to parallel with the arm passing region. Hence, it is relatively easy to put the movable range of the resistance force changing mechanism and the arm passing region near to each other. Therefore, the second-contact-member-support-part supports the second-contact-member-contact-part so that, when seen from the vehicle-body-frame frontward direction, the arm passing region and the first contact member overlap. That is, the first contact member is disposed in the vicinity of the arm passing region. Since the first contact member comes in contact with the second-contact-member-contact-part, the second-contact-member-contact-part is disposed in the vicinity of the first contact member. Thus, the second-contact-member-contact-part is disposed in the vicinity of the arm passing region in which a structure has seldom been disposed heretofore, and thus the space is effectively utilized. In addition, as seen from the vehicle-body-frame frontward direction, protruding of the first contact member by a large amount from the arm passing region is suppressed, and therefore a large space other than the vicinity of the arm passing region is not required for disposing the first contact member in. As a result, an increase in the size of the leaning vehicle of (1) is suppressed.

Further, the leaning vehicle of (1) has the configuration of (B). More specifically, an arm passing region is a region through which a portion located between the arm central shaft in the support arm and a second end part of the left shock absorber and a second end part of the right shock absorber passes when the support arm and the vehicle body frame perform relative rotational movements. The vicinity of the arm passing region is a space in which it is difficult to dispose a structure because the support arm passes through this area. However, the resistance force changing mechanism is configured such that the first contact member and the second contact member perform relative rotational movements in response to the support arm and the vehicle body frame performing relative rotational movements. Therefore, the movable range of the resistance force changing mechanism has a shape that is close to parallel with the arm passing region. Thus, it is relatively easy to put the movable range of the resistance force changing mechanism and the arm passing region near to each other. Therefore, the first-contact-member-driving-mechanism-main-body-support-part supports the first-contact-member-driving-mechanism-main-body so that, when seen from the vehicle-body-frame frontward direction, the arm passing region and the second contact member overlap. That is, the second contact member is disposed in the vicinity of the arm passing region. Since the first contact member comes in contact with the second contact member, the first-contact-member-drivingmechanism-main-body is disposed in the vicinity of the second contact member. Thus, the first-contact-member-driving-mechanism-main-body is disposed in the vicinity of the arm passing region in which a structure has seldom been disposed heretofore, and thus the space is effectively utilized. In addition, as seen from the vehicle-body-frame frontward direction, protruding of the second contact member by a large amount from the arm passing region is suppressed, and therefore a large space other than the vicinity of the arm passing region is not required for disposing the second contact member in. As a result, an increase in the size of the leaning vehicle of (1) is suppressed.

Further, in a case where the leaning vehicle of (1) has the structure of (A), an increase in the size of the leaning vehicle can be suppressed for the following reason also. The support arm has high rigidity. Therefore, in the leaning vehicle of (1), when the vehicle body frame is in an upright state, the second-contact-member-support-part is supported by the support arm at a position that is further upward in the vehicle-body-frame upward direction than the arm central shaft. Hence, the support arm supports the second contact member in a section from the arm central shaft to a portion at which the second-contact-member-support-part is supported by the support arm. By this means, at least one part of a structure for supporting the second contact member can be replaced with the existing support arm, and hence an increase in the size of the leaning vehicle is suppressed.

Further, in a case where the leaning vehicle of (1) has the structure of (B), an increase in the size of the leaning vehicle can be suppressed for the following reason also. The support arm has high rigidity. Therefore, in the leaning vehicle of (1), when the vehicle body frame is in an upright state, the first-contact-member-driving-mechanism-main-body-support-part is supported by the support arm at a position that is further upward in the vehicle-body-frame upward direction than the arm central shaft. Hence, the support arm supports the first-contact-member-driving-mechanism-main-body in a section from the arm central shaft to a portion at which the first-contact-member-driving-mechanism-main-body-support-part is supported by the support arm. By this means, at least one part of a structure for supporting the first-contact-member-driving-mechanism-main-body can be replaced with the existing support arm, and hence an increase in the size of the leaning vehicle of (1) is suppressed.

A leaning vehicle of (2) is configured in accordance with the leaning vehicle of (1), wherein:
the leaning vehicle has the structure of (A);
a position at which the support arm supports the second contact member is taken as a second-contact-member support position; and
the second-contact-member support position is disposed nearer to the second end part of the left shock absorber and the second end part of the right shock absorber than the arm central shaft is;
or,
the leaning vehicle has the structure of (B);
a position at which the support arm supports the first-contact-member-driving-mechanism is taken as a first-contact-member-driving-mechanism support position; and
the first-contact-member-driving-mechanism support position is disposed nearer to the second end part of the left shock absorber and the second end part of the right shock absorber than the arm central shaft is.

In a case where the leaning vehicle of (2) has the structure of (A), the radius of the second contact member can be increased. More specifically, in the leaning vehicle of (2), the second-contact-member support position is disposed nearer to the second end part of the left shock absorber and the second end part of the right shock absorber than the arm central shaft is. The center of the second contact member coincides with the arm central shaft. Therefore, the second contact member is supported at a position that is separated from the arm central shaft. As a result, the radius of the second contact member increases.

In a case where the leaning vehicle of (2) has the structure of (B), the radius of the second contact member can be increased. More specifically, the first-contact-member-driving-mechanism-main-body supports the first contact member that comes in contact with the second contact member. Accordingly, the distance from the arm central shaft to the first-contact-member-driving-mechanism-main-body approximately matches the radius of the second contact member. Therefore, in the leaning vehicle of (2), the first-contact-member-driving-mechanism support position is disposed nearer to the second end part of the left shock absorber and the second end part of the right shock absorber than the arm central shaft is. The center of a rotational movement of the first-contact-member-driving-mechanism coincides with the arm central shaft. Therefore, the first-contact-member-driving-mechanism is supported at a position that is separated from the arm central shaft. As a result, the radius of the second contact member increases.

A leaning vehicle of (3) is configured in accordance with the leaning vehicle of (1) or (2), wherein:
the leaning vehicle has the structure of (A);
the leaning vehicle further including:
an actuator that applies a force to the support arm and the vehicle body frame so that the support arm and the vehicle body frame perform relative rotational movements, wherein, when seen from the vehicle-body-frame frontward direction, the actuator is disposed below, in a leaning-vehicle downward direction, a second contact member passing region which the second contact member passes through when the support arm and the vehicle body frame perform relative rotational movements;
or,
the leaning vehicle has the structure of (B);
the leaning vehicle further including:
an actuator that applies a force to the support arm and the vehicle body frame so that the support arm and the vehicle body frame perform relative rotational movements, wherein, when seen from the vehicle-body-frame frontward direction, the actuator is disposed below, in the leaning-vehicle downward direction, a first-contact-member-driving-mechanism passing region which the first-contact-member-driving-mechanism passes through when the support arm and the vehicle body frame perform relative rotational movements.

In a case where the leaning vehicle of (3) has the structure of (A), the second contact member and the actuator can be arranged near to each other in the vehicle-body-frame front-back direction. More specifically, when seen from the vehicle-body-frame frontward direction, the actuator is disposed below the second contact member passing region in the leaning-vehicle downward direction. Therefore, even if the second contact member and the actuator are arranged near to each other, the second contact member does not come in contact with the actuator. As a result, the second contact member and the actuator can be arranged near to each other in the vehicle-body-frame front-back direction.

In a case where the leaning vehicle of (3) has the structure of (B), the first-contact-member-driving-mechanism and the actuator can be arranged near to each other in the vehiclebody-frame front-back direction. More specifically, when seen from the vehicle-body-frame frontward direction, the actuator is disposed below the first-contact-member-driving-mechanism passing region in the leaning-vehicle downward direction. Therefore, even if the first-contact-member-driving-mechanism and the actuator are arranged near to each other, the first-contact-member-driving-mechanism does not come in contact with the actuator. As a result, the first-contact-member-driving-mechanism and the actuator can be arranged near to each other in the vehicle-body-frame front-back direction.

A leaning vehicle of (4) is configured in accordance with the leaning vehicle of any one of (1) to (3), wherein:

the leaning vehicle has the structure of (A); and when seen from the vehicle-body-frame frontward direction, the left shock absorber and the right shock absorber overlap with a second contact member passing region through which the second contact member passes when the support arm and the vehicle body frame perform relative rotational movements;

or, the leaning vehicle has the structure of (B); and when seen from the vehicle-body-frame frontward direction, the left shock absorber and the right shock absorber overlap with a first-contact-member-driving-mechanism passing region through which the first-contact-member-driving-mechanism passes when the support arm and the vehicle body frame perform relative rotational movements.

In a case where the leaning vehicle of (4) includes the structure of (A), an increase in the size of the leaning vehicle can be suppressed. More specifically, a first end part of the left shock absorber is connected to the left arm mechanism. A second end part of the left shock absorber is connected to the support arm. Further, the second contact member is supported by the support arm. Therefore, the left shock absorber is located near to the second contact member passing region. Accordingly, when seen from the vehicle-body-frame frontward direction, the left shock absorber can be easily overlapped with the second contact member passing region. For the same reason, when seen from the vehicle-body-frame frontward direction, the right shock absorber can be easily overlapped with the second contact member passing region. As a result, an increase in the size of the leaning vehicle can be suppressed.

In a case where the leaning vehicle of (4) includes the structure of (B), an increase in the size of the leaning vehicle can be suppressed. More specifically, the first end part of the left shock absorber is connected to the left arm mechanism. The second end part of the left shock absorber is connected to the support arm. Further, the first-contact-member-driving-mechanism is supported by the support arm. Therefore, the left shock absorber is located near to the first-contact-member-driving-mechanism passing region. Accordingly, when seen from the vehicle-body-frame frontward direction, the left shock absorber can be easily overlapped with the first-contact-member-driving-mechanism passing region. For the same reason, when seen from the vehicle-body-frame frontward direction, the right shock absorber can be easily overlapped with the first-contact-member-driving-mechanism passing region. As a result, an increase in the size of the leaning vehicle can be suppressed.

A leaning vehicle of (5) is configured in accordance with the leaning vehicle of any one of (1) to (4), wherein:

the leaning vehicle has the structure of (A); and when the vehicle body frame is in an upright state, the second-contact-member-support-part supports the second-contact-member-contact-part on a line that links a portion with which the first contact member is allowed to be brought into contact in the second-contact-member-contact-part, and the arm central shaft.

According to the leaning vehicle of (5), it is easy to secure the rigidity of the second-contact-member-contact-part. In the second-contact-member-contact-part, a portion that is furthest away from the second-contact-member-support-part is referred to as a "most distant portion". When the distance between the second-contact-member-support-part and the most distant portion becomes shorter, it is easier to secure the rigidity of the second-contact-member-contact-part. The most distant portion is generally the vicinity of a maximum-left-leaning-time-contact-portion or the vicinity of a maximum-right-leaning-time-contact-portion. The term "maximum-left-leaning-time-contact-portion" refers to a portion with which the first contact member is allowed to be brought into contact in the second-contact-member-contact-part when the vehicle body frame leans to the maximum in the leaning-vehicle leftward direction. The term "maximum-right-leaning-time-contact-portion" refers to a portion with which the first contact member is allowed to be brought into contact in the second-contact-member-contact-part when the vehicle body frame leans to the maximum in the leaning-vehicle rightward direction. The distance between the second-contact-member-support-part and the maximum-right-leaning-time-contact-portion decreases as the distance between the second-contact-member-support-part and the maximum-left-leaning-time-contact-portion increases. On the other hand, the distance between the second-contact-member-support-part and the maximum-left-leaning-time-contact-portion decreases as the distance between the second-contact-member-support-part and the maximum-right-leaning-time-contact-portion increases. Accordingly, the distance between the second-contact-member-support-part and the most distant portion is shortest when the distance between the second-contact-member-support-part and the maximum-right-leaning-time-contact-portion and the distance between the second-contact-member-support-part and the maximum-left-leaning-time-contact-portion are equal. Therefore, when the vehicle body frame is in an upright state, the distance between the second-contact-member-support-part and the most distant portion becomes shortest when the second-contact-member-support-part supports the second-contact-member-contact-part on a line linking a portion with which the first contact member is allowed to be brought into contact in the second-contact-member-contact-part and the arm central shaft as in the leaning vehicle of (5). As a result, in the leaning vehicle of (5), the rigidity of the second-contact-member-contact-part can be secured.

A leaning vehicle of (6) is configured in accordance with the leaning vehicle of any one of (1) to (4), wherein:

the leaning vehicle has the structure of (B), and when seen from the vehicle-body-frame frontward direction, the first-contact-member-driving-mechanism overlaps with the support arm.

In the leaning vehicle of (6), when seen from the vehicle-body-frame frontward direction, the first-contact-member-driving-mechanism overlaps with the support arm. By this means, the length of the first-contact-member-driving-mechanism-main-body-support-part is shortened. As a result, the rigidity of the first-contact-member-driving-mechanism-main-body-support-part can be secured.

A leaning vehicle of (7) is configured in accordance with the leaning vehicle of any one of (1) to (5), wherein:

the leaning vehicle has the structure of (A), and when the vehicle body frame is in an upright state, the second-contact-member-support-part extends in the vehicle-body-frame frontward direction or backward direction from the support arm.

According to the leaning vehicle of (7), the second contact member is disposed in front of the support arm in the vehicle-body-frame frontward direction or behind the support arm in the vehicle-body-frame backward direction.

The aforementioned objects and other objects, features, aspects and advantages of the present teaching will become more apparent from the following detailed description of embodiments of the present teaching that are described in association with the attached drawings.

As used herein, the term "and/or" includes any and all combinations of one or more of the associated listed items.

It will be further understood that the terms "including", "comprising" or "having" and variations thereof when used in this specification, specify the presence of stated features, steps, operations, elements, components, and/or their equivalents but do not preclude the presence or addition of one or more other features, steps, operations, elements, components and/or groups thereof.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In describing the invention, it will be understood that a number of techniques and steps are disclosed. Each of these have individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for the purpose of explanation, numerous specific details are set forth in order to provide a thorough understanding of the present teaching. It will be evident, however, to one skilled in the art that the present teaching may be practiced without these specific details. The present disclosure is to be considered as an exemplification of the invention, and is not intended to limit the invention to the specific embodiments illustrated by the figures or description below.

Advantageous Effects of Invention

According to the present teaching, in a leaning vehicle that includes a double wishbone-type link mechanism, an increase in the size of the leaning vehicle can be suppressed by adopting a technical concept that is different from technical concepts that have been proposed heretofore.

BRIEF DESCRIPTION OF THE DRAWINGS

FIG. 2 is a multiple view drawing showing schematic diagrams of a front part of the leaning vehicle 1 as seen from an upward direction U and a frontward direction F.

FIG. 3 is a cross-sectional structural drawing along a line A-A in FIG. 2.

FIG. 7 is a view of the front part of the leaning vehicle 1 as seen from the leftward direction L.

FIG. 9 is a schematic diagram of the front part of the leaning vehicle 1 as seen from the upward direction U.

FIG. 14 is a multiple view drawing showing schematic diagrams of the front part of a leaning vehicle 1a as seen from the upward direction U and frontward direction F.

FIG. 15 is a multiple view drawing showing schematic diagrams of the front part of a leaning vehicle 1b as seen from the upward direction U and frontward direction F.

FIG. 16 is a multiple view drawing showing schematic diagrams of the front part of a leaning vehicle 1c as seen from the upward direction U and backward direction B.

FIG. 17 is a multiple view drawing showing schematic diagrams of the front part of a leaning vehicle 1d as seen from the upward direction U and backward direction B.

FIG. 18 is a multiple view drawing showing schematic diagrams of the front part of a leaning vehicle 1e as seen from the upward direction U and frontward direction F.

FIG. 23 is a view of a support arm 57a as seen from a frontward direction f.

FIG. 24 is a view of a support arm 57b as seen from the frontward direction f.

FIG. 25 is a view of a resistance force changing mechanism 8a as seen from the frontward direction f.

FIG. 26 is a view of a resistance force changing mechanism 8b as seen from a left-back direction 1b.

DETAILED DESCRIPTION

First Embodiment

[Overall Configuration]

Figure 1:
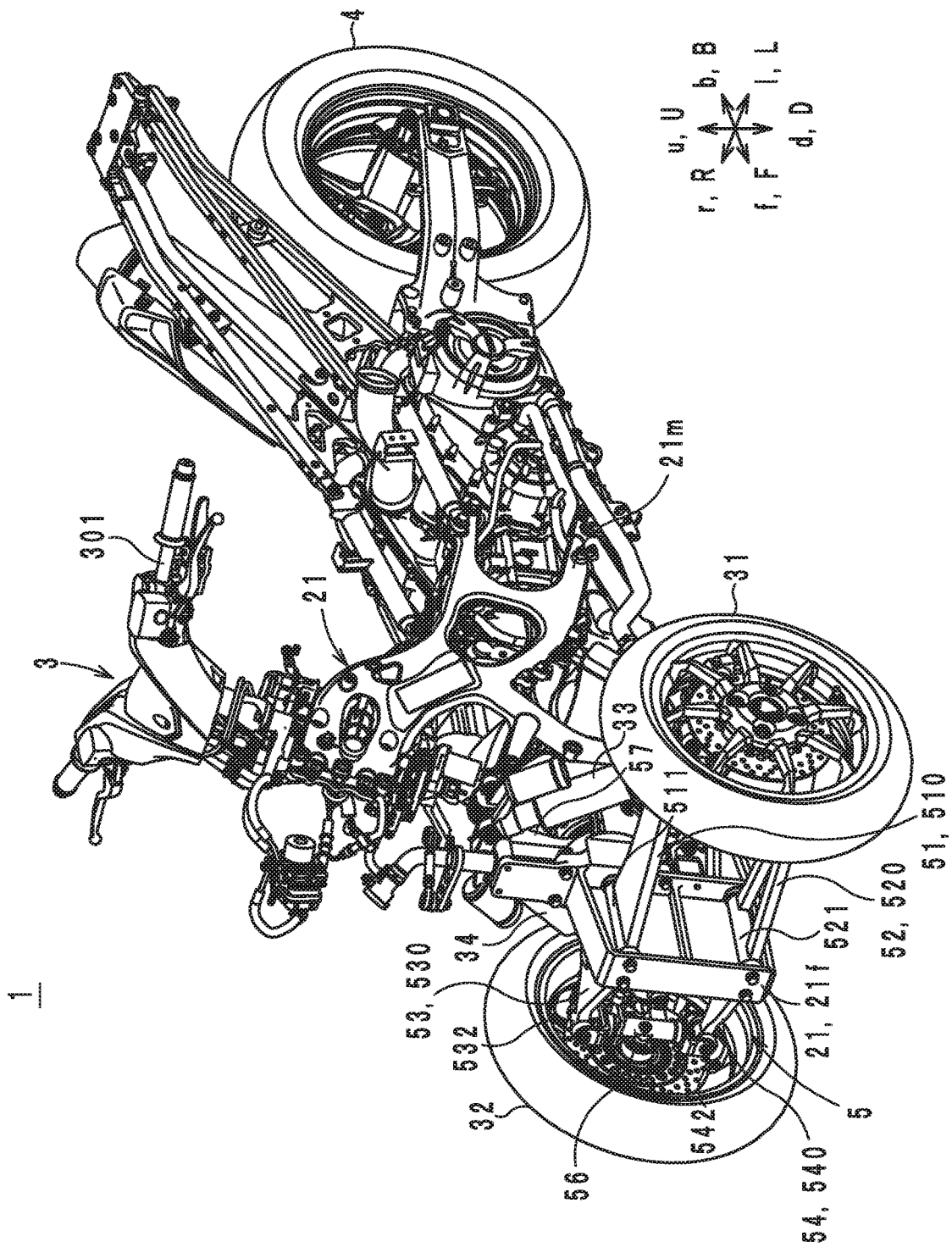
FIG. 1 is a perspective view of a leaning vehicle 1.
Figure 4:
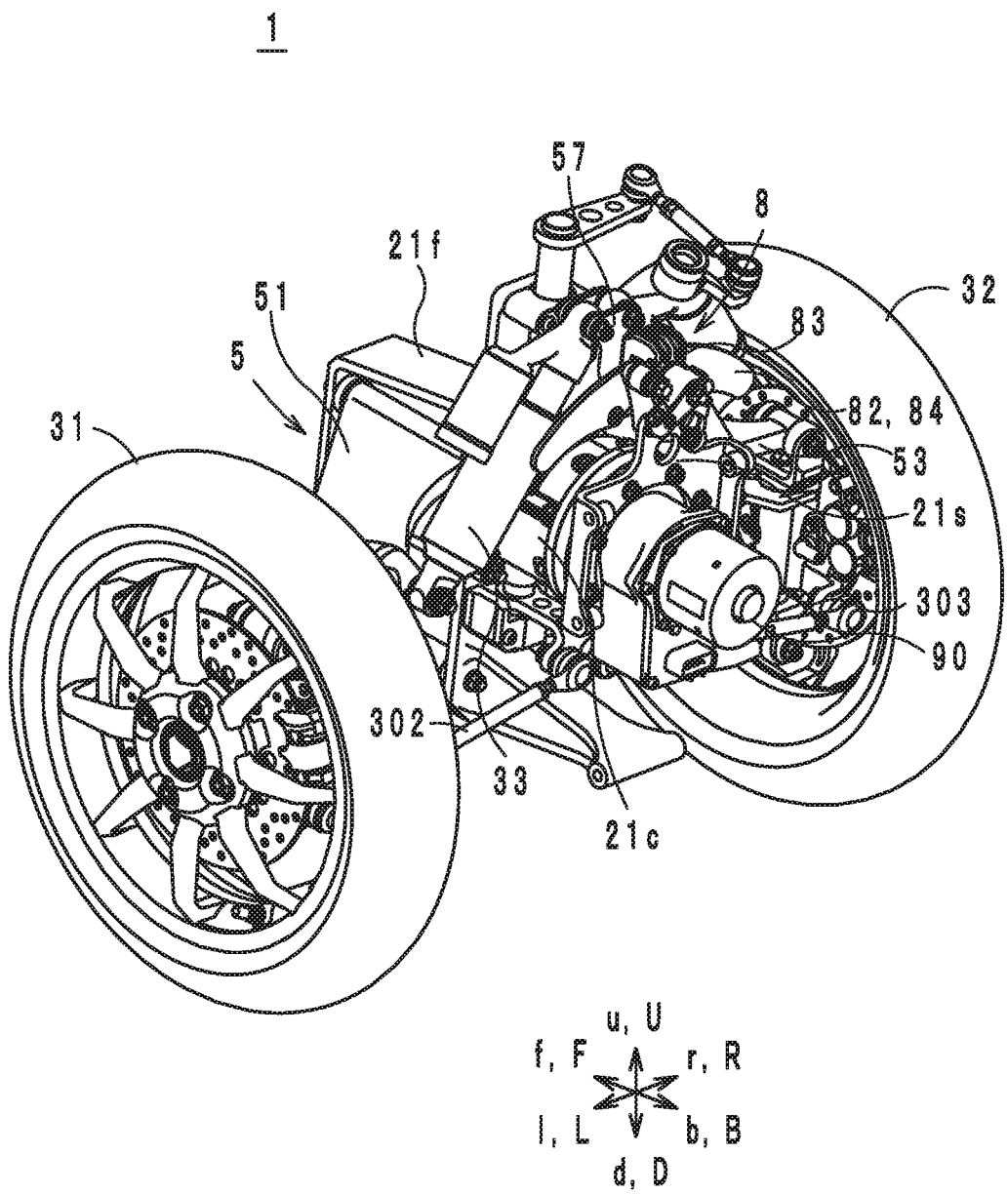
FIG. 4 is a perspective view of the front part of the leaning vehicle 1.
Figure 5:
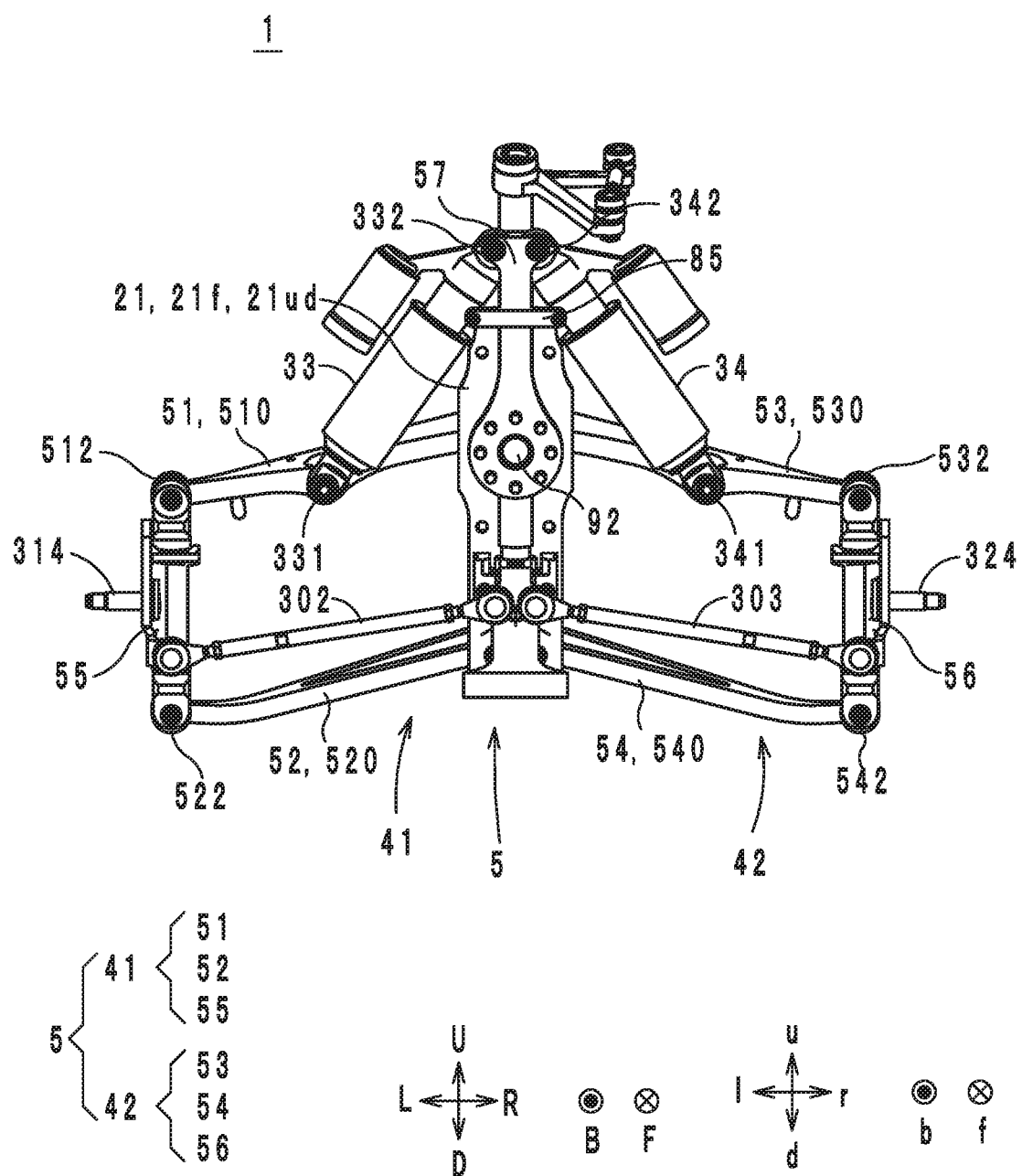
FIG. 5 is a view of the front part of the leaning vehicle 1 as seen from a backward direction B.
Figure 6:
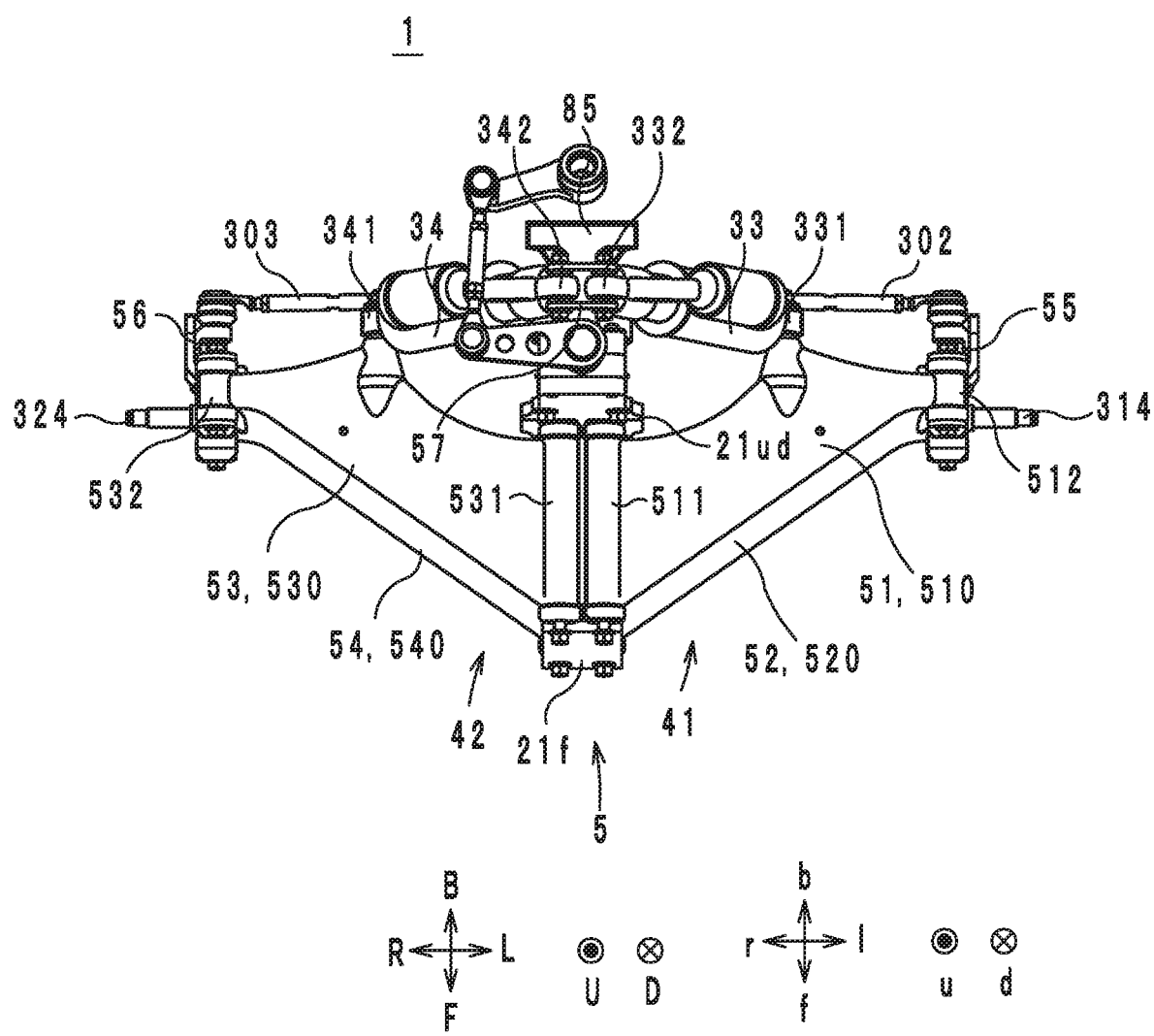
FIG. 6 is a view of the front part of the leaning vehicle 1 as seen from the upward direction U.

Hereunder, the overall configuration of a leaning vehicle 1 according to a first embodiment of the present teaching is described with reference to the accompanying drawings. In the present embodiment, a three-wheeled leaning vehicle (hereinafter, called a "leaning vehicle") having a vehicle body frame that is capable of leaning, two front wheels, and one rear wheel is described as one example of a leaning vehicle. FIG. 1 is a perspective view of the leaning vehicle 1. FIG. 2 is a multiple view drawing showing schematic diagrams of a front part of the leaning vehicle 1 as seen from an upward direction U and a frontward direction F. FIG. 3 is a cross-sectional structural drawing along a line A-A in FIG. 2. FIG. 4 is a perspective view of the front part of the leaning vehicle 1. FIG. 5 is a view of the front part of the leaning vehicle 1 as seen from a backward direction B. FIG. 6 is a view of the front part of the leaning vehicle 1 as seen from the upward direction U. FIG. 7 is a view of the front part of the leaning vehicle 1 as seen from the leftward direction L. In FIGS. 2 and 3, to facilitate understanding, schematic diagrams in which the respective components are simplified are illustrated. Therefore, the sizes of the respective components in FIGS. 2 and 3 differ from the actual sizes thereof.

Hereinafter, the leaning-vehicle (1) frontward direction is referred to as the frontward direction "F". The leaning-vehicle (1) backward direction is referred to as the backward direction "B". The leaning-vehicle (1) leftward direction is referred to as the left "L". The leaning-vehicle (1) rightward direction is referred to as the right "R". The leaning-vehicle (1) upward direction is referred to as the upward direction "U". The leaning-vehicle (1) downward direction is referred to as the downward direction "D". The leaning-vehicle (1) front-back direction is referred to as the front-back direction "FB". The leaning-vehicle (1) left-right direction is referred to as the left-right direction "LR". The leaning-vehicle (1) up-down direction is referred to as the up-down direction "UD". The leaning-vehicle (1) frontward direction refers to the direction of travel of the leaning vehicle 1. The leaning-vehicle (1) backward direction refers to the opposite direction of the direction of travel of the leaning vehicle 1. The leaning-vehicle (1) leftward direction refers to the left when taking a rider who straddles the leaning vehicle 1 as a reference. The leaning-vehicle (1) rightward direction refers to the right when taking a rider who straddles the leaning vehicle 1 as a reference. The leaning-vehicle (1) upward direction refers to the upward direction when taking a rider who straddles the leaning vehicle 1 as a reference. The leaning-vehicle (1) downward direction refers to the downward direction when taking a rider who straddles the leaning vehicle 1 as a reference.

Further, in the leaning vehicle 1, a vehicle body frame 21 can lean to the left L or the right R. In a case where the vehicle body frame 21 leans to the left L or right R, the vehicle-body-frame up-down and left-right directions do not match the leaning-vehicle up-down direction UD and the leaning-vehicle left-right direction LR, respectively. On the other hand, the vehicle-body-frame up-down and left-right directions in an upright state match the leaning-vehicle up-down direction UD and the leaning-vehicle left-right direction LR, respectively. Hereinafter, the vehicle-body-frame frontward direction is referred to as the frontward direction "f". The vehicle-body-frame backward direction is referred to as the backward direction "b". The vehicle-body-frame leftward direction is referred to as the leftward direction "l". The vehicle-body-frame rightward direction is referred to as the rightward direction "r". The vehicle-body-frame upward direction is referred to as the upward direction "u". The vehicle-body-frame downward direction is referred to as the downward direction "d". The vehicle-body-frame front-back direction is referred to as the front-back direction "fb". The vehicle-body-frame left-right direction is referred to as the left-right direction "lr". The vehicle-body-frame up-down direction is referred to as the up-down direction "ud".

Hereinafter, the term "top end" of a component means the end of the component in the upward direction. The term "bottom end" of a component means the end of the component in the downward direction. The term "front end" of a component means the end of the component in the frontward direction. The term "back end" of a component means the end of the component in the backward direction. The term "left end" of a component means the end of the component in the leftward direction. The term "right end" of a component means the end of the component in the rightward direction. The term "top end part" of a component means the top end and the vicinity of the top end of the component. The term "bottom end part" of a component means the bottom end and the vicinity of the bottom end of the component. The term "front end part" of a component means the front end and the vicinity of the front end of the component. The term "back end part" of a component means the back end and the vicinity of the back end of the component. The term "left end part" of a component means the left end and the vicinity of the left end of the component. The term "right end part" of a component means the right end and the vicinity of the right end of the component. The term "component" means the leaning vehicle 1 and a member constituting the leaning vehicle 1.

In this specification, an axis or a member extending in the front-back direction does not necessarily refer to only an axis or a member that is parallel with the front-back direction. In this specification, an axis or a member extending in the front-back direction refers to an axis or a member that is inclined within a range of ±45° with respect to the front-back direction. Similarly, herein, an axis or a member extending in the up-down direction refers to an axis or a member that is inclined within a range of ±45° with respect to the up-down direction. Likewise, herein, an axis or a member extending in the left-right direction refers to an axis or a member that is inclined within a range of ±45° with respect to the left-right direction. Further, the term "state in which the vehicle body frame 21 is upright" means a state in which the front wheel is not steering or leaning, in a state in which a rider is not riding on the leaning vehicle 1 and there is no fuel in the leaning vehicle 1.

In the present specification, the phrase "a first member is supported by a second member" includes a case in which the first member is attached to the second member so as to be immovable with respect to the second member (that is, is secured thereto), and a case in which the first member is attached to the second member so as to be movable with respect to the second member. Further, the phrase "the first member is supported by the second member" includes both of a case in which the first member is directly attached to the second member, and a case in which the first member is attached to the second member via a third member.

As illustrated in FIG. 1, the leaning vehicle 1 includes the vehicle body frame 21, a steering mechanism 3, a left front wheel 31, a right front wheel 32, a left shock absorber 33, a right shock absorber 34, a rear wheel 4, a link mechanism 5, a support arm 57 and an actuator 90 (see FIG. 2).

The vehicle body frame 21 leans to the left L when turning left. The vehicle body frame 21 leans to the right R when turning right. As illustrated in FIG. 2, the vehicle body frame 21 includes a main frame 21m (see FIG. 1), a frame front part 21f, an actuator support part 21c, and a caliper support part 21s (one example of a resistance force changing mechanism support part). The main frame 21m extends in the front-back direction fb. The main frame 21*m* supports the steering mechanism 3, a seat (not illustrated in the drawings), a power unit and the like.

The frame front part 21*f*, the actuator support part 21*c* (not illustrated in FIG. 1) and the caliper support part 21*s* (not illustrated in FIG. 1) are supported by the front end of the main frame 21*m* as illustrated in FIG. 1. The frame front part 21*f* is a plate-like member having a rectangular shape when seen from the leftward direction 1 or the rightward direction r. However, in the frame front part 21*f*, a frame-like portion is provided so as to surround a plate-like portion. The frame front part 21*f* supports the link mechanism 5 that is described later. As illustrated in FIG. 3 and FIG. 4, the actuator support part 21*c* has a cylindrical shape that has a central axis extending in the front-back direction fb. The actuator support part 21*c* extends in the backward direction from the frame front part 21*f*. As illustrated in FIG. 3 and FIG. 4, the actuator support part 21*c* supports the actuator 90 that is described later.

As illustrated in FIG. 3 and FIG. 4, the caliper support part 21*s* extends in the upward direction u from the actuator support part 21*c*. The caliper support part 21*s* is located at the center of the vehicle body frame 21 in the left-right direction lr, when seen from the frontward direction f. The caliper support part 21*s* supports a caliper 83 of a resistance force changing mechanism 8 that is described later. Therefore, when seen from the frontward direction f, the caliper 83 is also located at the center of the vehicle body frame 21 in the left-right direction lr.

The link mechanism 5 is a double wishbone-type link mechanism. As illustrated in FIG. 1 and FIG. 2, the link mechanism 5 is supported by the frame front part 21*f*. As illustrated in FIG. 2 and FIG. 5, the link mechanism 5 includes a left arm mechanism 41 and a right arm mechanism 42.

The left arm mechanism 41 swings in the upward direction u when the vehicle body frame 21 leans to the left L, and swings in the downward direction d when the vehicle body frame 21 leans to the right R. As illustrated in FIG. 2 and FIG. 5, the left arm mechanism 41 includes an upper-left arm member 51, a lower-left arm member 52 and a left knuckle 55.

As illustrated in FIG. 2, the upper-left arm member 51 is supported by the vehicle body frame 21 so as to rotate around an upper-left-arm-member right-end support shaft (not illustrated in the drawings) that extends in the front-back direction fb centering on a right part of the upper-left arm member 51. More specifically, the upper-left arm member 51 includes an upper-left-arm-member main body 510 and upper-left-arm-member supported parts 511 and 512.

The upper-left-arm-member main body 510 is a plate-like member that is substantially parallel to the horizontal plane. The upper-left-arm-member main body 510 extends in the left-right direction LR. The upper-left-arm-member supported part 511 is located at a right end part of the upper-left arm member 51. The upper-left-arm-member supported part 511 is a cylinder having a central axis extending in the front-back direction fb. Therefore, the upper-left-arm-member supported part 511 extends continuously in the front-back direction fb between a front end of the upper-left-arm-member supported part 511 and a back end of the upper-left-arm-member supported part 511. The upper-left-arm-member right-end support shaft (not illustrated in the drawings) is provided at an upper part of a left face of the frame front part 21*f*. The upper-left-arm-member right-end support shaft is fixed to the frame front part 21*f*. The upper-left-arm-member right-end support shaft penetrates through the upper-left-arm-member supported part 511 in the front-back direction fb. By this means, the upper-left arm member 51 can rotate around the upper-left-arm-member right-end support shaft. The upper-left-arm-member supported part 512 is located at a left end part of the upper-left arm member 51. The upper-left-arm-member supported part 512 is a cylinder having a central axis extending in the front-back direction fb. However, the length in the front-back direction fb of the upper-left-arm-member supported part 512 is shorter than the length in the front-back direction fb of the upper-left-arm-member supported part 511. Furthermore, as illustrated in FIG. 6, the center in the front-back direction fb of the upper-left-arm-member supported part 512 is located further backward in the backward direction b than the center in the front-back direction fb of the upper-left-arm-member supported part 511.

As illustrated in FIG. 2, the lower-left arm member 52 is disposed further downward in the downward direction d than the upper-left arm member 51. The lower-left arm member 52 is supported by the vehicle body frame 21 so as to rotate around a lower-left-arm-member right-end support shaft (not illustrated in the drawings) that extends in the front-back direction fb centering on a right part of the lower-left arm member 52. More specifically, the lower-left arm member 52 includes a lower-left-arm-member main body 520 and lower-left-arm-member supported parts 521 and 522. As illustrated in FIG. 1 and FIG. 5, the lower-left-arm-member main body 520 is a double-bar-shaped member that extends in the left-right direction LR. The lower-left-arm-member supported part 521 is located at a right end part of the lower-left arm member 52. The lower-left-arm-member supported part 521 is a cylinder having a central axis extending in the front-back direction fb. Therefore, as illustrated in FIG. 1 and FIG. 7, the lower-left-arm-member supported part 521 extends continuously in the front-back direction fb between a front end of the lower-left-arm-member supported part 521 and a back end of the lower-left-arm-member supported part 521. The lower-left-arm-member right-end support shaft (not illustrated in the drawings) is provided at a lower part of a left face of the frame front part 21*f*. The lower-left-arm-member right-end support shaft is fixed to the frame front part 21*f*. The lower-left-arm-member right-end support shaft penetrates through the lower-left-arm-member supported part 521 in the front-back direction fb. By this means, the lower-left arm member 52 can rotate around the lower-left-arm-member right-end support shaft. The lower-left-arm-member supported part 522 is located at a left end part of the lower-left arm member 52. The lower-left-arm-member supported part 522 is a cylinder having a central axis extending in the front-back direction fb. However, the length in the front-back direction fb of the lower-left-arm-member supported part 522 is shorter than the length in the front-back direction fb of the lower-left-arm-member supported part 521. Furthermore, as illustrated in FIG. 7, the center in the front-back direction fb of the lower-left-arm-member supported part 522 is located further backward in the backward direction b than the center in the front-back direction fb of the lower-left-arm-member supported part 521.

The left knuckle 55 (one example of a left connection member) is connected to a left part of the upper-left arm member 51 and a left part of the lower-left arm member 52. An upper-left-arm-member left-end support shaft (not illustrated in the drawings) that extends in the front-back direction fb is provided at an upper part of the left knuckle 55. The upper-left-arm-member left-end support shaft is fixed to the left knuckle 55. The upper-left-arm-member left-end support shaft penetrates through the upper-left-arm-member supported part 512 in the front-back direction fb. By this means, the left knuckle 55 can rotate around the upper-left-arm-member left-end support shaft. A lower-left-arm-member left-end support shaft (not illustrated in the drawings) that extends in the front-back direction fb is provided at a lower part of the left knuckle 55. The lower-left-arm-member left-end support shaft is fixed to the left knuckle 55. The lower-left-arm-member left-end support shaft penetrates through the lower-left-arm-member supported part 522 in the front-back direction fb. By this means, the left knuckle 55 can rotate around the lower-left-arm-member left-end support shaft. When the vehicle body frame 21 leans to the left L, the left knuckle 55 having the configuration described above leans to the left L while maintaining a parallel state with respect to the frame front part 21*f*. When the vehicle body frame 21 leans to the right R, the left knuckle 55 leans to the right R while maintaining a parallel state with respect to the frame front part 21*f*.

The left knuckle 55 supports the left front wheel 31. The left front wheel 31 can rotate around a left front wheel axle 314. The left front wheel axle 314 extends in the left-right direction lr. By this means, the left front wheel 31 leans to the left L together with the left knuckle 55 when the vehicle body frame 21 leans to the left L. The left front wheel 31 leans to the right R together with the left knuckle 55 when the vehicle body frame 21 leans to the right R.

The right arm mechanism 42 swings in the downward direction d when the vehicle body frame 21 leans to the left L, and swings in the upward direction u when the vehicle body frame 21 leans to the right R. As illustrated in FIG. 2 and FIG. 5, the right arm mechanism 42 includes an upper-right arm member 53, a lower-right arm member 54 and a right knuckle 56.

As illustrated in FIG. 2, the upper-right arm member 53 is supported by the vehicle body frame 21 so as to rotate around an upper-right-arm-member left-end support shaft (not illustrated in the drawings) that extends in the front-back direction fb centering on a left part of the upper-right arm member 53. More specifically, the upper-right arm member 53 includes an upper-right-arm-member main body 530 and upper-right-arm-member supported parts 531 and 532.

The upper-right-arm-member main body 530 is a plate-like member that is substantially parallel to the horizontal plane. The upper-right-arm-member main body 530 extends in the left-right direction LR. The upper-right-arm-member supported part 531 is located at a left end part of the upper-right arm member 53. The upper-right-arm-member supported part 531 is a cylinder having a central axis extending in the front-back direction fb. Therefore, the upper-right-arm-member supported part 531 extends continuously in the front-back direction fb between a front end of the upper-right-arm-member supported part 531 and a back end of the upper-right-arm-member supported part 531. The upper-right-arm-member left-end support shaft (not illustrated in the drawings) is provided at an upper part of a right face of the frame front part 21*f*. The upper-right-arm-member left-end support shaft is fixed to the frame front part 21*f*. The upper-right-arm-member left-end support shaft penetrates through the upper-right-arm-member supported part 531 in the front-back direction fb. By this means, the upper-right arm member 53 can rotate around the upper-right-arm-member left-end support shaft. The upper-right-arm-member supported part 532 is located at a right end part of the upper-right arm member 53. The upper-right-arm-member supported part 532 is a cylinder having a central axis extending in the front-back direction fb. However, the length in the front-back direction fb of the upper-right-arm-member supported part 532 is shorter than the length in the front-back direction fb of the upper-right-arm-member supported part 531. Furthermore, as illustrated in FIG. 6, the center in the front-back direction fb of the upper-right-arm-member supported part 532 is located further backward in the backward direction b than the center in the front-back direction fb of the upper-right-arm-member supported part 531.

As illustrated in FIG. 2, the lower-right arm member 54 is disposed further downward in the downward direction d than the upper-right arm member 53. The lower-right arm member 54 is supported by the vehicle body frame 21 so as to rotate around a lower-right-arm-member left-end support shaft (not illustrated in the drawings) that extends in the front-back direction fb centering on a left part of the lower-right arm member 54. More specifically, the lower-right arm member 54 includes a lower-right-arm-member main body 540 and lower-right-arm-member supported parts 541 and 542. As illustrated in FIG. 5, the lower-right-arm-member main body 540 is a double-bar-shaped member that extends in the left-right direction LR. The lower-right-arm-member supported part 541 is located at a left end part of the lower-right arm member 54. The lower-right-arm-member supported part 541 is a cylinder having a central axis extending in the front-back direction fb. Therefore, the lower-right-arm-member supported part 541 extends continuously in the front-back direction fb between a front end of the lower-right-arm-member supported part 541 and a back end of the lower-right-arm-member supported part 541. The lower-right-arm-member left-end support shaft (not illustrated in the drawings) is provided at a lower part of a right face of the frame front part 21*f*. The lower-right-arm-member left-end support shaft is fixed to the frame front part 21*f*. The lower-right-arm-member left-end support shaft penetrates through the lower-right-arm-member supported part 541 in the front-back direction fb. By this means, the lower-right arm member 54 can rotate around the lower-right-arm-member left-end support shaft. The lower-right-arm-member supported part 542 is located at a right end part of the lower-right arm member 54. The lower-right-arm-member supported part 542 is a cylinder having a central axis extending in the front-back direction fb. However, the length in the front-back direction fb of the lower-right-arm-member supported part 542 is shorter than the length in the front-back direction fb of the lower-right-arm-member supported part 541. Furthermore, the center in the front-back direction fb of the lower-right-arm-member supported part 542 is located further backward in the backward direction b than the center in the front-back direction fb of the lower-right-arm-member supported part 541.

The right knuckle 56 (one example of a right connection member) is connected to a right part of the upper-right arm member 53 and a right part of the lower-right arm member 54. An upper-right-arm-member right-end support shaft (not illustrated in the drawings) that extends in the front-back direction fb is provided at an upper part of the right knuckle 56. The upper-right-arm-member right-end support shaft is fixed to the right knuckle 56. The upper-right-arm-member right-end support shaft penetrates through the upper-right-arm-member supported part 532 in the front-back direction fb. By this means, the right knuckle 56 can rotate around the upper-right-arm-member right-end support shaft. A lower-right-arm-member right-end support shaft (not illustrated in the drawings) that extends in the front-back direction fb is provided at a lower part of the right knuckle 56. The lower-right-arm-member right-end support shaft is fixed to the right knuckle 56. The lower-right-arm-member right-end support shaft penetrates through the lower-right-arm-member supported part 542 in the front-back direction fb. By this means, the right knuckle 56 can rotate around the lower-right-arm-member right-end support shaft. When the vehicle body frame 21 leans to the left L, the right knuckle 56 having the configuration described above leans to the left L while maintaining a parallel state with respect to the frame front part 21f. When the vehicle body frame 21 leans to the right R, the right knuckle 56 leans to the right R while maintaining a parallel state with respect to the frame front part 21f.

The right knuckle 56 supports the right front wheel 32. The right front wheel 32 can rotate around a right front wheel axle 324. The right front wheel axle 324 extends in the left-right direction lr. By this means, the right front wheel 32 leans to the left L together with the right knuckle 56 when the vehicle body frame 21 leans to the left L. The right front wheel 32 leans to the right R together with the right knuckle 56 when the vehicle body frame 21 leans to the right R.

As illustrated in FIG. 2 and FIG. 6, the support arm 57 is disposed further backward in the backward direction b than the upper-left-arm-member supported part 511, the lower-left-arm-member supported part 521 (not illustrated in FIG. 6), the upper-right-arm-member supported part 531 and the lower-right-arm-member supported part 541 (not illustrated in FIG. 6). The support arm 57 is a bar-shaped member that extends in the up-down direction ud when the vehicle body frame 21 is in an upright state. Further, when seen from the frontward direction f, the support arm 57 overlaps with the caliper support part 21s. As illustrated in FIG. 2 and FIG. 3, the support arm 57 is supported by the vehicle body frame 21 at the center of the vehicle body frame 21 in the left-right direction lr so as to rotate around an arm central shaft 92 that extends in the front-back direction fb. Therefore, the arm central shaft 92 is located at the center of the vehicle body frame 21 in the left-right direction lr. The arm central shaft 92 is a rotary shaft of the actuator 90 that is described later. As illustrated in FIG. 3, the actuator 90 is supported by the actuator support part 21c. Therefore, the support arm 57 is supported by the vehicle body frame 21 through the actuator 90. Further, as illustrated in FIG. 2, in a case where the vehicle body frame 21 is in an upright state, the arm central shaft 92 is located at an upper part of the frame front part 21f when seen from the frontward direction f. Therefore, when seen from the frontward direction f, the arm central shaft 92 is located closer to the upper-left-arm-member supported part 511 and the upper-right-arm-member supported part 531 than to the lower-left-arm-member supported part 521 and the lower-right-arm-member supported part 541.

The left shock absorber 33 is a combination of a spring and a damper. The left shock absorber 33 has a first end part 331 and a second end part 332. The left shock absorber 33 can expand and contract in the longitudinal direction of the left shock absorber 33. Thus, the left shock absorber 33 has a cushioning action. As illustrated in FIG. 2 and FIG. 6, when seen from the upward direction u, the left shock absorber 33 is disposed behind the left arm mechanism 41 in the backward direction b. In a state in which the vehicle body frame 21 is upright, the left shock absorber 33 extends rectilinearly in the leftward direction l and the downward direction d from a top end part of the support arm 57. A first end part 331 of the left shock absorber 33 is connected to the left arm mechanism 41. In the present embodiment, as illustrated in FIG. 2 and FIG. 5, the first end part 331 of the left shock absorber 33 is connected to the upper-left arm member 51. The second end part 332 of the left shock absorber 33 is connected to the top end part of the support arm 57. By this means, when the support arm 57 is in an upright state, the second end part 332 of the left shock absorber 33 is connected to the support arm 57 at a position that is further upward in the upward direction u than the arm central shaft 92 of the support arm 57.

The right shock absorber 34 is a combination of a spring and a damper. The right shock absorber 34 has a first end part 341 and a second end part 342. The right shock absorber 34 can expand and contract in the longitudinal direction of the right shock absorber 34. Thus, the right shock absorber 34 has a cushioning action. As illustrated in FIG. 2 and FIG. 6, when seen from the upward direction u, the right shock absorber 34 is disposed behind the right arm mechanism 42 in the backward direction b. In a state in which the vehicle body frame 21 is upright, the right shock absorber 34 extends rectilinearly in the rightward direction r and the downward direction d from the top end part of the support arm 57. A first end part 341 of the right shock absorber 34 is connected to the right arm mechanism 42. In the present embodiment, as illustrated in FIG. 2 and FIG. 5, the first end part 341 of the right shock absorber 34 is connected to the upper-right arm member 53. The second end part 342 of the right shock absorber 34 is connected to the top end part of the support arm 57. By this means, when the support arm 57 is in an upright state, the second end part 342 of the right shock absorber 34 is connected to the support arm 57 at a position that is further upward in the upward direction u than the arm central shaft 92 of the support arm 57.

The support arm 57 extends in the up-down direction ud when the vehicle body frame 21 is in an upright state. Therefore, when the vehicle body frame 21 is in an upright state, the support arm 57 has a vertically long shape. Accordingly, as illustrated in FIG. 2 and FIG. 5, the support arm 57 has a shape in which, when the vehicle body frame 21 is in an upright state, a distance L1 in the up-down direction ud between the arm central shaft 92 and the second end part 332 of the left shock absorber 33 or between the arm central shaft 92 and the second end part 342 of the right shock absorber 34 is longer than a distance L2 in the left-right direction lr between the second end part 332 of the left shock absorber 33 and the second end part 342 of the right shock absorber 34.

In this connection, the frame front part 21f includes an up-down frame part 21ud. As illustrated in FIG. 3 and FIG. 7, the up-down frame part 21ud includes a rear face of the frame front part 21f. The up-down frame part 21ud extends in the up-down direction ud between the support arm 57 and the back end of the upper-left-arm-member supported part 511, between the support arm 57 and the back end of the upper-right-arm-member supported part 531, between the support arm 57 and the back end of the lower-left-arm-member supported part 521 and between the support arm 57 and the back end of the lower-right-arm-member supported part 541.

The actuator 90 applies a force to the support arm 57 and the vehicle body frame 21 so that the support arm 57 and the vehicle body frame 21 perform relative rotational movements. As illustrated in FIG. 3 and FIG. 4, the actuator 90 is supported by a back end of the actuator support part 21c. Based on leaning of the vehicle body frame 21 that is detected by an unshown sensor, the actuator 90 generates a force that causes the vehicle body frame 21 to lean to the left L when turning left, and generates a force that causes the vehicle body frame 21 to lean to the right R when turning right. As illustrated in FIG. 3, the actuator 90 includes the arm central shaft 92 that extends in the frontward direction f from the main body of the actuator 90.

As illustrated in FIG. 1, the steering mechanism 3 is a mechanism that is operated by a rider to steer the left front wheel 31 and the right front wheel 32. Therefore, the left front wheel 31 is a left steerable wheel. The right front wheel 32 is a right steerable wheel. The steering mechanism 3 is supported by the main frame 21*m*. As illustrated in FIG. 1, the steering mechanism 3 includes a handle 301, a left tie rod 302 (see FIG. 2 and FIG. 5) and a right tie rod 303 (see FIG. 2 and FIG. 5). The steering mechanism 3 also includes a steering member such as a steering shaft that is not illustrated in the drawings.

As illustrated in FIG. 1, the handle 301 is disposed above the front part of the main frame 21*m* in the upward direction u. When seen from the upward direction u, the handle 301 is turned counterclockwise or clockwise by the rider. The left tie rod 302 transmits the turning of the handle 301 to the left knuckle 55. As illustrated in FIG. 2 and FIG. 5, the left tie rod 302 is a bar-shaped member that extends in the left-right direction LR. A right end of the left tie rod 302 is connected to the handle 301 through a steering member such as a steering shaft that is not illustrated in the drawings. A left end of the left tie rod 302 is connected to a back part of the left knuckle 55. The right tie rod 303 transmits the turning of the handle 301 to the right knuckle 56. As illustrated in FIG. 2 and FIG. 5, the right tie rod 303 is a bar-shaped member that extends in the left-right direction LR. A left end of the right tie rod 303 is connected to the handle 301 through a steering member such as a steering shaft that is not illustrated in the drawings. A right end of the right tie rod 303 is connected to a back part of the right knuckle 56.

[Steering Operations]

Figure 8:
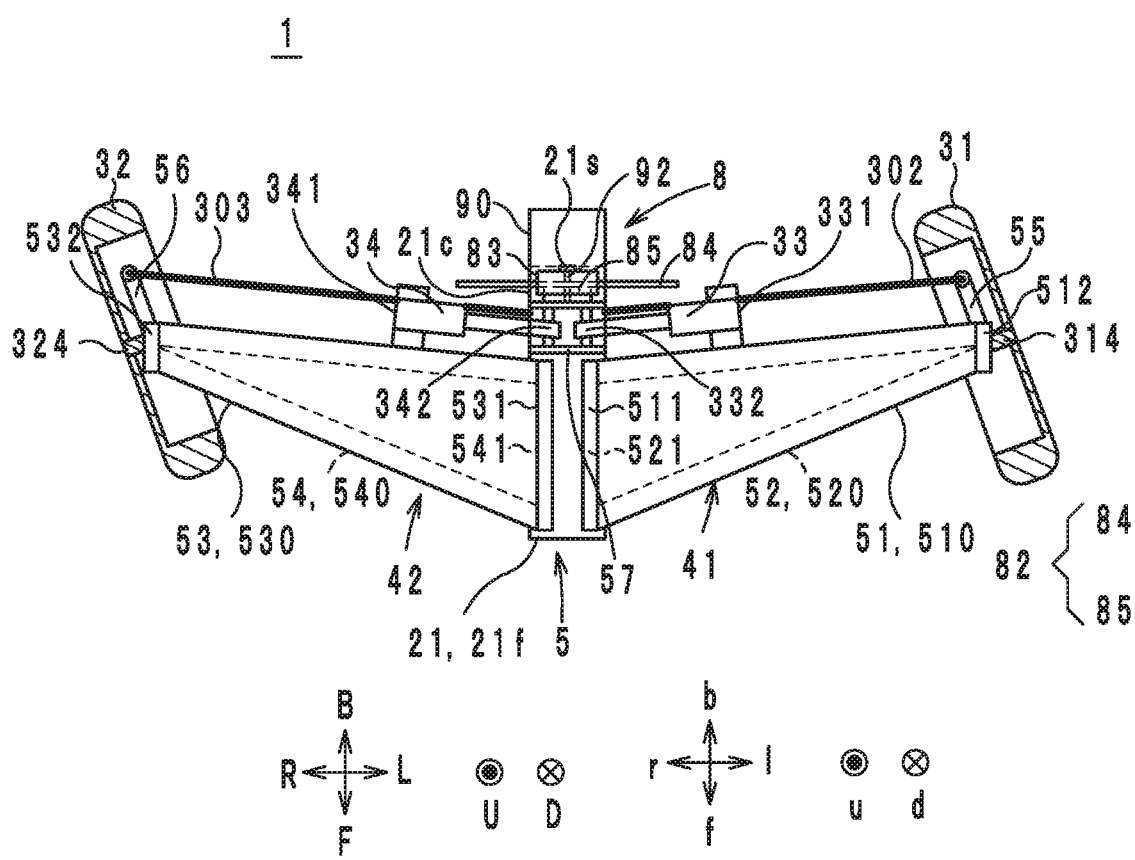
FIG. 8 is a schematic diagram of the front part of the leaning vehicle 1 as seen from the upward direction U.

Hereunder, steering operations of the leaning vehicle 1 are described with reference to FIG. 8 and FIG. 9. FIG. 8 and FIG. 9 are schematic diagrams illustrating the front part of the leaning vehicle 1 as seen from the upward direction U. FIG. 8 illustrates a state when the leaning vehicle 1 is being steered to the left. FIG. 9 illustrates a state when the leaning vehicle 1 is being steered to the right.

First, steering of the leaning vehicle 1 to the left will be described with reference to FIG. 8. When the rider turns the handle 301 (not illustrated in FIG. 8) counterclockwise as seen from the upward direction u, the left tie rod 302 moves in the rightward direction r. By this means, as seen from the upward direction u, the back part of the left knuckle 55 moves in the rightward direction r, and the left knuckle 55 and the left front wheel 31 rotate counterclockwise. In addition, as seen from the upward direction u, the right tie rod 303 moves in the rightward direction r. By this means, as seen from the upward direction u, the back part of the right knuckle 56 moves in the rightward direction r, and the right knuckle 56 and the right front wheel 32 rotate counterclockwise. By this means, the leaning vehicle 1 is steered to the left.

Next, steering of the leaning vehicle 1 to the right will be described with reference to FIG. 9. When the rider turns the handle 301 (not illustrated in FIG. 9) clockwise as seen from the upward direction u, the left tie rod 302 moves in the leftward direction l. By this means, as seen from the upward direction u, the back part of the left knuckle 55 moves in the leftward direction l, and the left knuckle 55 and the left front wheel 31 rotate clockwise. In addition, as seen from the upward direction u, the right tie rod 303 moves in the leftward direction l. By this means, as seen from the upward direction u, the back part of the right knuckle 56 moves in the leftward direction l, and the right knuckle 56 and the right front wheel 32 rotate clockwise. By this means, the leaning vehicle 1 is steered to the right.

[Leaning Operations]

Figure 10:
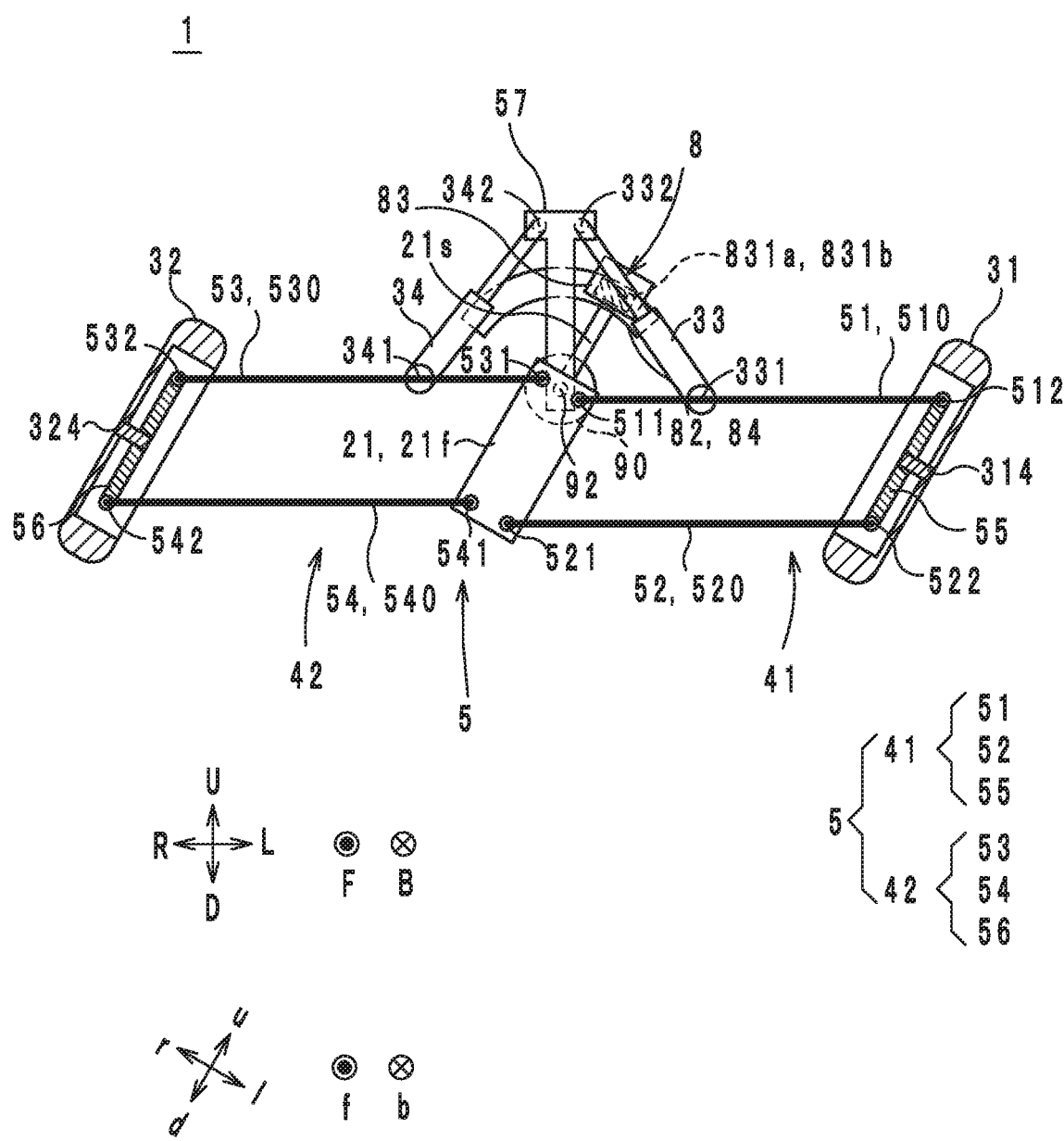
FIG. 10 is a schematic diagram of the front part of the leaning vehicle 1 as seen from the frontward direction F.
Figure 11:
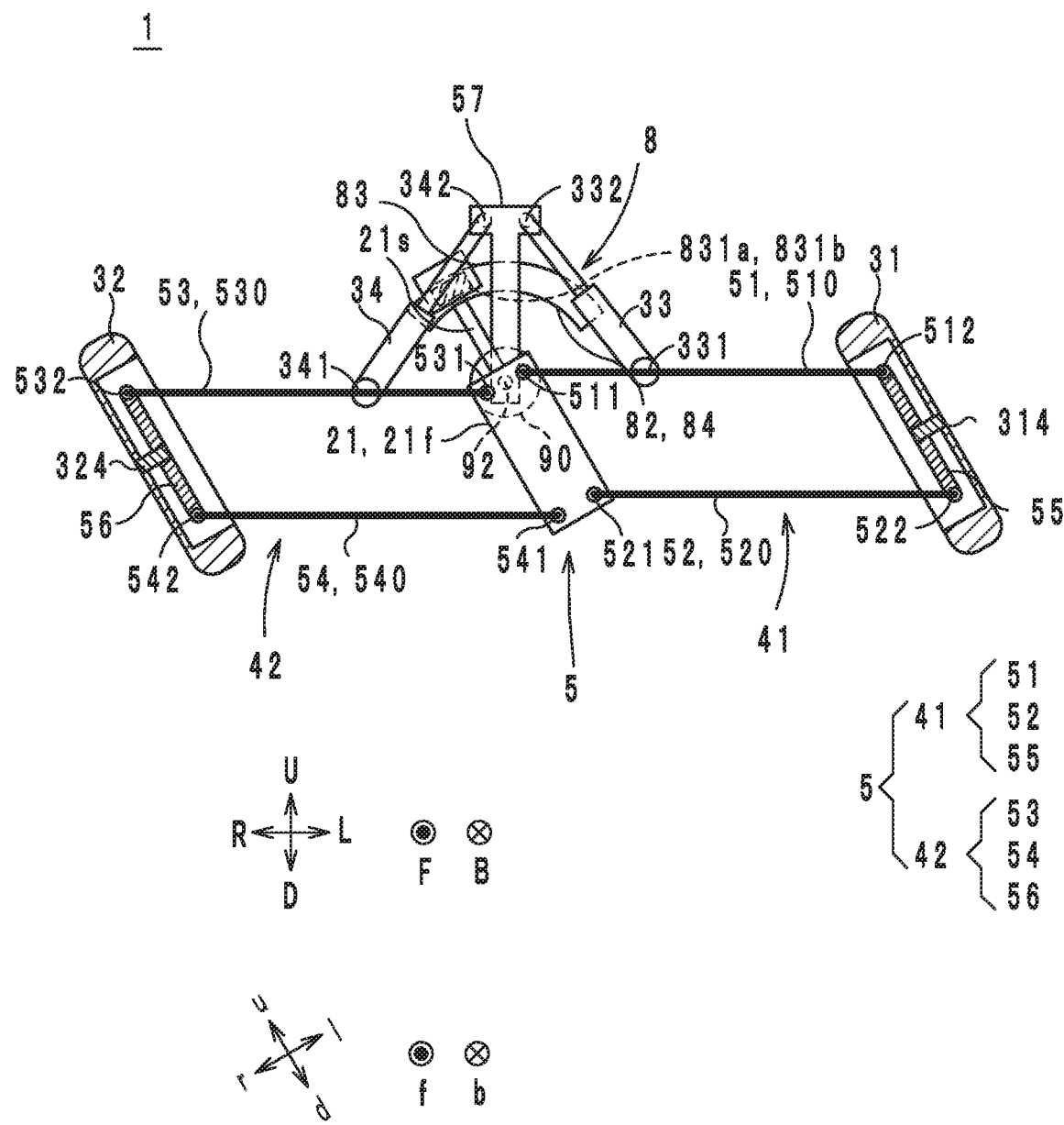
FIG. 11 is a schematic diagram of the front part of the leaning vehicle 1 as seen from the frontward direction F.

Next, leaning operations of the leaning vehicle 1 will be described with reference to FIG. 10 and FIG. 11. FIG. 10 and FIG. 11 are schematic diagrams illustrating the front part of the leaning vehicle 1 as seen from the frontward direction F. FIG. 10 illustrates a state when the vehicle body frame 21 is leaning to the left L. FIG. 11 illustrates a state when the vehicle body frame 21 is leaning to the right R.

First, an operation whereby the vehicle body frame 21 leans to the left L will be described with reference to FIG. 10. When the rider causes the vehicle body frame 21 to lean to the left L, the frame front part 21*f* leans to the left L. Based on leaning of the vehicle body frame 21 that is detected by an unshown sensor, the actuator 90 generates a force that causes the vehicle body frame 21 to lean to the left L. When the frame front part 21*f* leans to the left L, the left arm mechanism 41 swings in the upward direction u. When the left arm mechanism 41 swings in the upward direction u, the left knuckle 55 changes its position in the upward direction u while maintaining a parallel state with respect to the frame front part 21*f*. Accordingly, the left knuckle 55 leans to the left L together with the vehicle body frame 21. As a result, the left front wheel 31 leans to the left L together with the left knuckle 55.

Further, when the frame front part 21*f* leans to the left L, the right arm mechanism 42 swings in the downward direction d. When the right arm mechanism 42 swings in the downward direction d, the right knuckle 56 changes its position in the downward direction d while maintaining a parallel state with respect to the frame front part 21*f*. Accordingly, the right knuckle 56 leans to the left L together with the vehicle body frame 21. As a result, the right front wheel 32 leans to the left L together with the right knuckle 56.

However, the left shock absorber 33 and the right shock absorber 34 try to maintain the same length as the length when the vehicle body frame 21 is in an upright state (that is, the length when in the state illustrated in FIG. 2). Therefore, the support arm 57 does not lean to the left L, and extends in the up-down direction UD.

Next, an operation whereby the vehicle body frame 21 leans to the right R will be described with reference to FIG. 11. When the rider causes the vehicle body frame 21 to lean to the right R, the frame front part 21*f* leans to the right R. Based on leaning of the vehicle body frame 21 that is detected by an unshown sensor, the actuator 90 generates a force that causes the vehicle body frame 21 to lean to the right R. When the frame front part 21*f* leans to the right R, the left arm mechanism 41 swings in the downward direction d. When the left arm mechanism 41 swings in the downward direction d, the left knuckle 55 changes its position in the downward direction d while maintaining a parallel state with respect to the frame front part 21*f*. Accordingly, the left knuckle 55 leans to the right R together with the vehicle body frame 21. As a result, the left front wheel 31 leans to the right R together with the left knuckle 55.

Further, when the frame front part 21*f* leans to the right R, the right arm mechanism 42 swings in the upward direction u. When the right arm mechanism 42 swings in the upward direction u, the right knuckle 56 changes its position in the upward direction u while maintaining a parallel state with respect to the frame front part 21*f*. Accordingly, the right knuckle 56 leans to the right R together with the vehicle body frame 21. As a result, the right front wheel 32 leans to the right R together with the right knuckle 56.

However, the left shock absorber 33 and the right shock absorber 34 try to maintain the same length as the length when the vehicle body frame 21 is in an upright state (that is, the length when in the state illustrated in FIG. 2). Therefore, the support arm 57 does not lean to the right R, and extends in the up-down direction UD.

[Resistance Force Changing Mechanism]

Figure 12:
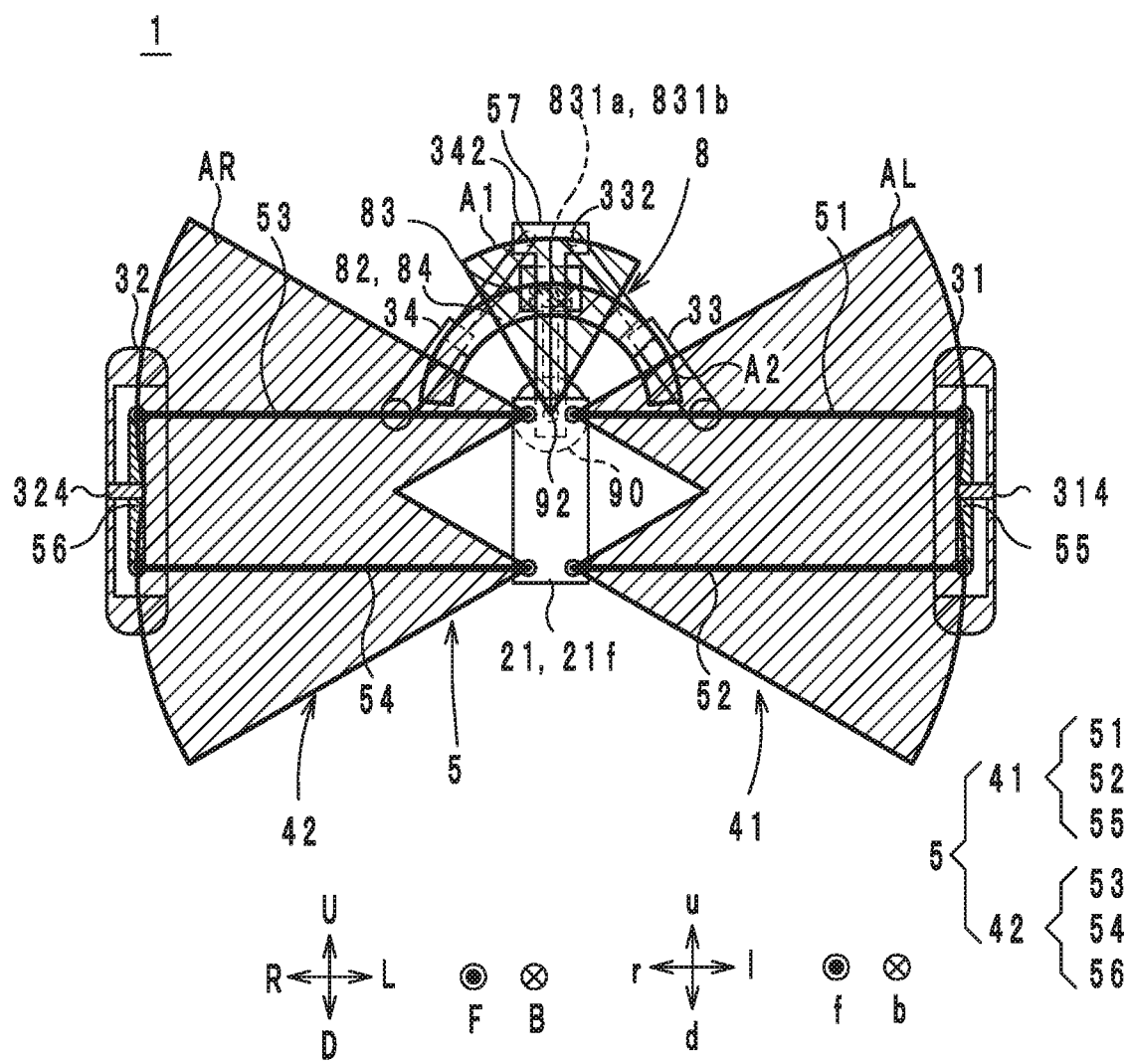
FIG. 12 is a schematic diagram of the front part of the leaning vehicle 1 as seen from the frontward direction F.
Figure 13:
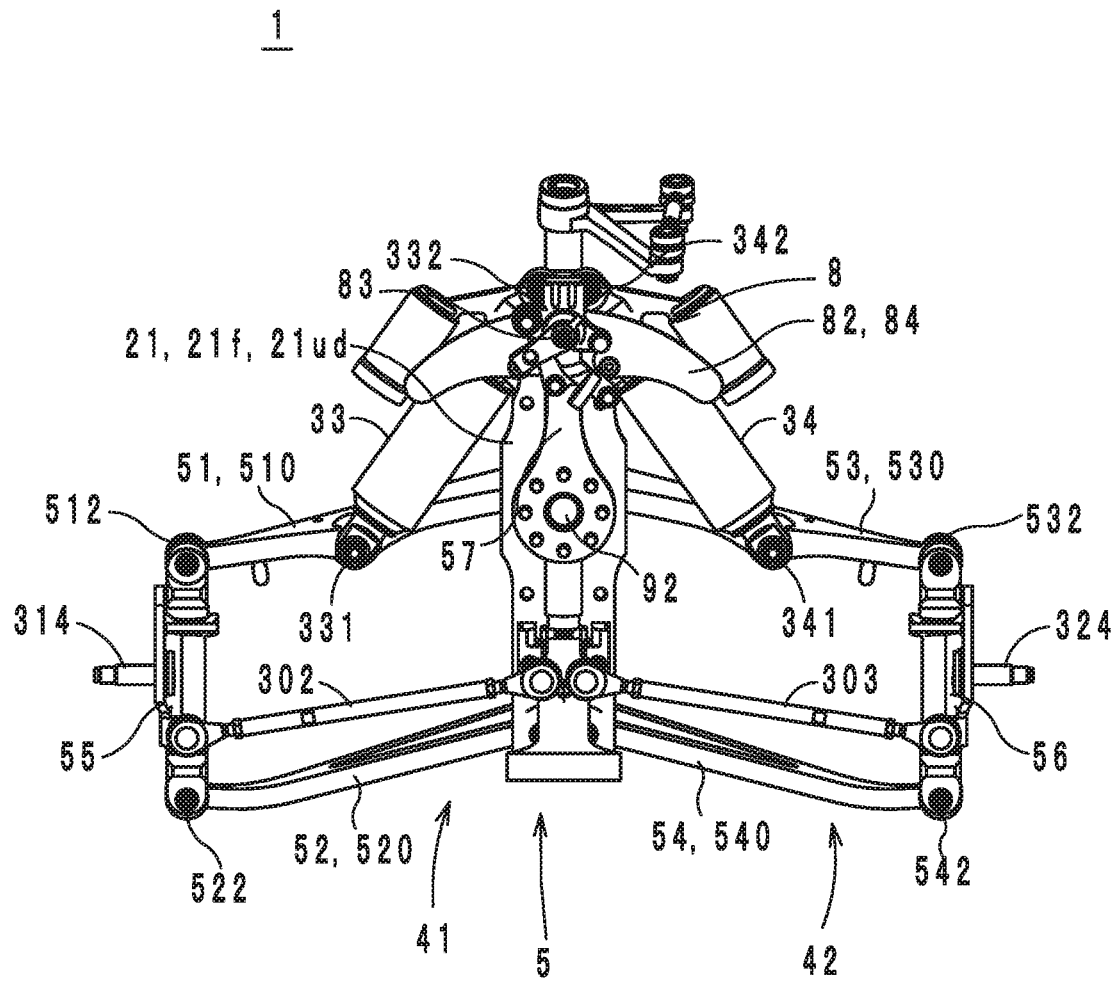
FIG. 13 is a view of the front part of the leaning vehicle 1 as seen from the backward direction B.

Next, the resistance force changing mechanism 8 will be described with reference to FIG. 3, FIG. 12 and FIG. 13. FIG. 12 is a schematic diagram of the front part of the leaning vehicle 1 as seen from the frontward direction F. FIG. 13 is a view of the front part of the leaning vehicle 1 as seen from the backward direction B.

As illustrated in FIG. 12 and FIG. 13, the leaning vehicle 1 includes the resistance force changing mechanism 8. The resistance force changing mechanism 8 is configured to change a resistance force that is applied with respect to operations in which the vehicle body frame 21 and the support arm 57 perform relative rotational movements. As illustrated in FIG. 3, as seen from the upward direction u, the resistance force changing mechanism 8 is provided at a position that is behind the support arm 57 in the backward direction b and is in front of the actuator 90 in the frontward direction f.

As illustrated in FIG. 12 and FIG. 13, the resistance force changing mechanism 8 includes a disk 82 and the caliper 83. The disk 82 includes a disk contact part 84 and a disk support part 85 (see FIG. 3). As illustrated in FIG. 12 and FIG. 13, the disk contact part 84 (one example of a second-contact-member-contact-part) is disposed behind the support arm 57 in the backward direction b. The disk contact part 84 is a plate-like member having a circular arc shape that projects in the upward direction u as seen from the backward direction b. Further, the central axis of the circular arc of the disk contact part 84 coincides with the arm central shaft 92. When the vehicle body frame 21 is in an upright state, the disk contact part 84 has a bilaterally symmetrical shape as seen from the frontward direction f.

As illustrated in FIG. 3, when the vehicle body frame 21 is in an upright state, the disk support part 85 (one example of a second-contact-member-support-part) is supported by the support arm 57 at a position that is further upward in the upward direction u than the arm central shaft 92. Further, when the vehicle body frame 21 is in an upright state, the disk support part 85 is supported by the support arm 57 at a position that is further downward in the downward direction d than the second end part 332 of the left shock absorber 33 and the second end part 342 of the right shock absorber 34. As illustrated in FIG. 3, FIG. 4 and FIG. 7, the disk support part 85 extends in the backward direction b from a rear face of the support arm 57. The disk support part 85 supports the disk contact part 84 at a back end of the disk support part 85. Thus, the disk contact part 84 is disposed behind the support arm 57 in the backward direction b.

Further, as illustrated in FIG. 3, in the support arm 57, a position at which the front end of the disk support part 85 contacts the support arm 57 is defined as "disk support position PD" (one example of a second-contact-member support position). The disk support position PD is a position at which the support arm 57 supports the disk 82. As illustrated in FIG. 3, the disk support position PD is disposed nearer to the second end part 332 of the left shock absorber 33 and the second end part 342 of the right shock absorber 34 than the arm central shaft 92 is.

As illustrated in FIG. 3, the caliper 83 (one example of a first-contact-member-driving-mechanism) is supported by the top end of the caliper support part 21s of the vehicle body frame 21. Further, as illustrated in FIG. 2 and FIG. 3, the caliper 83 includes pads 831a and 831b (one example of a first contact member). The vehicle body frame 21 is rotatable with respect to the support arm 57. Therefore, when seen from the frontward direction f, the pads 831a and 831b and the disk contact part 84 perform relative rotational movements in response to the support arm 57 and the vehicle body frame 21 performing relative rotational movements. In the present embodiment, the caliper 83 can change its position so as to follow an arc-shaped trajectory along the disk contact part 84.

The pad 831a is disposed in front of the disk contact part 84 in the frontward direction f. The pad 831b is disposed behind the disk contact part 84 in the backward direction b. An outer edge of the pad 831a and an outer edge of the pad 831b overlap so as to coincide with each other as seen from the backward direction b. The pads 831a and 831b are made from a high friction material. The pads 831a and 831b can change their positions in the front-back direction fb so that a space between the pad 831a and the pad 831b changes in accordance with operation of a switch or a lever, not illustrated in the drawings, by the rider. The source of power for the change in position of the pads 831a and 831b may be hydraulic pressure, may be an electric motor or may be human power. In a state in which the space between the pad 831a and the pad 831b is relatively small, the pad 831a contacts a front face of the disk contact part 84, and the pad 831b contacts a rear face of the disk contact part 84. At such time, the caliper 83 holds the disk 82. A state in which the caliper 83 is holding the disk 82 is a locked state. In the locked state, leaning of the vehicle body frame 21 to the left L or the right R is inhibited. In contrast, in a state in which the space between the pad 831a and the pad 831b is relatively large, the pad 831a does not contact the front face of the disk contact part 84, and the pad 831b does not contact the rear face of the disk contact part 84. At such time, the caliper 83 does not hold the disk 82. A state in which the caliper 83 is not holding the disk 82 is an unlocked state. In the unlocked state, leaning of the vehicle body frame 21 to the left L or the right R is not inhibited.

Next, the positions of the disk contact part 84 and the pads 831a and 831b will be described in further detail. First, as illustrated in FIG. 12, a region through which a portion located between the arm central shaft 92 of the support arm 57 and the second end part 332 of the left shock absorber 33 and the second end part 342 of the right shock absorber 34 passes when the support arm 57 and the vehicle body frame 21 perform relative rotational movements is defined as "arm passing region A1". The arm passing region A1 is located above the arm central shaft 92 in the upward direction u when seen from the frontward direction f. Further, when seen from the frontward direction f, the arm passing region A1 has a fan shape that centers on the arm central shaft 92. When seen from the frontward direction f, the arm passing region A1 has a bilaterally symmetrical shape.

The disk support part 85 (not illustrated in FIG. 12) supports the disk contact part 84 so that, as illustrated in FIG. 12, the arm passing region A1 and the pads 831a and 831b overlap when seen from the frontward direction f. More specifically, when seen from the frontward direction f, the pads 831a and 831b are disposed at the center of the vehicle body frame 21 in the left-right direction lr. Further, when seen from the frontward direction f, the arm passing region A1 is disposed at the center of the vehicle body frame 21 in the left-right direction lr. In addition, the arm passing region A1 has a bilaterally symmetrical shape when seen from the frontward direction f. Therefore, when seen from the frontward direction f, the pads 831a and 831b overlap with the center in the left-right direction lr of the arm passing region A1.

The disk support part 85 supports the disk contact part 84 so that even when the support arm 57 and the vehicle body frame 21 rotate relatively, the pads 831a and 831b can contact the disk contact part 84. Therefore, in a case where the vehicle body frame 21 is in an upright state, when seen from the frontward direction f, the disk contact part 84 is supported by the disk support part 85 at the center in the left-right direction lr of the disk contact part 84. In addition, in a case where the vehicle body frame 21 is in an upright state, when seen from the frontward direction f, the disk contact part 84 has a bilaterally symmetrical shape. Therefore, in a case where the vehicle body frame 21 is in an upright state, when seen from the frontward direction f, the pads 831a and 831b overlap with the center in the left-right direction lr of the disk contact part 84. In addition, when the vehicle body frame 21 is in an upright state, the left end of the disk contact part 84 projects in the leftward direction l from the arm passing region A1. When the vehicle body frame 21 is in an upright state, the right end of the disk contact part 84 projects in the rightward direction r from the arm passing region A1. Thus, even in a case where the vehicle body frame 21 leans to the left L or the right R, the pads 831a and 831b can contact the disk contact part 84. Because the disk support part 85 supports the disk contact part 84 as described above, the arm passing region A1 and the pads 831a and 831b overlap when seen from the frontward direction f.

Further, when the vehicle body frame 21 is in an upright state, the disk support part 85 supports the disk contact part 84 on a line that links a portion with which the pads 831a and 831b are allowed to be brought into contact in the disk contact part 84 and the arm central shaft 92. More specifically, when the vehicle body frame 21 is in an upright state, the pads 831a and 831b overlap with the center in the left-right direction lr of the disk contact part 84, when seen from the frontward direction f. In addition, when the vehicle body frame 21 is in an upright state, as seen from the frontward direction f, the disk contact part 84 is supported by the disk support part 85 at the center in the left-right direction lr of the disk contact part 84.

Furthermore, as illustrated in FIG. 12, a region through which the disk 82 passes when the support arm 57 and the vehicle body frame 21 perform relative rotational movements is defined as "disk passing region A2" (one example of a second contact member passing region). The disk passing region A2 has a circular arc shape centering on the arm central shaft 92 when seen from the frontward direction f. When seen from the frontward direction f, the disk passing region A2 has a bilaterally symmetrical shape. The left shock absorber 33 and the right shock absorber 34 overlap with the disk passing region A2 when seen from the frontward direction f.

Further, as illustrated in FIG. 12, when seen from the frontward direction f, the actuator 90 is disposed below the disk passing region A2 in the downward direction D. More specifically, when seen from the frontward direction f, the actuator 90 overlaps with a bottom end part of the support arm 57. The disk contact part 84 is supported by the disk support part 85 above the arm central shaft 92 of the support arm 57. Therefore, when seen from the frontward direction f, the disk passing region A2 is located above the actuator 90 in the upward direction U. Hence, when seen from the frontward direction f, the actuator 90 is disposed below the disk passing region A2 in the downward direction D.

[Action of Resistance Force Changing Mechanism]

Next, the action of the resistance force changing mechanism 8 will be described with reference to FIG. 10 and FIG. 11.

First, the action of the resistance force changing mechanism 8 when the vehicle body frame 21 leans to the left L will be described with reference to FIG. 10. When the rider causes the vehicle body frame 21 to lean to the left L, the frame front part 21f leans to the left L. The disk 82 is fixed to the support arm 57. On the other hand, the caliper 83 is fixed to the caliper support part 21s of the vehicle body frame 21. Therefore, as illustrated in FIG. 10, as seen from the frontward direction f, the caliper 83 rotates clockwise with respect to the disk 82.

Next, the action of the resistance force changing mechanism 8 when the vehicle body frame 21 leans to the right R will be described with reference to FIG. 11. When the rider causes the vehicle body frame 21 to lean to the right R, the frame front part 21f leans to the right R. The disk 82 is fixed to the support arm 57. On the other hand, the caliper 83 is fixed to the caliper support part 21s of the vehicle body frame 21. Therefore, as illustrated in FIG. 11, as seen from the frontward direction f, the caliper 83 rotates counterclockwise with respect to the disk 82.

In this connection, if an unshown switch or lever provided in the handle 301 is operated by the rider during an operation in which the disk 82 and the caliper 83 perform relative rotational movements, the pad 831a contacts the front face of the disk contact part 84, and the pad 831b contacts the rear face of the disk contact part 84. As a result, a frictional force arises between the disk contact part 84 and the pads 831a and 831b, and a resistance force that is applied with respect to an operation whereby the disk 82 and the caliper 83 perform relative rotational movements increases. The disk 82 is fixed to the support arm 57. The caliper 83 is fixed to the caliper support part 21s. Accordingly, when the resistance force that is applied with respect to an operation whereby the disk 82 and the caliper 83 perform relative rotational movements increases, a resistance force that is applied with respect to an operation whereby the vehicle body frame 21 and the support arm 57 perform relative rotational movements also increases. In other words, a resistance force that is applied with respect to operations whereby the upper-left arm member 51, the lower-left arm member 52, the upper-right arm member 53 and the lower-right arm member 54 and the vehicle body frame 21 are relatively displaced increases. As described above, the resistance force changing mechanism 8 is configured such as to change a resistance force that is applied with respect to operations whereby the vehicle body frame 21 and a plurality of link members (the upper-left arm member 51, the lower-left arm member 52, the upper-right arm member 53 and the lower-right arm member 54) are relatively displaced, by changing a contact state between the pads 831a and 831b and the disk 82. Note that, the phrase "a contact state between the pads 831a and 831b and the disk 82 changes" means that the size of a normal force that is generated between the pads 831a and 831b and the disk 82 changes. The phrase "a contact state between the pads 831a and 831b and the disk 82 changes" includes a case where the size of a normal force generated between the pads 831a and 831b and the disk 82 changes from a value larger than 0 to 0, and a case where the size of a normal force generated between the pads 831a and 831b and the disk 82 changes from 0 to a value larger than 0. A state in which the size of a normal force generated between the pads 831a and 831b and the disk 82 is 0 is a state in which the pads 831a and 831b and the disk 82 are not contacting each other.

[Effects]

According to the leaning vehicle 1, an increase in the size of the leaning vehicle 1 can be suppressed. More specifically, the support arm 57 is supported by the vehicle body frame 21 at the center of the vehicle body frame 21 in the left-right direction lr. The support arm 57 can rotate around the arm central shaft 92 that extends in the front-back direction fb with respect to the vehicle body frame 21. Further, the left arm mechanism 41 includes the left knuckle 55 that supports the left front wheel 31 at a position that is further leftward in the leftward direction l than the center of the vehicle body frame 21 in the left-right direction lr. The left arm mechanism 41 can swing in the upward direction u and in the downward direction d with respect to the vehicle body frame 21. The right arm mechanism 42 includes the right knuckle 56 that supports the right front wheel 32 at a position that is further rightward in the rightward direction r than the center of the vehicle body frame 21 in the left-right direction lr. The right arm mechanism 42 can swing in the upward direction u and in the downward direction d with respect to the vehicle body frame 21. In the leaning vehicle 1 configured as described above, as illustrated in FIG. 12, the movable range of the support arm 57 (the arm passing region A1) is located in the vicinity of the center of the vehicle body frame 21 in the left-right direction lr. Note that the arm passing region A1 does not completely match the movable range of the support arm 57. However, since the arm passing region A1 approximately matches the movable range of the support arm 57, for convenience of description the arm passing region A1 and the movable range of the support arm 57 are described as being the same. As illustrated in FIG. 12, a movable range AL of the left arm mechanism 41 is located in the leftward direction l from the center of the vehicle body frame 21 in the left-right direction lr. A movable range AR of the right arm mechanism 42 is located in the rightward direction r from the center of the vehicle body frame 21 in the left-right direction lr. That is, the movable range of the support arm 57, the movable range AL and the movable range AR are located in different directions as seen from the arm central shaft 92. Therefore, it is difficult for the movable range of the support arm 57 and the movable ranges AL and AR to overlap.

Therefore, the leaning vehicle 1 has the structure described below. More specifically, the vicinity of the arm passing region A1 is a space in which it is difficult to dispose a structure because the support arm 57 passes through that space. However, the resistance force changing mechanism 8 is configured such that the pads 831a and 831b and the disk 82 perform relative rotational movements in response to the support arm 57 and the vehicle body frame 21 performing relative rotational movements. Therefore, the movable range of the resistance force changing mechanism 8 has a shape that is close to parallel with the arm passing region A1. Hence, it is relatively easy to put the movable range of the resistance force changing mechanism 8 and the arm passing region A1 near to each other. Therefore, the disk support part 85 is supported by the support arm 57 and supports the disk contact part 84 so that, when seen from the frontward direction f, the arm passing region A1 and the pads 831a and 831b overlap. That is, the pads 831a and 831b are disposed in the vicinity of the arm passing region A1. Since the pads 831a and 831b come in contact with the disk contact part 84, the disk contact part 84 is disposed in the vicinity of the pads 831a and 831b. Thus, the disk contact part 84 is disposed in the vicinity of the arm passing region A1 which is a region in which a structure has seldom been disposed heretofore, and thus the space is effectively utilized. In addition, when seen from the frontward direction f, since protrusion of the pads 831a and 831b by a large amount from the arm passing region A1 is suppressed, a large space in an area other than the vicinity of the arm passing region A1 is not required for disposing the pads 831a and 831b in. As a result, an increase in the size of the leaning vehicle 1 is suppressed.

Further, according to the leaning vehicle 1, for the reason described below also, an increase in the size of the leaning vehicle 1 can be suppressed. The support arm 57 has high rigidity. Therefore, in the leaning vehicle 1, when the vehicle body frame 21 is in an upright state, the disk support part 85 is supported by the support arm 57 at a position that is further upward in the upward direction u than the arm central shaft 92. Hence, in a section from the arm central shaft 92 to a portion at which the disk support part 85 is supported by the support arm 57, the support arm 57 supports the disk 82. By this means, at least one part of a structure for supporting the disk 82 can be replaced with the existing support arm 57, and hence an increase in the size of the leaning vehicle 1 is suppressed.

Further, according to the leaning vehicle 1, the radius of the disk 82 can be enlarged. More specifically, in the leaning vehicle 1, as illustrated in FIG. 3, the disk support position PD is disposed nearer to the second end part 332 of the left shock absorber 33 and the second end part 342 of the right shock absorber 34 than the arm central shaft 92 is. The center of the disk 82 coincides with the arm central shaft 92. Therefore, the disk 82 is supported at a position that is separated from the arm central shaft 92. As a result, the radius of the disk 82 increases.

According to the leaning vehicle 1, the disk 82 and the actuator 90 can be arranged near to each other in the front-back direction fb. More specifically, when seen from the frontward direction f, the actuator 90 is disposed below the disk passing region A2 in the downward direction D. Therefore, even if the disk 82 and the actuator 90 are arranged near to each other, the disk 82 and the actuator 90 do not come in contact. Therefore, the disk 82 and the actuator 90 can be arranged near to each other in the front-back direction fb.

Further, according to the leaning vehicle 1, an increase in the size of the leaning vehicle 1 can be suppressed. More specifically, the first end part 331 of the left shock absorber 33 is connected to the left arm mechanism 41. The second end part 332 of the left shock absorber 33 is connected to the support arm 57. Further, the disk 82 is supported by the support arm 57. Therefore, the left shock absorber 33 is disposed near to the disk passing region A2. Accordingly, when seen from the frontward direction f, the left shock absorber 33 can be easily overlapped with the disk passing region A2. For the same reason, when seen from the frontward direction f, the right shock absorber 34 can be easily overlapped with the disk passing region A2. As a result, an increase in the size of the leaning vehicle 1 can be suppressed.

Further, according to the leaning vehicle 1, it is easy to secure the rigidity of the disk contact part 84. In the disk contact part 84, a portion that is furthest away from the disk support part 85 is referred to as a "most distant portion". When the distance between the disk support part 85 and the most distant portion becomes shorter, it is easier to secure the rigidity of the disk contact part 84. The most distant portion is generally the vicinity of a maximum-left-leaningtime-contact-portion or the vicinity of a maximum-right-leaning-time-contact-portion. The term "maximum-left-leaning-time-contact-portion" refers to a portion with which the pads 831*a* and 831*b* are allowed to be brought into contact in the disk contact part 84 when the vehicle body frame 21 leans to the maximum to the left L. The term "maximum-right-leaning-time-contact-portion" refers to a portion with which the pads 831*a* and 831*b* are allowed to be brought into contact in the disk contact part 84 when the vehicle body frame 21 leans to the maximum to the right R. The distance between the disk support part 85 and the maximum-right-leaning-time-contact-portion decreases as the distance between the disk support part 85 and the maximum-left-leaning-time-contact-portion increases. On the other hand, the distance between the disk support part 85 and the maximum-left-leaning-time-contact-portion decreases as the distance between the disk support part 85 and the maximum-right-leaning-time-contact-portion increases. Accordingly, the distance between the disk support part 85 and the most distant portion is shortest when the distance between the disk support part 85 and the maximum-right-leaning-time-contact-portion and the distance between the disk support part 85 and the maximum-left-leaning-time-contact-portion are equal. Therefore, when the vehicle body frame 21 is in an upright state, the distance between the disk support part 85 and the most distant portion becomes shortest when the disk support part 85 supports the disk contact part 84 on a line linking a portion with which the pads 831*a* and 831*b* are allowed to be brought into contact in the disk contact part 84 and the arm central shaft 92 as in the leaning vehicle 1. As a result, in the leaning vehicle 1, the rigidity of the disk contact part 84 can be secured.

[First Modification]

Hereinafter, a leaning vehicle 1*a* according to a first modification will be described with reference to FIG. 14. FIG. 14 is a multiple view drawing showing schematic diagrams of a front part of the leaning vehicle 1*a* as seen from the upward direction U and the frontward direction F. In FIG. 14, to facilitate understanding, schematic diagrams in which the respective components are simplified are illustrated. Therefore, the sizes of the respective components in FIG. 14 differ from the actual sizes thereof. Further, in FIG. 14, a part of the upper-left arm member 51 and a part of the upper-right arm member 53 are not shown, and instead a part of the lower-left arm member 52 and the lower-right arm member 54 are shown.

The leaning vehicle 1*a* differs from the leaning vehicle 1 in the following respects: the first end part 331 of the left shock absorber 33 is connected to the lower-left arm member 52; the first end part 341 of the right shock absorber 34 is connected to the lower-right arm member 54; and the resistance force changing mechanism 8 and the actuator 90 are disposed at a lower part of the frame front part 21*f*. Because the resistance force changing mechanism 8 and the actuator 90 are disposed at a lower part of the frame front part 21*f*, when seen from the frontward direction f, the actuator 90 and the arm central shaft 92 are disposed in the vicinity of the lower-left-arm-member supported part 521 and the lower-right-arm-member supported part 541. Furthermore, when seen from the frontward direction f, the disk 82 and the caliper 83 are disposed in the vicinity of the upper-left-arm-member supported part 511 and the upper-right-arm-member supported part 531. The other components of the leaning vehicle 1*a* are the same as in the leaning vehicle 1, and hence a description thereof is omitted here.

According to the leaning vehicle 1*a* configured as described above, for the same reasons as the reasons described with respect to the leaning vehicle 1, an increase in the size of the leaning vehicle 1*a* can be suppressed. Further, according to the leaning vehicle 1*a*, for the same reason as the reason described with respect to the leaning vehicle 1, the radius of the disk 82 can be increased. Furthermore, according to the leaning vehicle 1*a*, for the same reason as the reason described with respect to the leaning vehicle 1, the disk 82 and the actuator 90 can be arranged near to each other in the front-back direction fb. In addition, according to the leaning vehicle 1*a*, for the same reason as the reason described with respect to the leaning vehicle 1, it is easy to secure the rigidity of the disk contact part 84.

[Second Modification]

Hereinafter, a leaning vehicle 1*b* according to a second modification will be described with reference to FIG. 15. FIG. 15 is a multiple view drawing showing schematic diagrams of a front part of the leaning vehicle 1*b* as seen from the upward direction U and the frontward direction F. In FIG. 15, to facilitate understanding, schematic diagrams in which the respective components are simplified are illustrated. Therefore, the sizes of the respective components in FIG. 15 differ from the actual sizes thereof.

The leaning vehicle 1*b* differs from the leaning vehicle 1*a* in the respect that a width in the front-back direction fb of the upper-left arm member 51 and a width in the front-back direction fb of the upper-right arm member 53 are narrow. Therefore, in the leaning vehicle 1*b*, a length between the front end and back end of the upper-left-arm-member supported part 511 is less than a length between the front end and back end of the lower-left-arm-member supported part 521. Further, a length between the front end and back end of the upper-right-arm-member supported part 531 is less than a length between the front end and back end of the lower-right-arm-member supported part 541. The other components of the leaning vehicle 1*b* are the same as in the leaning vehicle 1*a*, and hence a description thereof is omitted here.

According to the leaning vehicle 1*b* configured as described above, for the same reasons as the reasons described with respect to the leaning vehicle 1*a*, an increase in the size of the leaning vehicle 1*b* can be suppressed. Further, according to the leaning vehicle 1*b*, for the same reason as the reason described with respect to the leaning vehicle 1*a*, the radius of the disk 82 can be increased. Furthermore, according to the leaning vehicle 1*b*, for the same reason as the reason described with respect to the leaning vehicle 1*a*, the disk 82 and the actuator 90 can be arranged near to each other in the front-back direction fb. In addition, according to the leaning vehicle 1*b*, for the same reason as the reason described with respect to the leaning vehicle 1*a*, it is easy to secure the rigidity of the disk contact part 84.

[Third Modification]

Hereinafter, a leaning vehicle 1*c* according to a third modification will be described with reference to FIG. 16. FIG. 16 is a multiple view drawing showing schematic diagrams of a front part of the leaning vehicle 1*c* as seen from the upward direction U and the backward direction B. In FIG. 16, to facilitate understanding, schematic diagrams in which the respective components are simplified are illustrated. Therefore, the sizes of the respective components in FIG. 16 differ from the actual sizes thereof.

The leaning vehicle 1*c* differs from the leaning vehicle 1 in the respect that the left shock absorber 33, the right shock absorber 34, the support arm 57, the resistance force changing mechanism 8 and the actuator 90 are disposed further forward in the frontward direction f than the upper-left-armmember supported part 511, the upper-right-arm-member supported part 531, the lower-left-arm-member supported part 521 and the lower-right-arm-member supported part 541. Therefore, the disk contact part 84 is disposed in front of the support arm 57. Accordingly, when the vehicle body frame 21 is in an upright state, the disk support part 85 extends in the frontward direction f from the support arm 57. The other components of the leaning vehicle 1c are the same as in the leaning vehicle 1, and hence a description thereof is omitted here.

According to the leaning vehicle 1c configured as described above, for the same reasons as the reasons described with respect to the leaning vehicle 1, an increase in the size of the leaning vehicle 1c can be suppressed. Further, according to the leaning vehicle 1c, for the same reason as the reason described with respect to the leaning vehicle 1, the radius of the disk 82 can be increased. Furthermore, according to the leaning vehicle 1c, for the same reason as the reason described with respect to the leaning vehicle 1, the disk 82 and the actuator 90 can be arranged near to each other in the front-back direction fb. In addition, according to the leaning vehicle 1c, for the same reason as the reason described with respect to the leaning vehicle 1, it is easy to secure the rigidity of the disk contact part 84.

[Fourth Modification]

Hereinafter, a leaning vehicle 1d according to a fourth modification will be described with reference to FIG. 17. FIG. 17 is a multiple view drawing showing schematic diagrams of a front part of the leaning vehicle 1d as seen from the upward direction U and the backward direction B. In FIG. 17, to facilitate understanding, schematic diagrams in which the respective components are simplified are illustrated. Therefore, the sizes of the respective components in FIG. 17 differ from the actual sizes thereof.

The leaning vehicle 1d differs from the leaning vehicle 1a in the respect that the left shock absorber 33, the right shock absorber 34, the support arm 57, the resistance force changing mechanism 8 and the actuator 90 are disposed further forward in the frontward direction f than the upper-left-arm-member supported part 511, the upper-right-arm-member supported part 531, the lower-left-arm-member supported part 521 and the lower-right-arm-member supported part 541. Therefore, the disk contact part 84 is disposed in front of the support arm 57. Accordingly, when the vehicle body frame 21 is in an upright state, the disk support part 85 extends in the frontward direction f from the support arm 57. The other components of the leaning vehicle 1d are the same as in the leaning vehicle 1a, and hence a description thereof is omitted here.

According to the leaning vehicle 1d configured as described above, for the same reasons as the reasons described with respect to the leaning vehicle 1a, an increase in the size of the leaning vehicle 1d can be suppressed. Further, according to the leaning vehicle 1d, for the same reason as the reason described with respect to the leaning vehicle 1a, the radius of the disk 82 can be increased. Furthermore, according to the leaning vehicle 1d, for the same reason as the reason described with respect to the leaning vehicle 1a, the disk 82 and the actuator 90 can be arranged near to each other in the front-back direction fb. In addition, according to the leaning vehicle 1d, for the same reason as the reason described with respect to the leaning vehicle 1a, it is easy to secure the rigidity of the disk contact part 84.

[Fifth Modification]

Hereinafter, a leaning vehicle 1e according to a fifth modification will be described with reference to FIG. 18. FIG. 18 is a multiple view drawing showing schematic diagrams of a front part of the leaning vehicle 1e as seen from the upward direction U and the frontward direction F. In FIG. 18, to facilitate understanding, schematic diagrams in which the respective components are simplified are illustrated. Therefore, the sizes of the respective components in FIG. 18 differ from the actual sizes thereof.

The leaning vehicle 1e differs from the leaning vehicle 1 in the respect that the leaning vehicle 1e does not include the actuator 90. The other components of the leaning vehicle 1e are the same as in the leaning vehicle 1, and hence a description thereof is omitted here.

According to the leaning vehicle 1e configured as described above, for the same reasons as the reasons described with respect to the leaning vehicle 1, an increase in the size of the leaning vehicle 1e can be suppressed. Further, according to the leaning vehicle 1e, for the same reason as the reason described with respect to the leaning vehicle 1, the radius of the disk 82 can be increased. In addition, according to the leaning vehicle 1e, for the same reason as the reason described with respect to the leaning vehicle 1, it is easy to secure the rigidity of the disk contact part 84.

Second Embodiment

[Overall Configuration]

Figure 19:
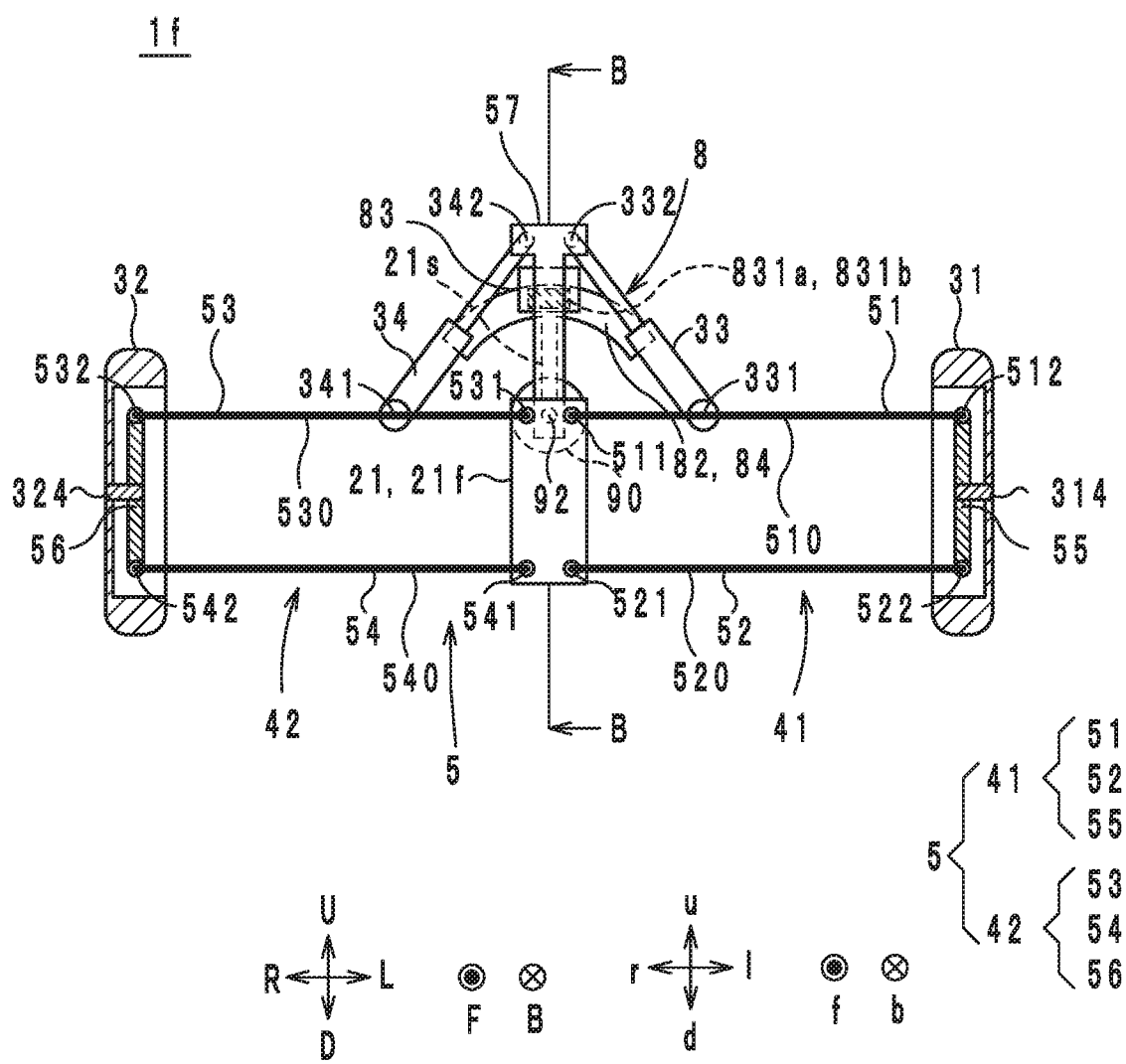
FIG. 19 is a schematic diagram of the front part of a leaning vehicle if as seen from the frontward direction F.
Figure 20:
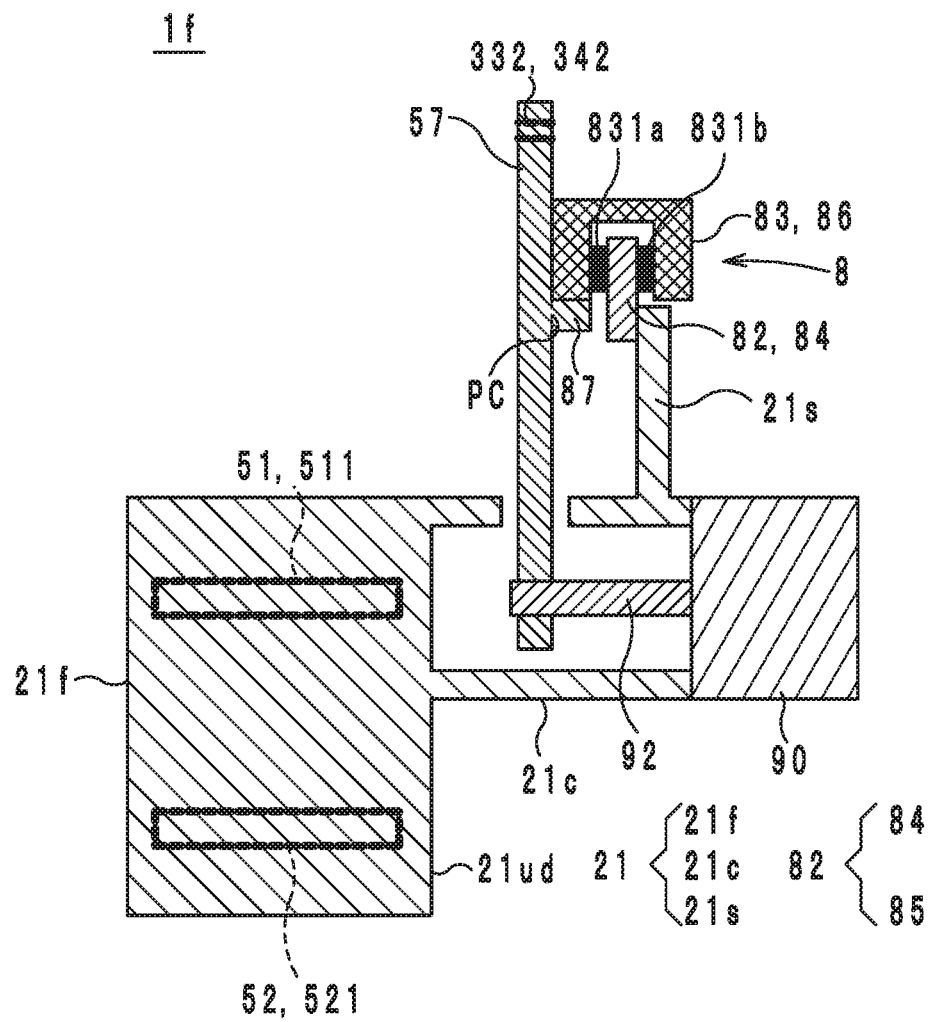
FIG. 20 is a cross-sectional structural drawing along a line B-B in FIG. 19.
Figure 21:
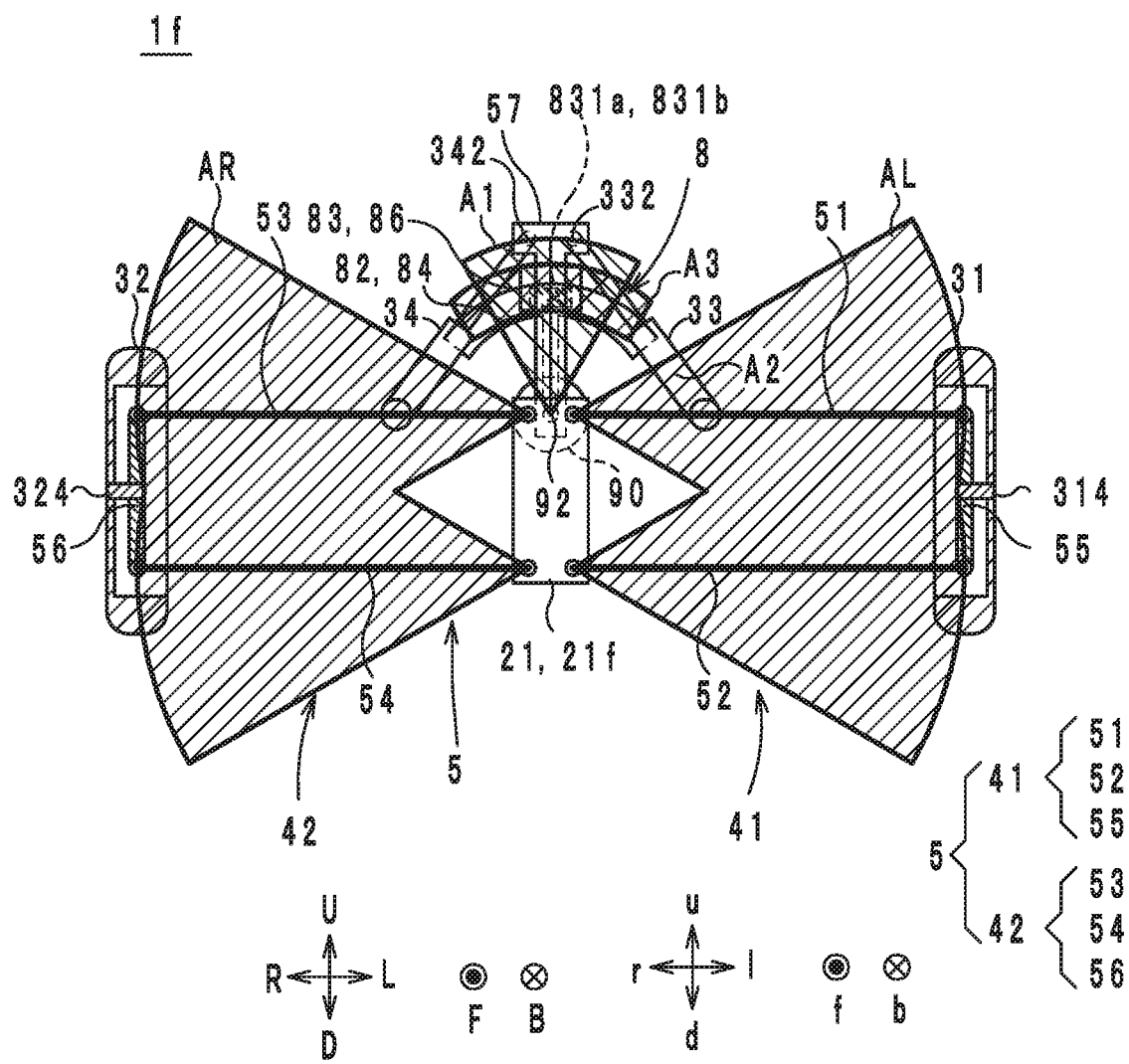
FIG. 21 is a schematic diagram of the front part of the leaning vehicle 1f as seen from the frontward direction F.

Hereinafter, a leaning vehicle 1f according to a second embodiment of the present teaching will be described with reference to the accompanying drawings. FIG. 19 is a schematic diagram of the front part of the leaning vehicle if as seen from the frontward direction F. FIG. 20 is a cross-sectional structural drawing along a line B-B in FIG. 19. FIG. 21 is a schematic diagram of the front part of the leaning vehicle if as seen from the frontward direction F. In FIG. 19, FIG. 20 and FIG. 21, to facilitate understanding, a schematic diagram in which the respective components are simplified is illustrated. Therefore, the sizes of the respective components in FIG. 19, FIG. 20 and FIG. 21 differ from the actual sizes thereof.

The leaning vehicle if differs from the leaning vehicle 1 in the arrangement of the disk 82 and the caliper 83. Specifically, in the leaning vehicle 1, the disk 82 is supported by the support arm 57. Further, in the leaning vehicle 1, the caliper 83 is supported by the vehicle body frame 21. In contrast, in the leaning vehicle 1f, the disk 82 is supported by the vehicle body frame 21. Further, in the leaning vehicle 1f, the caliper 83 is supported by the support arm 57.

The disk 82 includes the disk contact part 84. The disk contact part 84 is supported by the caliper support part 21s of the vehicle body frame 21.

As illustrated in FIG. 20, the caliper 83 includes a caliper main body 86, a caliper-main-body-support-part 87, and the pads 831a and 831b. The caliper main body 86 (one example of a first-contact-member-driving-mechanism-main-body) supports the pads 831a and 831b. The caliper main body 86 is disposed behind the support arm 57 in the backward direction b.

When the vehicle body frame 21 is in an upright state, the caliper-main-body-support-part 87 (one example of a first-contact-member-driving-mechanism-main-body-support-part) is supported by the support arm 57 at a position that is further upward in the upward direction u than the arm central shaft 92. Further, when the vehicle body frame 21 is in an upright state, the caliper-main-body-support-part 87 is supported by the support arm 57 at a position that is further downward in the downward direction d than the second end part 332 of the left shock absorber 33 and the second end part 342 of the right shock absorber 34. As illustrated in FIG. 20, the caliper-main-body-support-part 87 extends in the backward direction b from the rear face of the support arm 57. The caliper-main-body-support-part 87 supports the caliper main body 86 at the top face of the caliper-main-body-support-part 87. Thus, the caliper main body 86 is disposed behind the support arm 57 in the backward direction b.

Further, as illustrated in FIG. 20, in the support arm 57, a position at which the front end of the caliper-main-body-support-part 87 contacts the support arm 57 is defined as "caliper support position PC" (one example of a first-contact-member-driving-mechanism support position). The caliper support position PC is a position at which the support arm 57 supports the caliper 83. As illustrated in FIG. 20, the caliper support position PC is disposed nearer to the second end part 332 of the left shock absorber 33 and the second end part 342 of the right shock absorber 34 than the arm central shaft 92 is. The pads 831a and 831b of the leaning vehicle if are the same as the pads 831a and 831b of the leaning vehicle 1, and hence a description thereof is omitted here.

Next, the positions of the disk contact part 84 and the caliper main body 86 will be described in more detail. The arm passing region A1 of the leaning vehicle if is the same as the arm passing region A1 of the leaning vehicle 1, and hence a description thereof is omitted here.

As illustrated in FIG. 21, when seen from the frontward direction f, the caliper-main-body-support-part 87 supports the caliper main body 86 so that the arm passing region A1 and the disk contact part 84 overlap. More specifically, when seen from the frontward direction f, the disk contact part 84 is disposed at the center of the vehicle body frame 21 in the left-right direction lr. Further, when seen from the frontward direction f, the arm passing region A1 is disposed at the center of the vehicle body frame 21 in the left-right direction lr. In addition, the arm passing region A1 has a bilaterally symmetrical shape when seen from the frontward direction f. Therefore, when seen from the frontward direction f, the disk contact part 84 overlaps with the center in the left-right direction lr of the arm passing region A1.

The caliper-main-body-support-part 87 (not illustrated in FIG. 21) supports the caliper main body 86 so that even when the support arm 57 and the vehicle body frame 21 rotate relatively, the pads 831a and 831b can contact the disk contact part 84. Therefore, in a case where the vehicle body frame 21 is in an upright state, when seen from the frontward direction f, the caliper main body 86 overlaps with the support arm 57. In the present embodiment, in a case where the vehicle body frame 21 is in an upright state, the caliper main body 86 is supported by the support arm 57 behind the support arm 57 in the backward direction b. In addition, in a case where the vehicle body frame 21 is in an upright state, when seen from the frontward direction f, the disk contact part 84 has a bilaterally symmetrical shape. Therefore, in a case where the vehicle body frame 21 is in an upright state, when seen from the frontward direction f, the pads 831a and 831b overlap with the center in the left-right direction lr of the disk contact part 84. In addition, when the vehicle body frame 21 is in an upright state, the left end of the disk contact part 84 projects in the leftward direction 1 from the arm passing region A1. When the vehicle body frame 21 is in an upright state, the right end of the disk contact part 84 projects in the rightward direction r from the arm passing region A1. Thus, even in a case where the vehicle body frame 21 leans to the left L or the right R, the pads 831a and 831b can contact the disk contact part 84. Because the caliper-main-body-support-part 87 supports the caliper main body 86 as described above, the arm passing region A1 and the disk contact part 84 overlap when seen from the frontward direction f.

Further, in a case where the vehicle body frame 21 is in an upright state, the caliper-main-body-support-part 87 supports the caliper main body 86 so that the caliper main body 86 overlaps with the support arm 57 when seen from the frontward direction f. Thus, in a case where the vehicle body frame 21 is in an upright state, when seen from the frontward direction f, the pads 831a and 831b overlap with the center in the left-right direction lr of the disk contact part 84.

As illustrated in FIG. 21, a region which the caliper 83 passes through when the support arm 57 and the vehicle body frame 21 perform relative rotational movements is defined as "caliper passing region A3" (one example of a first-contact-member-driving-mechanism passing region). When seen from the frontward direction f, the caliper passing region A3 has a circular arc shape that centers on the arm central shaft 92. The caliper passing region A3 has a bilaterally symmetrical shape when seen from the frontward direction f. The left shock absorber 33 and the right shock absorber 34 overlap with the caliper passing region A3 when seen from the frontward direction f.

Further, as illustrated in FIG. 21, when seen from the frontward direction f, the actuator 90 is disposed below the caliper passing region A3 in the downward direction D. More specifically, when seen from the frontward direction f, the actuator 90 overlaps with a bottom end part of the support arm 57. The caliper main body 86 is supported by the caliper-main-body-support-part 87 above the arm central shaft 92 of the support arm 57. Therefore, when seen from the frontward direction f, the caliper passing region A3 is located above the actuator 90 in the upward direction U. Hence, when seen from the frontward direction f, the actuator 90 is disposed below the caliper passing region A3 in the downward direction D.

[Action of Resistance Force Changing Mechanism]

Figure 22:
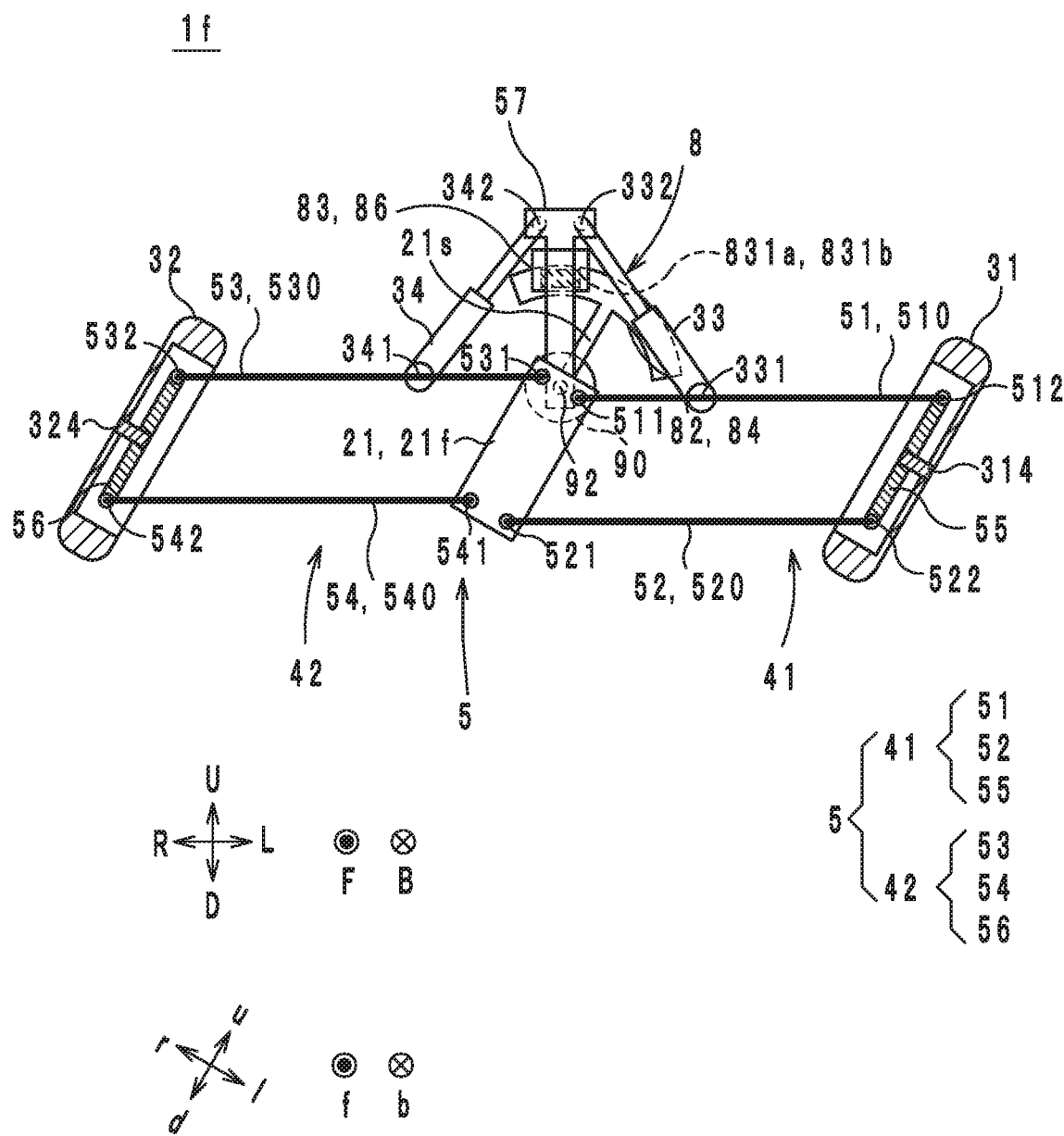
FIG. 22 is a schematic diagram of the front part of the leaning vehicle 1f as seen from the frontward direction F.

Next, the action of the resistance force changing mechanism 8 will be described with reference to FIG. 22. FIG. 22 is a schematic diagram illustrating the front part of the leaning vehicle if as seen from the frontward direction F. In FIG. 22, the vehicle body frame 21 is leaning to the left L.

First, the action of the resistance force changing mechanism 8 when the vehicle body frame 21 leans to the left L will be described with reference to FIG. 22. When the rider causes the vehicle body frame 21 to lean to the left L, the frame front part 21f leans to the left L. The caliper 83 is fixed to the support arm 57. On the other hand, the disk 82 is fixed to the caliper support part 21s of the vehicle body frame 21. Therefore, as illustrated in FIG. 22, as seen from the frontward direction f, the disk 82 rotates clockwise with respect to the caliper 83. Note that, the action of the resistance force changing mechanism 8 when the vehicle body frame 21 leans to the right R is in a bilaterally symmetrical relation with respect to the action of the resistance force changing mechanism 8 when the vehicle body frame 21 leans to the left L. Therefore, a description of the action of the resistance force changing mechanism 8 when the vehicle body frame 21 leans to the right R is omitted here.

In this connection, if an unshown switch or lever provided in the handle 301 is operated by the rider during an operation in which the disk 82 and the caliper 83 perform relative rotational movements, the pad 831a contacts the front face of the disk contact part 84, and the pad 831b contacts the rear face of the disk contact part 84. As a result, a frictional force arises between the disk contact part 84 and the pads 831a and 831b, and a resistance force that is applied with respect to the operation in which the disk 82 and the caliper 83 perform relative rotational movements increases. The caliper 83 is fixed to the support arm 57. The disk 82 is fixed to the caliper support part 21s. Accordingly, when the resistance force applied with respect to an operation whereby the disk 82 and the caliper 83 perform relative rotational movements increases, a resistance force applied with respect to an operation whereby the vehicle body frame 21 and the support arm 57 rotate relative to each other also increases. In other words, a resistance force that is applied with respect to operations whereby the upper-left arm member 51, the lower-left arm member 52, the upper-right arm member 53 and the lower-right arm member 54 and the vehicle body frame 21 are relatively displaced increases. As described above, the resistance force changing mechanism 8 is configured such as to change a resistance force that is applied with respect to operations whereby the vehicle body frame 21 and a plurality of link members (the upper-left arm member 51, the lower-left arm member 52, the upper-right arm member 53 and the lower-right arm member 54) are relatively displaced, by changing a contact state between the pads 831a and 831b and the disk 82.

[Effects]

According to the leaning vehicle 1f, an increase in the size of the leaning vehicle if can be suppressed. More specifically, the support arm 57 is supported by the vehicle body frame 21 at the center of the vehicle body frame 21 in the left-right direction lr. The support arm 57 can rotate around the arm central shaft 92 extending in the front-back direction fb with respect to the vehicle body frame 21. Further, the left arm mechanism 41 includes the left knuckle 55 that supports the left front wheel 31 at a position that is further leftward in the leftward direction 1 than the center of the vehicle body frame 21 in the left-right direction lr. The left arm mechanism 41 can swing in the upward direction u and in the downward direction d with respect to the vehicle body frame 21. The right arm mechanism 42 includes the right knuckle 56 that supports the right front wheel 32 at a position that is further rightward in the rightward direction r than the center of the vehicle body frame 21 in the left-right direction lr. The right arm mechanism 42 can swing in the upward direction u and in the downward direction d with respect to the vehicle body frame 21. In the leaning vehicle if configured as described above, as illustrated in FIG. 21, the movable range of the support arm 57 (the arm passing region A1) is located in the vicinity of the center of the vehicle body frame 21 in the left-right direction lr. Note that the arm passing region A1 does not completely match the movable range of the support arm 57. However, since the arm passing region A1 approximately matches the movable range of the support arm 57, for convenience of description the arm passing region A1 and the movable range of the support arm 57 are described as being the same. As illustrated in FIG. 21, a movable range AL of the left arm mechanism 41 is located in the leftward direction 1 from the center of the vehicle body frame 21 in the left-right direction lr. A movable range AR of the right arm mechanism 42 is located in the rightward direction r from the center of the vehicle body frame 21 in the left-right direction lr. That is, the movable range of the support arm 57, the movable range AL and the movable range AR are located in different directions as seen from the arm central shaft 92. Therefore, it is difficult for the movable range of the support arm 57 and the movable ranges AL and AR to overlap.

Therefore, the leaning vehicle if has the structure described below. More specifically, the vicinity of the arm passing region A1 is a space in which it is difficult to dispose a structure because the support arm 57 passes through that space. However, the resistance force changing mechanism 8 is configured such that the pads 831a and 831b and the disk 82 perform relative rotational movements in response to the support arm 57 and the vehicle body frame 21 performing relative rotational movements. Therefore, the movable range of the resistance force changing mechanism 8 has a shape that is close to parallel with the arm passing region A1. Hence, it is relatively easy to put the movable range of the resistance force changing mechanism 8 and the arm passing region A1 near to each other. Therefore, the caliper-main-body-support-part 87 (see FIG. 20) is supported by the support arm 57, and supports the caliper main body 86 so that, when seen from the frontward direction f, the arm passing region A1 and the disk 82 overlap. That is, the disk 82 is disposed in the vicinity of the arm passing region A1. Since the pads 831a and 831b come in contact with the disk 82, the caliper main body 86 is disposed in the vicinity of the disk 82. Thus, the caliper main body 86 is disposed in the vicinity of the arm passing region A1 which is a region in which a structure has seldom been disposed heretofore, and thus the space is effectively utilized. In addition, when seen from the frontward direction f, since protrusion of the disk 82 by a large amount from the arm passing region A1 is suppressed, a large space in an area other than the vicinity of the arm passing region A1 is not required for disposing the disk 82 in. As a result, an increase in the size of the leaning vehicle 1f is suppressed.

Further, according to the leaning vehicle 1f, for the reason described below also, an increase in the size of the leaning vehicle if can be suppressed. The support arm 57 has high rigidity. Therefore, in the leaning vehicle 1f, when the vehicle body frame 21 is in an upright state, the caliper-main-body-support-part 87 (see FIG. 20) is supported by the support arm 57 at a position that is further upward in the upward direction u than the arm central shaft 92. Hence, in a section from the arm central shaft 92 to a portion at which the caliper-main-body-support-part 87 is supported by the support arm 57, the support arm 57 supports the caliper main body 86. By this means, at least one part of a structure for supporting the caliper main body 86 can be replaced with the existing support arm 57, and hence an increase in the size of the leaning vehicle if is suppressed.

Further, according to the leaning vehicle 1f, the radius of the disk 82 can be increased. More specifically, in the leaning vehicle 1f, the caliper support position PC is disposed nearer to the second end part 332 of the left shock absorber 33 and the second end part 342 of the right shock absorber 34 than the arm central shaft 92 is. The center of a rotational movement of the caliper 83 coincides with the arm central shaft 92. Therefore, the caliper 83 is supported at a position that is separated from the arm central shaft 92. As a result, the radius of the disk 82 increases.

According to the leaning vehicle 1f, the caliper 83 and the actuator 90 can be arranged near to each other in the front-back direction fb. More specifically, when seen from the frontward direction f, the actuator 90 is disposed below the caliper passing region A3 in the downward direction D. Therefore, even if the caliper 83 and the actuator 90 are arranged near to each other, the caliper 83 and the actuator 90 do not come in contact. As a result, the caliper 83 and the actuator 90 can be arranged near to each other in the front-back direction fb.

According to the leaning vehicle 1f, an increase in the size of the leaning vehicle if can be suppressed. More specifically, the first end part 331 of the left shock absorber 33 is connected to the left arm mechanism 41. The second end part 332 of the left shock absorber 33 is connected to the support arm 57. Further, the caliper 83 is supported by the support arm 57. Therefore, the left shock absorber 33 is disposed near to the caliper passing region A3. Accordingly, when seen from the frontward direction f, the left shock absorber 33 can be easily overlapped with the caliper passing region A3. For the same reason, when seen from the frontward direction f, the right shock absorber 34 can be easily overlapped with the caliper passing region A3. As a result, an increase in the size of the leaning vehicle if can be suppressed.

Further, in the leaning vehicle 1f, when seen from the frontward direction f, the caliper 83 overlaps with the support arm 57. By this means, the length of the caliper-main-body-support-part 87 is shortened. As a result, the rigidity of the caliper-main-body-support-part 87 can be secured.

(Support Arm)

Hereunder, support arms 57a and 57b are described with reference to the drawings. FIG. 23 is a view of the support arm 57a as seen from the frontward direction f. FIG. 24 is a view of the support arm 57b as seen from the frontward direction f.

The leaning vehicles 1 and 1a to if may include the support arm 57a illustrated in FIG. 23 instead of the support arm 57. The support arm 57a has a "T" shape as seen from the frontward direction f. Therefore, the support arm 57a has a shape in which, when the vehicle body frame 21 is in an upright state, a distance L1 in the up-down direction ud between the arm central shaft 92 and the second end part 332 of the left shock absorber 33 or the second end part 342 of the right shock absorber 34 is shorter than a distance L2 in the left-right direction lr between the second end part 332 of the left shock absorber 33 and the second end part 342 of the right shock absorber 34.

The leaning vehicles 1 and 1a to if may include the support arm 57b illustrated in FIG. 24 instead of the support arm 57. The support arm 57b has a rod shape that extends in the left-right direction lr as seen from the frontward direction f. However, in the support arm 57b, the center in the left-right direction lr of the support arm 57b protrudes slightly downward in the downward direction d. The arm central shaft 92 is disposed at a portion that protrudes downward in the downward direction d in the support arm 57b. As in the support arm 57b, the length in the left-right direction lr of the support arm 57b may be longer by a large amount than the length in the up-down direction ud of the support arm 57b.

The support arm is not limited to the support arms 57, 57a and 57b as described above, and it suffices that the support arm has a structure in which the second end part 332 of the left shock absorber 33 and the second end part 342 of the right shock absorber 34 are connected at a position that is further upward in the upward direction u than the arm central shaft 92.

(Resistance Force Changing Mechanism)

Hereunder, resistance force changing mechanisms 8a and 8b are described with reference to the drawings. FIG. 25 is a view in which the resistance force changing mechanism 8a is seen from the frontward direction f. FIG. 26 is a view in which the resistance force changing mechanism 8b is seen from the left-back direction 1b.

The leaning vehicles 1 and 1a to if may include the resistance force changing mechanism 8a illustrated in FIG. 25 instead of the resistance force changing mechanism 8. The resistance force changing mechanism 8a includes a disk 82 and a pin driving mechanism 83a. The disk 82 has a circular arc shape that projects in the upward direction u. However, a concave portion G is provided in the disk 82. The pin driving mechanism 83a includes a pin 831c. The pin 831c is caused to move in the up-down direction ud by the pin driving mechanism 83a. By this means, the resistance force changing mechanism 8a can assume a locked state in which the pin 831c is inserted into the concave portion G, and an unlocked state in which the pin 831c is not inserted in the concave portion G.

Further, the leaning vehicles 1 and 1a to if may include the resistance force changing mechanism 8b illustrated in FIG. 26 instead of the resistance force changing mechanism 8. The resistance force changing mechanism 8b includes a disk 82 and a pin driving mechanism 83b. The disk 82 has a circular arc shape that projects in the upward direction u. However, a hole H that penetrates the disk 82 in the front-back direction fb is provided in the disk 82. The pin driving mechanism 83b includes a pin 831d. The pin 831d is caused to move in the front-back direction fb by the pin driving mechanism 83b. By this means, the resistance force changing mechanism 8b can assume a locked state in which the pin 831d is inserted into the hole H, and an unlocked state in which the pin 831d is not inserted into the hole H.

Other Embodiments

The embodiments described and/or illustrated in this specification are described in order to facilitate understanding of the present disclosure, and are not intended to limit the concept of the present disclosure. The above described embodiments may be changed or modified without departing from the gist thereof.

The gist includes equivalent elements, corrections, deletions, combinations (for example, combinations of features spanning over various embodiments), improvements, and alterations that can be recognized by those skilled in the art based on the embodiments disclosed in the present specification. The limitations of the appended claims should be broadly interpreted based on the terms used in the appended claims, and the limitations should not be limited by the embodiments described in the present description or in the prosecution of the present application. The embodiments should be construed as non-exclusive. For example, the terms "preferably" and "may" are non-exclusive in the present specification, meaning "preferable, but not limited to this" and "may be, but not limited to this."

Note that, as illustrated in FIG. 5, the support arm 57 and the disk support part 85 are constituted by a single member. However, the support arm 57 and the disk support part 85 may be constituted by separate members. Further, the disk contact part 84 and the disk support part 85 may be constituted by a single member.

Further, the support arm 57 is constituted by a single bar-shaped member. However, the support arm 57 may be constituted by a combination of a plurality of members. More specifically, the support arm 57 may include, for example, an arm part, a right link part and a left link part. The arm part is a member that, when the vehicle body frame 21 is in an upright state, extends in the up-down direction ud. The left link part is supported by a top end part of the arm part. The left link part can rotate around a left-link support shaft that extends in the front-back direction fb. The right link part is supported by the top end part of the arm part. The right link part can rotate around a right-link support shaft that extends in the front-back direction fb. The left link part and the right link part are arranged side-by-side in that order from left to right at the top end part of the arm part. The second end part 332 of the left shock absorber 33 is connected to the left link part. The second end part 342 of the right shock absorber 34 is connected to the right link part.

Note that, in the leaning vehicles 1, 1a, 1b and 1e, the support arm 57 is disposed further backward in the backward direction b than the upper-left-arm-member supported part 511, the lower-left-arm-member supported part 521, the upper-right-arm-member supported part 531 and the lower-right-arm-member supported part 541. Further, in the leaning vehicles 1c and 1d, the support arm 57 is disposed further frontward in the frontward direction f than the upper-left-arm-member supported part 511, the lower-left-arm-member supported part 521, the upper-right-arm-member supported part 531 and the lower-right-arm-member supported part 541. However, the support arm 57 may be disposed between the front end and back end of the upper-left-arm-member supported part 511, between the front end and back end of the lower-left-arm-member supported part 521, between the front end and back end of the upper-right-arm-member supported part 531, and between the front end and back end of the lower-right-arm-member supported part 541.

Note that, other than being a disk brake, the resistance force changing mechanism 8 may be a drum brake.

REFERENCE SIGNS LIST 1, 1a to 1f: Leaning Vehicle
3: Steering Mechanism
4: Rear Wheel
5: Link Mechanism
8, 8a, 8b: Resistance Force Changing Mechanism
21: Vehicle Body Frame
21c: Actuator Support Part
21f: Frame Front Part
21m: Main Frame
21s: Caliper Support Part
21ud: Up-down Frame Part
31: Left Front Wheel
32: Right Front Wheel
33: Left Shock Absorber
34: Right Shock Absorber
41: Left Arm Mechanism
42: Right Arm Mechanism
51: Upper-left Arm Member
52: Lower-left Arm Member
53: Upper-right Arm Member
54: Lower-right Arm Member
55: Left Knuckle
56: Right Knuckle
57, 57a, 57b: Support Arm
82: Disk
83: Caliper
83a, 83b: Pin Driving Mechanism
84: Disk Contact Part
85: Disk Support Part
86: Caliper Main Body
87: Caliper-main-body-support-part
90: Actuator
92: Arm Central Shaft
301: Handle
302: Left Tie Rod
303: Right Tie Rod
314: Left Front Wheel Axle
324: Right Front Wheel Axle
331, 341: First End Part
332, 342: Second End Part
510: Upper-left-arm-member Main Body
511, 512: Upper-left-arm-member Supported Part
520: Lower-left-arm-member Main Body
521, 522: Lower-left-arm-member Supported Part
530: Upper-right-arm-member Main Body
531, 532: Upper-right-arm-member Supported Part
540: Lower-right-arm-member Main Body
541, 542: Lower-right-arm-member Supported Part
831a, 831b: Pad
831c, 831d: Pin
A1: Arm Passing Region
A2: Disk Passing Region
A3: Caliper Passing Region
AL, AR: Caliper Passing Region
PC: Caliper Support Position
PD: Disk Support Position

What is claimed is:

1. A leaning vehicle, comprising:
 a vehicle body frame that leans in a leaning-vehicle leftward direction at a time of turning left, and leans in a leaning-vehicle rightward direction at a time of turning right;
 a link mechanism including
  a left arm mechanism including:
   an upper-left arm member that is supported by the vehicle body frame so as to rotate about an axis extending in a vehicle-body-frame front-back direction centering on a right part of the upper-left arm member;
   a lower-left arm member that is disposed further downward in a vehicle-body-frame downward direction than the upper-left arm member and is supported by the vehicle body frame so as to rotate about an axis extending in the vehicle-body-frame front-back direction centering on a right part of the lower-left arm member; and
   a left connection member that is connected to a left part of the upper-left arm member and a left part of the lower-left arm member, wherein
  the left arm mechanism swings in a vehicle-body-frame upward direction when the vehicle body frame leans in the leaning-vehicle leftward direction and swings in the vehicle-body-frame downward direction when the vehicle body frame leans in the leaning-vehicle rightward direction; and
  a right arm mechanism including:
   an upper-right arm member that is supported by the vehicle body frame so as to rotate about an axis extending in the vehicle-body-frame front-back direction centering on a left part of the upper-right arm member;
   a lower-right arm member that is disposed further downward in the vehicle-body-frame downward direction than the upper-right arm member and is supported by the vehicle body frame so as to rotate about an axis extending in the vehicle-body-frame front-back direction centering on a left part of the lower-right arm member; and
   a right connection member that is connected to a right part of the upper-right arm member and a right part of the lower-right arm member, wherein the right arm mechanism swings in the vehicle-body-frame upward direction when the vehicle body frame leans in the leaning-vehicle rightward direction and swings in the vehicle-body-frame downward direction when the vehicle body frame leans in the leaning-vehicle leftward direction;
a left shock absorber having a cushioning action, with a first end part of the left shock absorber being connected to the left arm mechanism;
a right shock absorber having a cushioning action, with a first end part of the right shock absorber being connected to the right arm mechanism;
a support arm that is supported by the vehicle body frame at a center of the vehicle body frame in the vehicle-body-frame left-right direction so as to rotate around an arm central shaft extending in the vehicle-body-frame front-back direction, wherein, when the vehicle body frame is in an upright state, a second end part of the left shock absorber and a second end part of the right shock absorber are connected further upward in the vehicle-body-frame upward direction than the arm central shaft;
a left steerable wheel that is rotatably supported by the left connection member;
a right steerable wheel that is rotatably supported by the right connection member;
a steering mechanism that steers the left steerable wheel and the right steerable wheel; and
a resistance force changing mechanism that includes a first-contact-member-driving-mechanism including a first contact member, and a second contact member, the resistance force changing mechanism being configured such that the first contact member and the second contact member perform relative rotational movements in response to the support arm and the vehicle body frame performing relative rotational movements, wherein the resistance force changing mechanism changes a resistance force that is applied with respect to operations in which the support arm and the vehicle body frame perform relative rotational movements, by the first-contact-member-driving-mechanism changing a contact state between the first contact member and the second contact member;
wherein the leaning vehicle has a structure of (A) or (B):
(A)
the first-contact-member-driving-mechanism is supported by the vehicle body frame, and
the second contact member includes: a second-contact-member-contact-part with which the first contact member is allowed to be brought into contact; and a second-contact-member-support-part that, when the vehicle body frame is in the upright state, is supported by the support arm at a position that is further upward in the vehicle-body-frame upward direction than the arm central shaft, wherein, when seen from a vehicle-body-frame frontward direction, the second-contact-member-support-part supports the second-contact-member-contact-part so that an arm passing region and the first contact member overlap, the arm passing region being a region where a portion located between the arm central shaft in the support arm and the second end parts of the left and right shock absorbers passes through when the support arm and the vehicle body frame perform relative rotational movements; or (B)
the second contact member is supported by the vehicle body frame, and
the first-contact-member-driving-mechanism further includes: a first-contact-member-driving-mechanism-main-body that supports the first contact member; and a first-contact-member-driving-mechanism-main-body-support-part that, when the vehicle body frame is in the upright state, is supported by the support arm at a position that is further upward in the vehicle-body-frame upward direction than the arm central shaft, wherein, when seen from the vehicle-body-frame frontward direction, the first-contact-member-driving-mechanism-main-body-support-part supports the first-contact-member-driving-mechanism-main-body so that the arm passing region and the second contact member overlap, the arm passing region being the region where the portion located between the arm central shaft in the support arm and the second end parts of the left and right shock absorbers passes through when the support arm and the vehicle body frame perform relative rotational movements;
wherein:
the leaning vehicle has the structure of (A);
the leaning vehicle further including:
an actuator that applies a force to the support arm and the vehicle body frame so that the support arm and the vehicle body frame perform relative rotational movements, wherein, when seen from the vehicle-body-frame frontward direction, the actuator is disposed below, in a leaning-vehicle downward direction, a second contact member passing region which the second contact member passes through when the support arm and the vehicle body frame perform relative rotational movements;
or,
the leaning vehicle has the structure of (B);
the leaning vehicle further including:
an actuator that applies a force to the support arm and the vehicle body frame so that the support arm and the vehicle body frame perform relative rotational movements, wherein, when seen from the vehicle-body-frame frontward direction, the actuator is disposed below, in the leaning-vehicle downward direction, a first-contact-member-driving-mechanism passing region which the first-contact-member-driving-mechanism passes through when the support arm and the vehicle body frame perform relative rotational movements.

2. The leaning vehicle according to claim 1, wherein:
the leaning vehicle has the structure of (A);
a position at which the support arm supports the second contact member is taken as a second-contact-member support position; and
the second-contact-member support position is disposed nearer to the second end part of the left shock absorber and the second end part of the right shock absorber than the arm central shaft is;
or,
the leaning vehicle has the structure of (B);
a position at which the support arm supports the first-contact-member-driving-mechanism is taken as a first-contact-member-driving-mechanism support position; and
the first-contact-member-driving-mechanism support position is disposed nearer to the second end part of the left shock absorber and the second end part of the right shock absorber than the arm central shaft is.

3. The leaning vehicle according to claim 1, wherein:
the leaning vehicle has the structure of (A); and
when seen from the vehicle-body-frame frontward direction, the left shock absorber and the right shock absorber overlap with a second contact member passing region through which the second contact member passes when the support arm and the vehicle body frame perform relative rotational movements;

or, the leaning vehicle has the structure of (B); and
when seen from the vehicle-body-frame frontward direction, the left shock absorber and the right shock absorber overlap with a first-contact-member-driving-mechanism passing region through which the first-contact-member-driving-mechanism passes when the support arm and the vehicle body frame perform relative rotational movements.

4. The leaning vehicle according to claim 1, wherein:
the leaning vehicle has the structure of (A); and
when the vehicle body frame is in the upright state, the second-contact-member-support-part supports the second-contact-member-contact-part on a line that links a portion with which the first contact member is allowed to be brought into contact in the second-contact-member-contact-part, and the arm central shaft.

5. The leaning vehicle according to claim 1, wherein:
the leaning vehicle has the structure of (A); and
when the vehicle body frame is in the upright state, the second-contact-member-support-part extends in the vehicle-body-frame frontward direction or a vehicle-body-frame backward direction from the support arm.

6. The leaning vehicle according to claim 1, wherein:
the leaning vehicle has the structure of (B); and
when seen from the vehicle-body-frame frontward direction, the first-contact-member-driving-mechanism overlaps with the support arm.

* * * * *